(12) United States Patent
Obrovac et al.

(10) Patent No.: US 12,434,978 B2
(45) Date of Patent: Oct. 7, 2025

(54) MICROGRANULATION METHODS AND PRODUCT PARTICLES THEREFROM

(71) Applicant: NOVONIX BATTERY TECHNOLOGY SOLUTIONS INC., Bedford (CA)

(72) Inventors: Mark Obrovac, Halifax (CA); Lituo Zheng, Halifax (CA); Matthew Garayt, Halifax (CA)

(73) Assignee: Novonix Battery Technology Solutions Inc., Bedford (CA)

( * ) Notice: Subject to any disclaimer, the term of this patent is extended or adjusted under 35 U.S.C. 154(b) by 817 days.

(21) Appl. No.: 17/638,646

(22) PCT Filed: Jul. 24, 2020

(86) PCT No.: PCT/US2020/043621
§ 371 (c)(1),
(2) Date: Feb. 25, 2022

(87) PCT Pub. No.: WO2021/040932
PCT Pub. Date: Mar. 4, 2021

(65) Prior Publication Data
US 2022/0298023 A1    Sep. 22, 2022

Related U.S. Application Data

(60) Provisional application No. 63/020,526, filed on May 5, 2020, provisional application No. 62/946,938, filed (Continued)

(51) Int. Cl.
*C01G 1/02* (2006.01)
*C01G 45/1228* (2025.01)
(Continued)

(52) U.S. Cl.
CPC ............ *C01G 1/02* (2013.01); *C01G 45/1228* (2013.01); *C01G 45/22* (2025.01); *C01G 51/50* (2013.01);
(Continued)

(58) Field of Classification Search
CPC ............................. C01P 2004/32; C01G 1/02
See application file for complete search history.

(56) References Cited

U.S. PATENT DOCUMENTS 7,211,237 B2    5/2007    Eberman et al.
7,368,071 B2    5/2008    Dahn et al.
(Continued)

FOREIGN PATENT DOCUMENTS

CN    100497180 C    6/2009
CN    101916843 A    12/2010
(Continued)

OTHER PUBLICATIONS

Cheng, et al. "Mechanical and physical properties of LiNi0. 33Mn0. 33Co0. 33O2 (NMC)." Journal of the European ceramic society 37.9 (2017): 3213-3217 (Year: 2017).*
(Continued)

*Primary Examiner* — Anthony J Zimmer
*Assistant Examiner* — Eric Scott Sherman
(74) *Attorney, Agent, or Firm* — Knobbe, Martens, Olson & Bear, LLP

(57) ABSTRACT

Simple, material-efficient microgranulation methods are disclosed for aggregating precursor particles into larger product particles with improved properties and, in some instances, novel structures. The product particles are useful in applications requiring uniform, smooth, spherical, or rounded particles such as for electrode materials in lithium batteries and other applications.

35 Claims, 41 Drawing Sheets

Related U.S. Application Data on Dec. 11, 2019, provisional application No. 62/893,787, filed on Aug. 29, 2019.

(51) Int. Cl.

| | | |
|---|---|---|
| *C01G 45/22* | (2025.01) | |
| *C01G 51/50* | (2025.01) | |
| *C01G 51/82* | (2025.01) | |
| *C01G 53/44* | (2025.01) | |
| *C01G 53/50* | (2025.01) | |
| *C01G 53/82* | (2025.01) | |
| *H01M 4/505* | (2010.01) | |
| *H01M 4/525* | (2010.01) | |

(52) U.S. Cl.
CPC ............. *C01G 51/82* (2025.01); *C01G 53/44* (2013.01); *C01G 53/50* (2013.01); *C01G 53/82* (2025.01); *H01M 4/505* (2013.01); *H01M 4/525* (2013.01); *C01P 2002/52* (2013.01); *C01P 2002/74* (2013.01); *C01P 2002/77* (2013.01); *C01P 2002/85* (2013.01); *C01P 2004/03* (2013.01); *C01P 2004/32* (2013.01); *C01P 2004/52* (2013.01); *C01P 2004/61* (2013.01); *C01P 2004/62* (2013.01); *C01P 2004/64* (2013.01); *C01P 2006/40* (2013.01)

(56) References Cited

U.S. PATENT DOCUMENTS

| | | |
|---|---|---|
| 7,468,223 B2 | 12/2008 | Thackeray et al. |
| 7,592,100 B2 | 9/2009 | Ohzuku et al. |
| 7,682,747 B2 | 3/2010 | Ohzuku et al. |
| 8,287,772 B2 | 10/2012 | Le et al. |
| 9,132,482 B2 | 9/2015 | Maskrot |
| 9,142,832 B2 | 9/2015 | Suzuki et al. |
| 10,651,467 B2 | 5/2020 | Von Bulow et al. |
| 11,205,776 B2 | 12/2021 | Kao et al. |
| 11,316,157 B1 | 4/2022 | Huang |
| 2007/0160906 A1 | 7/2007 | Tooyama et al. |
| 2009/0202735 A1 | 8/2009 | Marlin et al. |
| 2009/0293761 A1 | 12/2009 | Richardson et al. |
| 2013/0040198 A1 | 2/2013 | Patoux et al. |
| 2013/0189178 A1 | 7/2013 | Terayama et al. |
| 2015/0333328 A1 | 11/2015 | Johnson et al. |
| 2016/0099469 A1 | 4/2016 | Martin et al. |
| 2017/0050182 A1 | 2/2017 | Gramiccioni |
| 2017/0133675 A1 | 5/2017 | Zhu et al. |
| 2017/0309894 A1 | 10/2017 | Hu et al. |
| 2020/0136141 A1 | 4/2020 | Han et al. |
| 2021/0359300 A1 | 11/2021 | Campbell |
| 2022/0336805 A1 | 10/2022 | Zheng et al. |
| 2023/0261184 A1 | 8/2023 | Kim et al. |

FOREIGN PATENT DOCUMENTS

| | | |
|---|---|---|
| CN | 102171865 A | 8/2011 |
| CN | 102239588 A | 11/2011 |
| CN | 102881874 A | 1/2013 |
| CN | 102569780 B | 4/2014 |
| CN | 103855372 A | 6/2014 |
| CN | 104953199 A | 9/2015 |
| CN | 105345012 A | 2/2016 |
| CN | 102683669 B | 3/2016 |
| CN | 105861961 A | 8/2016 |
| CN | 106328887 A | 1/2017 |
| CN | 106531980 A | 3/2017 |
| CN | 106654227 A | 5/2017 |
| CN | 107482172 A | 12/2017 |
| CN | 107785560 A | 3/2018 |
| CN | 107910526 A | 4/2018 |
| CN | 108172826 A | 6/2018 |
| CN | 108172836 A | 6/2018 |
| CN | 109802133 A | 5/2019 |
| CN | 109888207 A | 6/2019 |
| CN | 110336007 A | 10/2019 |
| CN | 110776021 A | 2/2020 |
| CN | 109279659 B | 4/2021 |
| CN | 113782715 A | 12/2021 |
| CN | 114302862 A | 4/2022 |
| CN | 114341061 A | 4/2022 |
| CN | 110581272 B | 5/2022 |
| CN | 111661880 B | 8/2022 |
| CN | 115557544 A | 1/2023 |
| CN | 116417592 A | 7/2023 |
| CN | 114388758 B | 12/2023 |
| CN | 119585208 A | 3/2025 |
| EP | 0390185 B1 | 6/1994 |
| EP | 3307847 A1 | 4/2018 |
| EP | 4095102 A1 | 5/2021 |
| EP | 4021854 A1 | 7/2022 |
| EP | 4021855 A | 7/2022 |
| EP | 3154909 B1 | 8/2022 |
| EP | 4532426 A1 | 4/2025 |
| JP | 2001-163700 A | 6/2001 |
| JP | 2005-025975 A | 1/2005 |
| JP | 2005-336004 A | 12/2005 |
| JP | 2007-317585 A | 12/2007 |
| JP | 2008-137837 A | 6/2008 |
| JP | 2012-209242 A | 10/2012 |
| JP | 2015-005376 A | 1/2015 |
| JP | 2016-026981 A | 2/2016 |
| JP | 2018-533166 A | 11/2018 |
| JP | 2022-546264 A | 11/2022 |
| JP | 2022-546934 A | 11/2022 |
| KR | 10-2014-0012483 A | 2/2014 |
| KR | 10-2022-0054816 A | 5/2022 |
| KR | 10-2022-0054822 A | 5/2022 |
| KR | 10-2025-0019672 | 2/2025 |
| TW | I565130 B | 1/2017 |
| WO | WO 2012/163660 A1 | 12/2012 |
| WO | WO 2015/183568 A1 | 12/2015 |
| WO | WO 2019/117281 A1 | 6/2019 |
| WO | WO 2019/120973 A1 | 6/2019 |
| WO | WO 2019/185349 A1 | 10/2019 |
| WO | WO 2021/040931 A1 | 3/2021 |
| WO | WO 2021/040932 A1 | 3/2021 |
| WO | WO 2021/041296 A1 | 3/2021 |
| WO | WO 2021/080384 A1 | 4/2021 |
| WO | WO 2021/123747 A1 | 6/2021 |
| WO | WO 2022/034330 A1 | 2/2022 |
| WO | WO 2022/127324 A1 | 6/2022 |
| WO | WO 2023/102556 A1 | 6/2023 |
| WO | WO 2023/230537 A1 | 11/2023 |
| WO | WO 2024/039915 A1 | 2/2024 |

OTHER PUBLICATIONS

Voronov, et al. "Comparison of the basic physical and chemical properties of complex oxides LiNi x Mn y Co 1-x-y O 2 (0.3≤ x≤ 0.6; 0.2≤ y≤ 0.4) obtained by different methods." Inorganic Materials: Applied Research 8 (2017): 229-237 (Year: 2017).*

Alonso et al., "Mechanism of the Combined Coating-Mechanofusion Processing of Powders," Powder Technology 59: 45-52 (1989).

Blank et al., "Structural peculiarities of carbon onions, formed by four different methods: Onions and diamonds, alternative products of graphite high-pressure treatment," Scripta Materialia 60: 407-410 (2009).

Chou et al., "Preparation of Graphite/Nano-Powder Composite Particles and Applicability as Carbon Anode Material in a Lithium Ion Battery," Advanced Powder Technology 19: 383-396 (2008).

Naito et al., "Analysis of the Powder Composite Process by a Mechanical Method," KONA 11: 229-234 (1993).

Naito et al., "Applications of Communication Techniques for the Surface Modification of Powder Materials," ISIJ International 33: 915-924 (1993).

Pfeffer et al., "Synthesis of engineered particulates with tailored properties using dry particle coating," Powder Technology 117: 40-67 (2001).

(56) References Cited

OTHER PUBLICATIONS

Chen et al., "Numerical simulation of Mechanofusion system," Powder Technology 146: 121-136 (2004).
Yokoyama et al., "Ultra-Fine Grinding and Consequent Changes of Powder Characteristics," KONA 1: 53-63 (1983).
Chen et al., "Characteristics of NiO-YSZ anode based on NiO particles synthesized by the precipitation method," Journal of Alloys and Compounds 454: 447-453 (2008).
Chen et al., "Controllable synthesis of Cu-doped CoO hierarchical structure for high performance lithium-ion battery," Journal of Power Sources 314: 66-75 (2016).
Chen et al., "Impact of Initial Li Content on Kinestics and Stabilities of Layered Li1+x(Ni0.33Mn0.33CO0.33)1-xO2," Journal of The Electromechanical Society, 159: A1543-A155 (2012).
Jung et al., "Effect of Ambient Storage on the Degradation of Ni-Rich Positive Electrode Materials (NMC811) for Li-Ion Batteries", Journal of The Electrochemical Society, Jan. 1, 2018, pp. 132-141, retrieved from <https://iopscience.iop.org/article/10.1149/2.0401802jes/pdf>.
Kosova et al., "Mechanochemical synthesis of LiMn2O4 cathode material for lithium batteries," Solid State Ionics, 135, 2000, pp. 107-114.
Kwon et al., "Synthesis and Characterization of Core-Shell Nanocrystals of Co-Riche Cathodes," Journal of the Electrochemical Society 167: 05051 (2019).
Li et al., "One-step synthesis of Li-doped NiO as high-performance anode material for lithium ion batteries," Ceramics International 42: 14565-14572 (2016).
Li et al., "Synthesis of Sing Crystal LiNi0.6Mn0.2Co0.2O2 with Enhanced Electrochemical Performance for Lithium Ion Batteries," Journal of Electrochemical Society 165: A1038-A1045 (2018).
Obrovac et al., "Structure and electrochemistry of LiMO2 (M=Ti, Mn, Fe, Co, Ni) prepared by mechanochemical synthesis," Solid State Ionics, vol. 112, 1998, pp. 9-19.
Park et al., "The effect of Zn on the microstructure and electrical properties of Mn1.17-xNi0.93Co0.9znxO4 (0<= x,0.075) NTC thermistors", Journal of Alloys and Compounds, vol. 467, No. 1- 2, Jan. 7, 2009, pp. 310-316.
Pimenta et al., "Synthesis of Li-Rich NMC: A Comprehensive Study," Chemistry of Materials 29: 9923-9936 (2017).
Reddy, ed., "Linden's Handbook of Batteries, 4th edition," pp. 26.5-26.12 (2011).
Rossen et al., "Structure and electrochemistry of LixMnyNi1-yO2," Solid Sate Ionics, vol. 57, 1192, pp. 311-318.
Son et al., "Structure and electrochemical characterization of LiNi0.3Co0.3Mn0.3Fe0.1O2 cathode for lithium secondary battery", Korean J. Chem. Eng, 2007, vol. 24, Issue 5, pp. 888-891.
Thi et al., "High performance of Co-doped NiO nanoparticle anode material for rechargeable lithium ion batteries," Journal of Power Sources 292: 23-30 (2015).
Vallalperuman et al., "Synthesis and characterization of Co and Mn doped NiO nanoparticles," Korean Journal of Chemical Engineering 31: 639-643 (2014).
Wang et al., "High performance lithium-manganese-rich cathod material with reduced impurities," Nano Energy 31: 247-257 (2017).
Zhang et al., "Controlling the Synthesis of CoO Nancrystals with Various Morphologies," J. Phys. Chem. C 112: 5322-5327 (2008).
Zheng et al., "All-Dry Synthesis of Single Crystal NMC Cathode Materials for Li-Ion Batteries", Journal of the Electrochemical Society, vol. 167, No. 13, Oct. 1, 2020.
Zheng et al., "Tuning of thermal stability in layered Li (NixMnyCoz)O2," Journal of the American Chemical Society, 138(4), 13326-13334.
Zhong et al., "Investigation on porous MnO microsphere anode for lithium ion batteries," Journal of Power Sources 196: 6802-6808 (2011).
Zybert et al., "Different strategies of introduction of lithium ions into nickel-manganese-cobalt carbonate resulting in LiNi-.6Mn0.2Co0.2O2 (NMC622) cathode material for Li-ion batteries", Solid State Ionics, vol. 348, May 1, 2020, p. 115273, retrieved from <https://pdf.sciencedirectassets.com/271411/1-s2.0-S0167273820X00038/1-s2.0-S0167273820300333/main.pdf?X-Amz-Security-Token=IQoJb3JpZ21uX2VjEG8aCXVzLWVhc3QtMSJH MEUCIFiUe8Ina4719VQr3ET+WEROUUt2z1QQB61PYIR5GjvF AiEAKUM/JPIrz9bTEigB+YSBvgdWU/W4e+ HzU14hCkMCpZoquwU1qP//////// ARAFGgwwNTkwMDm1NDY4NjUiDFj1/>.
International Preliminary Report on Patentability (IPRP) received in PCT Application No. PCT/US2020/043599, dated Mar. 1, 2022 in 6 pages.
International Preliminary Report on Patentability received in PCT Application No. PCT/US2020/047597, dated Mar. 1, 2022 in 7 pages.
International Search Report and Written Opinion received in PCT Application No. PCT/US2023/061842, dated Jun. 14, 2023 in 13 pages.
Written Opinion of International Preliminary Examining Authority received in PCT Application No. PCT/US2023/061842, dated Jul. 2, 2024 in 7 pages.
International Search Report and Written Opinion received in PCT Application No. PCT/US2023067437, dated Oct. 9, 2023 in 7 pages.
International Search Report and Written Opinion received in PCT Application No. PCT/US2020/043599, dated Nov. 2, 2020 in 9 pages.
International Search Report and Written Opinion received in PCT Application No. PCT/US2020/047597, dated Dec. 3, 2020 in 11 pages.
Second Office Action received in SA Application No. 522431788, dated May 16, 2023 in 16 pages.
Office Action received in Japanese Patent Application No. 2022-510172, dated Jul. 3, 2024 in 14 pages.
Office Action received in SA Application No. 523441363, dated May 14, 2024 in 8 pages.
Office Action received in SA Application No. 522431788, dated Nov. 8, 2023 in 11 pages.
Office Action received in CN Application No. 202080060752.0, dated Jun. 29, 2023 in 12 pages.
Second Office Action received in CN Application No. 202080060752.0, dated Feb. 3, 2024 in 25 pages.
Office Action received in JP Application No. 2022-509191, dated Apr. 10, 2024 in 4 pages.
Office Action received in Chinese Application No. 202080060756.9, dated Oct. 24, 2024 in 15 pages.
Blank et al., "Structural peculiarities of carbon onions, formed by four different methods: Onions and diamonds, alternative products of graphite high-pressure treatment," Scripta Materialia, 2009, vol. 60, pp. 407-410.
Delmas et al., "Structural Classification and Properties of the Layered Oxides," Physica, 99B (1980) pp. 81-85.
International Preliminary Report on Patentability (IPRP) received in PCT Application No. PCT/US2020/043621, dated Mar. 1, 2022 in 11 pages.
International Search Report and Written Opinion received in PCT Application No. PCT/US2020/043621, dated Jan. 14, 2021 in 16 pages.
"Mechano Fusion Systems AMS Designed for particle-to-particle combination in order to enhance particle performance," KONA, 1999, vol. 17, pp. 244-250.
Office Action received in SA Application No. 522431795, dated May 12, 2023 in 16 pages.
Yoshio et al., "Improvement of natural graphite as a lithium-ion battery anode material, from raw flake to carbon-coated sphere," Journal of Materials Chemistry, 2004, vol. 14, pp. 1754-1758.
Second Office Action received in Chinese Application No. 202080060756.9, dated Jun. 17, 2025 in 17 pages.

* cited by examiner

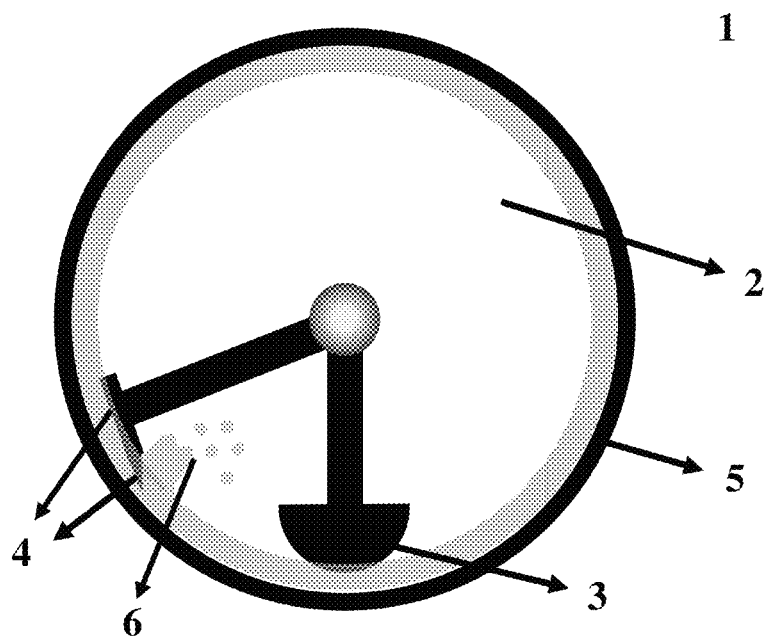
FIG. 1
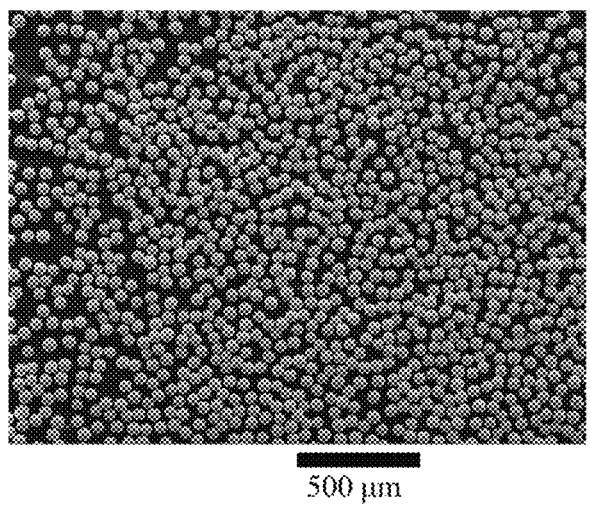     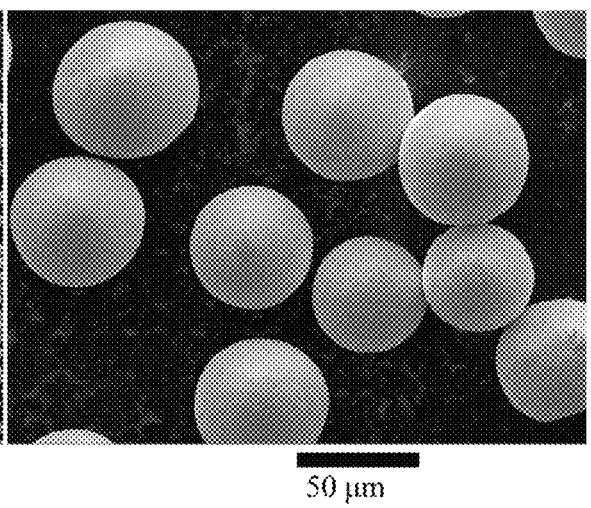
FIG. 2a     FIG. 2b

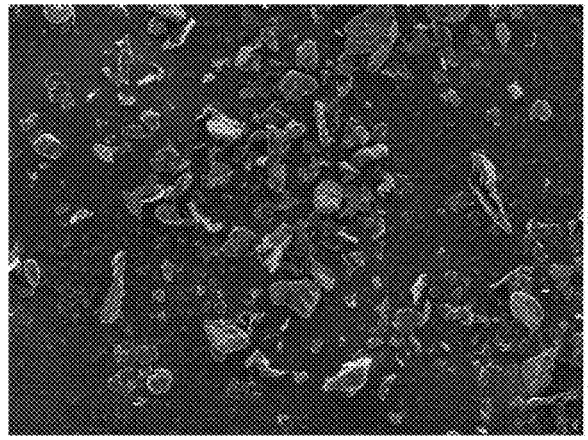
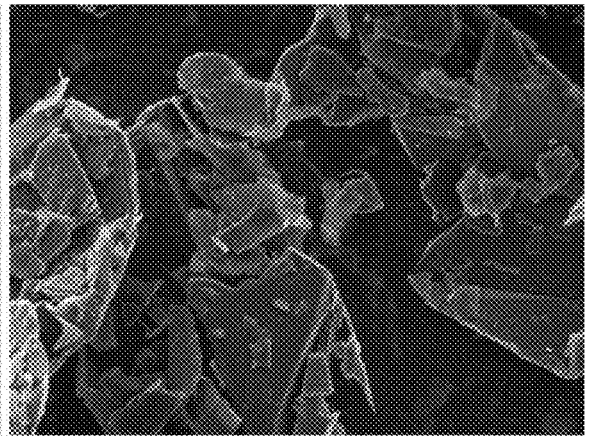
FIG. 4a  FIG. 4b
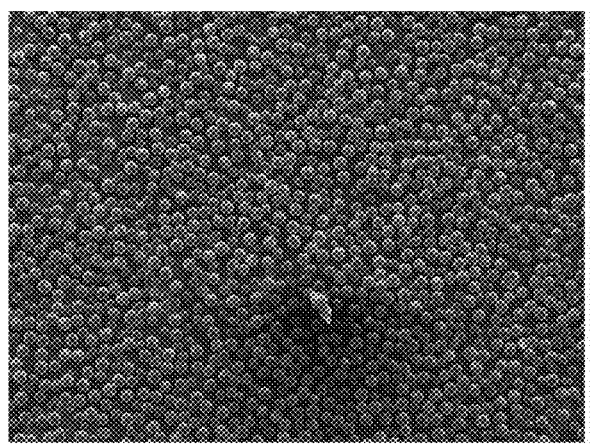
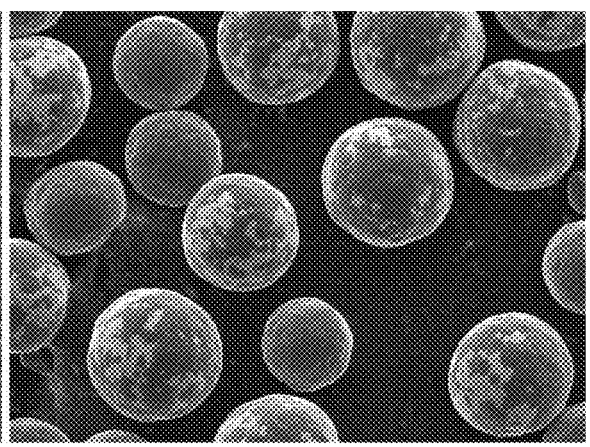
FIG. 5a  FIG. 5b

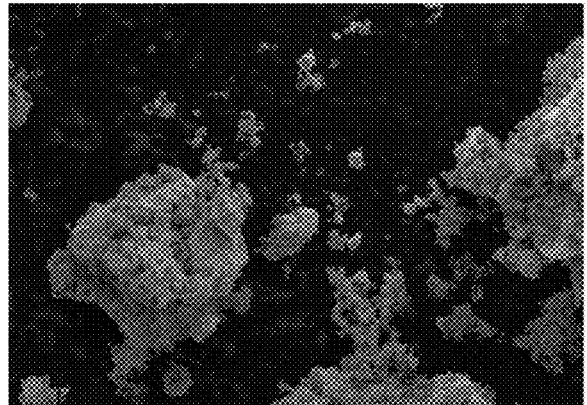 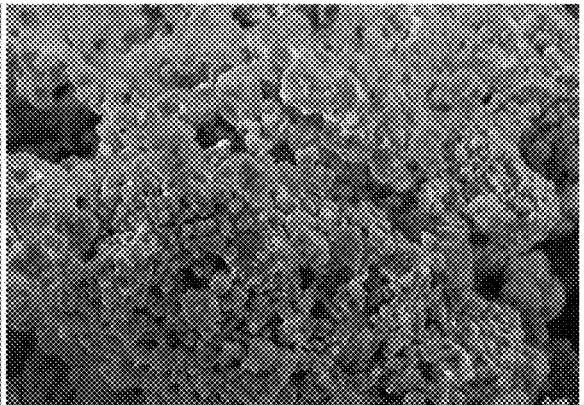
FIG. 11a          FIG. 11b
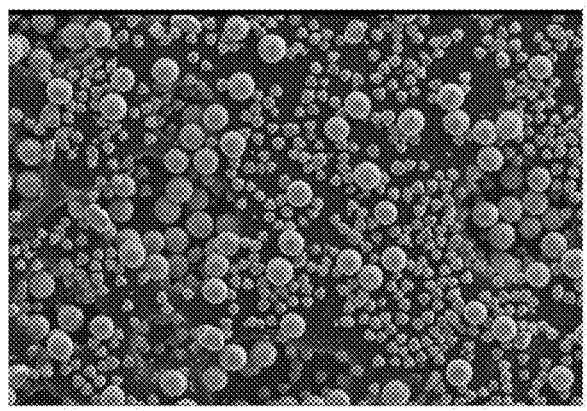 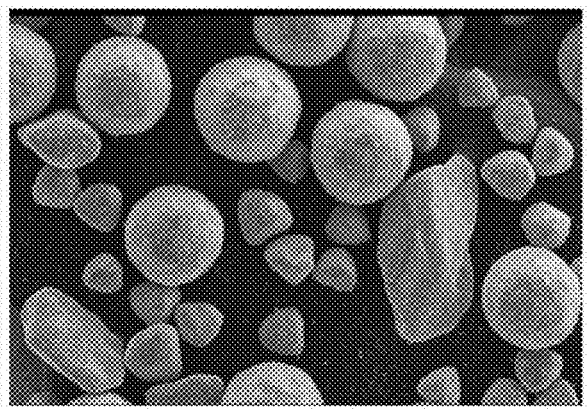
FIG. 12a          FIG. 12b

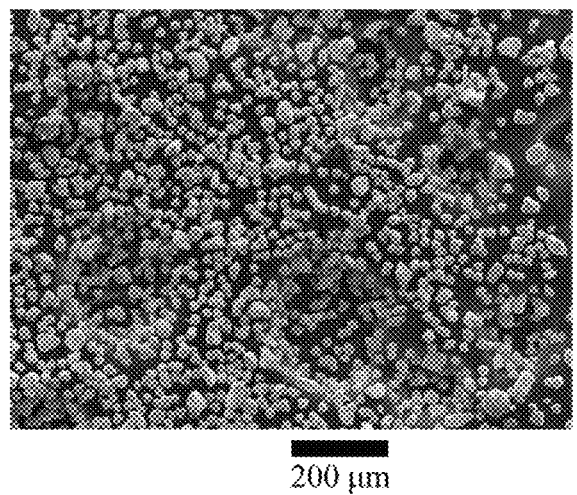
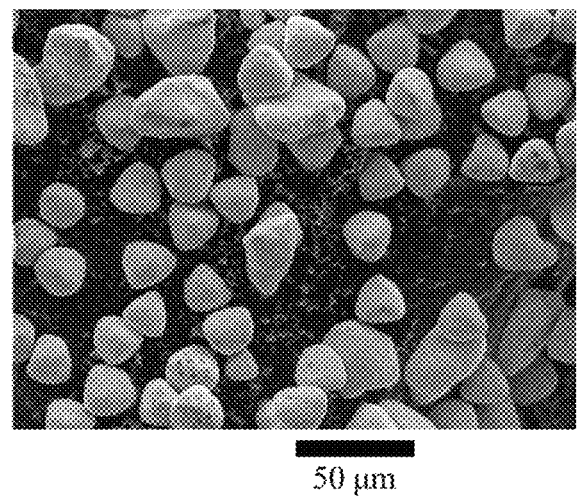
FIG. 13a  FIG. 13b
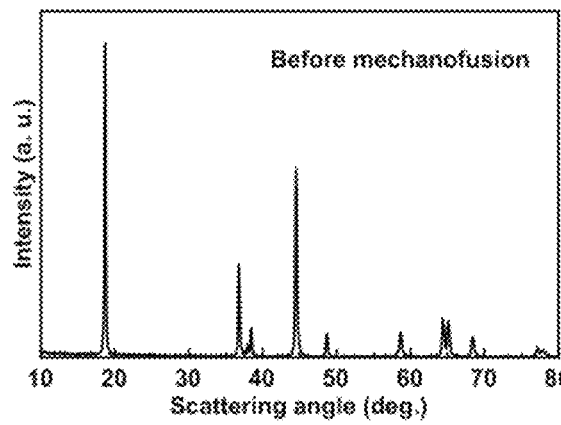
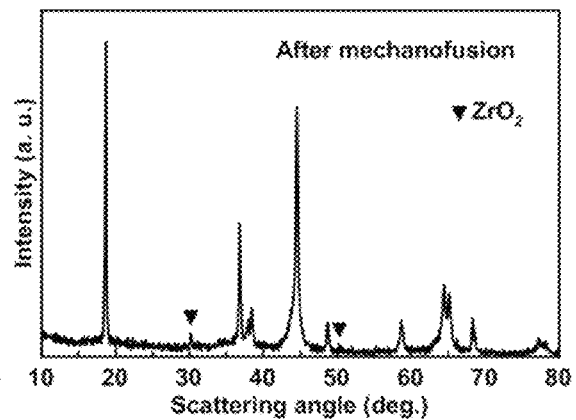
FIG. 14a  FIG. 14b
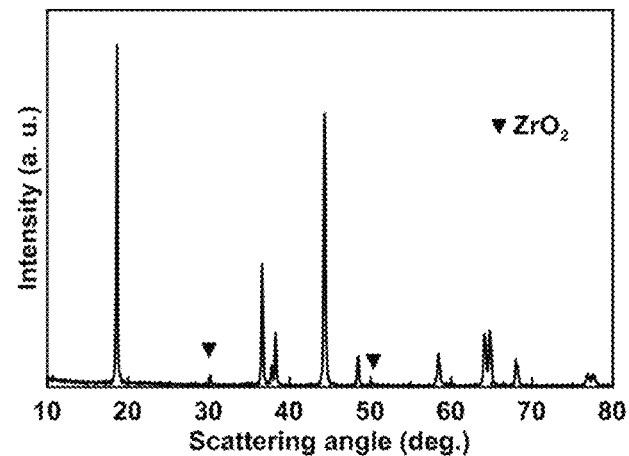
FIG. 14c

MICROGRANULATION METHODS AND PRODUCT PARTICLES THEREFROM

CROSS-REFERENCE TO RELATED APPLICATIONS

This application is a 371 national-stage application of International PCT Application No. PCT/US2020/043621, filed Jul. 24, 2020, which claims priority to U.S. Provisional Patent Application No. 62/893,787, filed Aug. 29, 2019; U.S. Provisional Application No. 62/946,938, filed Dec. 11, 2019; and U.S. Provisional Application No. 63/020,526, filed May 5, 2020, all of which are incorporated herein by reference in their entirety.

TECHNICAL FIELD

The present invention pertains to improved microgranulation methods for aggregating precursor particles into larger product particles with improved properties and, in some instances, novel structures. The product particles are useful as electrode materials in lithium batteries and other applications.

BACKGROUND

Numerous applications require powders consisting of dense particles in the micron size range (e.g. 1-100 µm) with narrow particle size distributions (e.g. active powders for battery electrodes, fertilizers, pharmaceuticals, toners, pigments, fillers, catalysts, etc.). In some of these applications spherical or rounded particles are desired. However, the manufacture of particles of uniform shape and size in the micron size range is difficult.

For instance, it can be desirable for the particles used in the manufacture of electrodes for rechargeable high energy density batteries, such as Li-ion batteries, to be spherical in shape and of uniform size. And given the substantial demand for these batteries, it is also of great importance to be able to provide significant and economic supplies of such materials. At present, the cathode particles for Li-ion batteries (e.g. lithium nickel manganese cobalt oxides or NMC) are often made by a co-precipitation process in a continuous flow tank reactor. This results in a broad particle size distribution because of the variable particle residence time of the particles in the reactor. In addition, careful process control and various chemical additives are required (e.g. chelating agents) in order to maintain an even precipitation rate of the different metal salts and to achieve a uniform spherical particle shape. Furthermore, after the co-precipitation process, the particles need to be separated from their mother liquor by filtration, washing, drying and blending with a lithium source prior to sintering, creating additional processing steps and energy, chemical, and water waste. The anode particles for Li-ion batteries are typically carbonaceous, e.g. graphite particles. Typically, to make battery-grade graphite from natural graphite, the natural graphite is first ground and classified in order to obtain a powder with the desired size distribution (~10-20 µm in diameter). The sized powders are then spheronized using a spheronizer. However, the spheronizing process is typically only 50-60% efficient, producing a mixture of the desired spheronized particles and fine particles less than 5 µm in diameter. The resulting mixture requires an additional classification step to separate the desired particles from the fine particles, which are typically disposed of as waste. Obviously then, a significant amount of the starting natural graphite is lost as a result.

Granulation is a method in which small particles may be aggregated into larger particles. Granulation methods include both wet and dry methods. Wet granulation methods include fluid bed, disc, drum, and mixer (e.g. via the use of pins, paddles and/or blades) methods. Such wet methods require the separation of the product particles from liquids and may require additional binders or dispersing agents. Dry granulation methods include roll pressing, tableting, ram/piston extrusion, pelleting mills, radial extrusion, and axial exclusion. However both wet and dry methods of granulation have difficulty in making uniform product particles less than 100 µm in diameter and the resulting product particles can often contain internal voids.

Other methods of producing micron-sized spherical or rounded particles including spray drying and prilling. During spray drying, a fluid comprising a liquid (typically water) and suspended particulates and/or dissolved species are sprayed through a nozzle to produce droplets. The fluid can further contain additives, such as wetting agents and binders. The droplets emitted from the spray nozzle are dried (e.g. by a flow of air) while still airborne and captured in a filter. This method can be expensive and wasteful, as it is typically energy intensive to remove the liquid during the drying step and the liquid is often lost as waste. The resulting powders are often porous and may need further processing (e.g. washing and filtering). Prilling is a method in which a molten liquid spray is solidified in-flight. This method is only applicable for materials that can form a molten state.

There is a need then for a dry granulation method at the micro-scale (i.e. microgranulation) in which small particles (e.g. ~1 µm or less) may be aggregated to form larger, dense, and uniform micron-sized particles that are spherical or rounded and where the method does not form a significant amount of waste fine particles. However, according to U.S. Pat. No. 9,132,482: "The extremely poor amount of literature on granulation of inorganic nanopowders demonstrates the difficulty in conditioning them in the form of granules."

Physical methods that employ dry processing are environmentally friendly and advantageous for industrial use because of the elimination of the use of solvents. The mechanofusion (MF) process was developed in Japan in the mid-1980s and is based on using a high shear field to spheronize or dry-coat powders without using any liquids (see T. Yokoyania, K. Urayama and T. Yokoyama, *KONA Powder Part. J.*, 1983, 1, 53-63). In the Li-ion battery field, MF is commonly used to spheronize natural graphite for use in negative electrodes (e.g. U.S. Pat. No. 9,142,832 or U.S. patent application Ser. No. 14/431,398).

Despite its usefulness in industry, MF has rarely been published in the literature. One reason for this may be because the parameters for the use of MF equipment are not widely known. Nonetheless, several publications describe particles that have been spheronized or coated with another phase by the MF method (e.g. M. Naito, M. Yoshikawa, T. Tanaka and A. Kondo, *KONA Powder Part. J.*, 1993, 11, 229-234, N. Product and M. Features, 1999, 17, 244-250, M. Alonso, M. Satoh and K. Miyanami, *Powder Technol.*, 1989, 59, 45-52, M. Naito, A. Kondo and T. Yokoyama, *ISIJ Int.*, 1993, 33, 915-924, R. Pfeffer, R. N. Dave, D. Wei and M. Ramlakhan, *Powder Technol.*, 2001, 117, 40-67, W. Chen, R. N. Dave, R. Pfeffer and O. Walton, *Powder Technol.*, 2004, 146, 121-136, and C.-S. Chou, C.-H. Tsou and C.-I. Wang, *Adv. Powder Technol.*, 2008, 19, 383-396). Still, few publications sufficiently describe the conditions under which such engineered particles were made.

An interesting type of graphitic material, known as "onion graphite", has been observed in the art. According to some, onion graphite refers to spherical or ovoid graphite particles where the graphite basal planes are arranged in nested ovoid or spherical smooth concentric layers centered around a common point in the core of the particle, and where the alignment of the edges of graphite sheets does not radiate from a central nucleus (to others, onion graphite refers to only to perfect nested buckyballs). In other words, the graphene layers in onion graphite are randomly positioned on the surface of the concentric nested spheres or ovoids, excepting that they are oriented such that their basal planes are tangential to the concentric nested spheres or ovoids. Onion graphite can be differentiated from graphite spheres in cast irons, which are known to have a microstructure in which the graphite basal planes are arranged concentrically, however the edges of the planes radiate from a central core (e.g. as shown in FIG. 6-4 of "Mesomolecules: From Molecules to Materials" SEARCH Series, Volume 1, G. David Mendenhall, Arthur Greenberg, and Jeol F. Liebman, eds., Chapman & Hall, New York, 1995.). Onion graphites have previously only been observed in sizes up to 2 μm. They have been found to form in interstellar space, as evidenced by their presence in meteorites. Nano-sized graphite onions have only been made previously in small quantities by synthetic means, for instance by the high electron irradiation of carbon particles, the annealing of nanodiamonds, an arc discharge between two graphite electrodes submerged in water, the carbon-ion implantation of silver or copper substrates (e.g. see V. D. Blank, B. A. Kulnitskiy and I. A. Perezhogin, Scripta Materialia, 60 (2009) 407-410.) None of these methods can make particles above 2 μm in size, in bulk (i.e. greater than 1 gram quantities), in a high state of graphitization, and in a way that is economically practical. For instance, US patent application 2013/0189178 A1 describes a method to manufacture onion-like carbon, however the maximum size of the carbon onions achieved is only 6 nm. Furthermore, the level of graphitization achieved is not mentioned.

Despite this continuing and substantial global effort directed at developing improved methods of manufacture of such materials, there remain a need for further improvement. The present invention addressed these needs and provides further benefits as disclosed below.

SUMMARY

It has been discovered that certain high shear and high pressure field processes, such as dry mechanofusion (MF), can be used to prepare desirable aggregates from a variety of precursor particles in a simple manner and with efficient use of the precursor particles. The aggregated precursor particles ("product particles") can desirably be made in narrow particle size distributions and in smooth, spherical or rounded shapes that are free from cavities. In some aspects, cavities can be included within the product particles.

Specifically, the product particles are made using a microgranulation method involving the steps of: obtaining an amount of precursor particles having an average particle size less than 1000 μm, obtaining an amount of templating media having an average particle size less than 500 μm and a hardness greater than that of the precursor particles, and then preparing a mixture comprising the amounts of precursor particles and templating media. This mixture is then subjected to an appropriate high shear and high pressure field, such as that obtained via mechanofusion, such that the precursor particles are aggregated into desirable product particles. The product particles can then be separated from the templating media if desired for an intended application.

The aforementioned method can be successfully used on numerous types of precursor particles having a wide range of properties. This includes precursor particles with an average size of less than 50 μm, and particularly less than 10 μm. Suitable types of precursor particles include powders intended for use (either directly or after subsequent processing) in battery electrodes, fertilizers, pharmaceuticals, toners, pigments, fillers, or catalysts. As demonstrated in the Examples below, suitable precursor particles include carbonaceous powders, mixed metal oxide powders or metal carbonate powders, e.g. a carbon, graphite flakes or $LiNi_{1/3}Mn_{1/3}Co_{1/3}O_2$ powder. Advantageously, mixed metal oxide powders used as precursor particles may be made by an all-solid-state method comprising ball milling an amount of metal oxide raw material powders to produce the precursor particles. (Note for instance that the precursor particles used in the following Examples were not suitable for use per se in battery electrodes but can be made suitable for such use by microgranulation processing and optionally by subsequent processing steps, e.g. by heating.) Further and in general, at least a portion of the amount of precursor particles may be processed in some suitable manner prior to preparing the mixture (including ball milling or heating).

While the inventive method desirably produced spherical and/or rounded aggregate, the starting precursor particles can be quite irregularly shaped powders. In addition, while the inventive method desirably produces powders with a narrow particle size distribution, the particle size distribution of the starting precursor particles can be quite large.

The resulting characteristics of the product particles obtained are in part a function of those of the templating media employed. As mentioned, the hardness of the templating media is greater than that of the precursor particles so as not to break down the former. Suitable templating media may thus be selected from the group consisting of zirconium oxide, tungsten carbide, tungsten, silicon oxide, aluminum oxide, silicon nitride, hardened steel, stainless steel, and agate. To produce product particles of desirable size and shape, templating media whose average size is 100 μm or smaller may be employed. Further, the surface of the templating media may desirably be smooth and spherically shaped. In addition, it is desirable for the size distribution of the templating media to be uniform, e.g. such that (D90−D10)/D50<2, preferably (D90−D10)/D50<1 or more preferably (D90−D10)/D50<0.7. Further, it can be desirable for the bulk volume of the amount of templating media employed to be greater than that of the bulk volume of the amount of precursor particles employed, and particularly greater than or about three times that of the bulk volume of the amount of precursor particles.

A mechanofusion system suitable for use in the inventive method can comprise a chamber, a rotating wall within the chamber, a scraper within the rotating wall, and a press-head within the rotating wall. A representative gap between the scraper and the rotating wall may be about 0.5 mm. A representative gap between the press-head and the rotating wall may be about 1.4 mm. And a representative speed for rotating the rotating wall is one that results in wall surface speeds of about 8 m/s. In some embodiments, mechanofusing times of greater than or about 12 hours have proved to be successful. Shorter processing times may be achieved if the templating media already coated with precursor from a previous synthesis are reused in a new synthesis. While the aforementioned system produces product in batch form, advantageously mechanofusion can also be performed in a continuous manner (for instance with suitable modifications to such a system).

In exemplary embodiments, product particles can be produced whose average size is between 10 and 100 µm. Further, the size distribution of exemplary product particles can be sufficiently uniform such that (D90–D10)/D50<2. Further still, the surface of the product particles may desirably be smooth. In some aspects of the invention the product particles comprise particles having a roughness (as defined below) less than 0.02, less than 0.01, less than 0.006 or even smaller. In some aspects of the invention all the product particles essentially have roughness values less than 0.02, less than 0.01, less than 0.006 or even smaller. In some aspects of the invention, the product particles comprise particles that are essentially free from cavities. In some aspects of the invention, all the product particles are essentially free from cavities And as demonstrated in the Examples below, product particles can be made that are spherically shaped or tetrahedrally shaped.

Optionally, the complete preparation of product particles may additionally comprise an annealing step at an elevated temperature (for instance to recrystallize the particles following mechanofusion).

The product particles made according to the inventive method may be considered for use in numerous commercial applications including as a battery electrode, a fertilizer, a pharmaceutical, a toner, a pigment, a filler, or a catalyst. They can be particularly suitable for use in anode or cathode electrodes in rechargeable lithium batteries, e.g. lithium ion batteries.

It has further been discovered that the aforementioned methods can be used to prepare novel structures of graphite particulate, lithium nickel manganese cobalt oxide particulate, and lithium transition metal oxide particulate.

In one aspect, a novel graphite particulate comprises graphite particles in which the graphite particles are shaped as spheres or ovoids and they comprise concentric nested spheres or ovoids of graphene layers. These graphene layers are randomly positioned on the surface of the concentric nested spheres or ovoids, except that the graphene layers are oriented such that their basal planes are tangential to the concentric nested spheres or ovoids. The graphite particles further have an average particle size greater than 2 µm and an average $d_{002}$ spacing of less than 3.400 Å. In some embodiments, the graphite particles in the particulate comprise concentric layers of porosity with a void or hollow near its core. In some embodiments, the graphite particles have an average particle size between 5 µm and 50 µm and a size distribution of (D90–D10)/D50<2.

In one aspect, a novel lithium mixed metal oxide particulate comprises particles having a core of lithium nickel manganese cobalt oxide crystallites that are randomly oriented and have an average size of about 1 µm coated with smaller randomly oriented lithium nickel manganese cobalt oxide crystallites that have an average size of about 0.3 µm.

The preceding novel lithium transition metal oxide particulate comprises particles having at least two transition metals present from the group consisting of Mn, Ni, and Co. Further, the particles have an O3 structure, an average particle size ranging from 1 to 50 µm, and they comprise crystallites that vary randomly in shape and size throughout their interior. In certain embodiments, the crystallites have an average size greater than 0.5 µm and the average particle size of the particles is more than 5 times larger than the average crystallite size. In certain embodiments, the composition of one of the two transition metals can vary from the core of the particles to the shell of the particles by at least 5 atomic %.

The method can be used to make product particles of uniform composition but also can be used to make product particles having different compositions near their core than near their surface. The precursor particles employed may be a single phase or they may consist of a mixture of particles having different characteristics. For instance, the precursor particles may consist of a mixture of first particles of a first composition and second particles of a second composition in which the first and second compositions are different and/or in which the first and second particles have comprise crystallites with different average crystallite sizes (e.g. in which the average crystallite size of the first precursor particles differs from the average crystallite size of the second precursor particles by at least 10%).

Suitable precursor particles for the formation of graphite product particles include graphitizable carbons, such as natural graphite, coke, and soft carbons. Suitable precursor particles for the formation of product particles useful as cathode materials in Li-ion batteries include hydroxides, oxides, sulfates, nitrates, and carbonates of lithium, aluminum, magnesium, transition metals, and mixtures thereof. In the case of lithium nickel manganese cobalt oxide product particles, suitable precursor particles are lithium nickel manganese cobalt oxide particles. In the case of lithium transition metal oxide product particles, suitable precursor particles are lithium transition metal oxide particles.

BRIEF DESCRIPTION OF THE DRAWINGS

FIG. 1 schematically shows a mechanofusion system suitable for use in the microgranulation method of the invention.

FIGS. 2a and 2b show SEM images of the $ZrO_2$ templating media used in the Examples at two different magnifications.

FIGS. 4a and 4b show SEM images of the graphite flake precursor particles used in the Examples at two different magnifications.

FIGS. 5a and 5b show SEM images at two different magnifications of the product obtained after mechanofusing the mixture of graphite flake precursor particles and $ZrO_2$ templating media.

FIG. 10a shows a complete section of a product particle while FIGS. 10b and 10c show different portions of a product particle at greater magnification.

FIGS. 11a and 11b show SEM images at two different magnifications of the NMC precursor particles used in the Examples and which had been synthesized using an all-solid-state method.

FIGS. 12a and 12b show SEM images at two different magnifications of the product obtained after mechanofusing the mixture of NMC precursor particles and $ZrO_2$ templating media.

FIGS. 13a and 13b show SEM images at two different magnifications of the tetrahedral shaped NMC product particles in FIGS. 12a and 12b after separating them from the $ZrO_2$ templating media.

FIGS. 14a, 14b, and 14c show the XRD patterns patterns between 10° and 80° of the NMC precursor particles before mechanofusing, the tetrahedral shaped NMC product particles after mechanofusing and separation from the templating media, and the NMC product particles after annealing respectively.

FIG. 17a shows a complete section of a product particle while FIGS. 17b, 17c and 17d show different portions of a product particle at several greater magnifications.

DETAILED DESCRIPTION

Figure 2C:
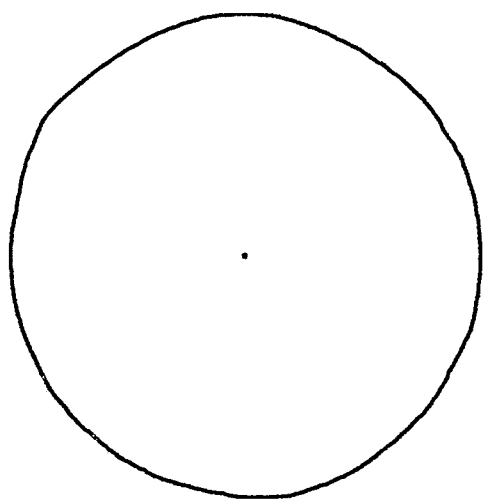
FIG. 2c shows a cross section of a $ZrO_2$ particle with its perimeter and centroid shown.

Unless the context requires otherwise, throughout this specification and claims, the words "comprise", "comprising" and the like are to be construed in an open, inclusive sense. The words "a", "an", and the like are to be considered as meaning at least one and are not limited to just one.

In addition, the following definitions are to be applied throughout the specification:

Herein, the term "high shear and high pressure field" refers to shear and pressure conditions similar to those experienced during typical mechanofusion processes.

With regards to a plurality of particles, the term "irregularly shaped" is intended to refer to both individual particles of irregular shape but also mixtures of otherwise regularly shaped particles with no shape in common.

Particle size distributions of a given sample are quantified herein by its "Dn" diameter. This is conventionally defined as the diameter at which n % of the sample's mass has a smaller particle size.

The term "average size" of a group of particles is thus defined as its D50 diameter.

The term "projected area diameter" of a particle is the diameter of a circle with the same area as the projected image of the particle (i.e. its silhouette) or the particle's cross section, where the cross section passes near the particle's centroid.

The term "cavity" or "cavities" is used to refer to depressions on particle surfaces having both a relative depth in the range of 0.02 and 0.1 and a relative aspect greater than 0.2. The methods for quantifying relative depth and relative aspect are provided under Material Characterization in the following Examples.

The term "roughness" is used to refer to the coefficient of variation as determined by the spline variation method described under Material Characterization in the following Examples.

The term "smooth" refers to a particle whose roughness is less than 0.02.

The term "spherical" is used to refer to a particle whose surface does not vary in distance from the particle centroid by more than 25%.

The term "particulate" refers to a plurality of particles or aggregated particles.

In a quantitative context, the term "about" should be construed as being in the range up to plus 10% and down to minus 10%.

The term "anode" refers to the electrode at which oxidation occurs when a metal-ion cell is discharged. In a lithium ion cell, the anode is the electrode that is delithiated during discharge and lithiated during charge.

The term "cathode" refers to the electrode at which reduction occurs when a metal-ion is discharged. In a lithium ion cell, the cathode is the electrode that is lithiated during discharge and delithiated during charge.

The term "metal-ion cell" or "metal-ion battery" refers to alkali metal ion cells, including lithium ion cells and sodium ion cells.

The term "half-cell" refers to a cell that has a working electrode and a metal counter/reference electrode. A lithium half-cell has a working electrode and a lithium metal counter/reference electrode.

The term "active material" refers to a material that can reversibly store metal ions in an anode or cathode.

The terms "anode active material" or "anode material" refer to an active material that is used to reversibly store metal ions in an anode. In a Li-ion cell, anode materials are lithiated during charge and delithiated during discharge at potentials less than 2 V vs. Li. In a Li half-cell, anode materials are delithiated during charge and lithiated during discharge at potentials less than 2 V vs. Li.

The terms "cathode active material" or "cathode material" refer to an active material that is used to reversibly store metal ions in a cathode. In a Li-ion cell, cathode materials are lithiated during discharge and delithiated during charge at potentials greater than 2 V vs. Li. In a Li half-cell, cathode materials are delithiated during charge and lithiated during discharge at potentials greater than 2 V vs. Li.

The term "cross-section" is understood to refer to a cross-section that passes near a particle's centroid.

The term "average crystallite size" refers to the grain size of a phase as determined by the Scherrer crystallite size determination method as described in more detail below. (Note that in principle the average crystallite size can be determined not only by X-ray diffraction techniques but also from SEM images. In the former, known as the Scherrer grain size determination method, the Scherrer equation is applied to the x-ray diffraction peak FWHM of any one of a phase's x-ray powder diffraction peaks between 20° and 60° 2-theta under incident Cu-K$\alpha$1 radiation. A description of the Scherrer equation may be found in "X-ray Diffraction" by B. E. Warren, Dover Publications (1990). In the latter, average crystallite size is determined from the average of the crystallite sizes of a random sampling of crystallites observed by scanning electron microscopy.)

Herein the term "O3 phase" refers to a phase having a $\alpha$-NaFeO$_2$ type structure, as described in C. Delmas, C. Fouassier, and P. Hagenmuller, Physica, 99B (1980) 81-85. As an example, LiCoO$_2$ which is used extensively as an active positive electrode material in commercial Li-ion batteries has an O3 structure. X-ray diffraction may be used to determine the structure of phases in a sample, including if a material comprises a phase having the O3 structure or a phase having the graphite structure.

It has been discovered that the high shear and high pressure fields associated with mechanofusion (MF) dry processing methods can be employed to produce uniform aggregates from a variety of precursor particles. The MF process is relatively simple and inexpensive. Most of the precursor particles get incorporated into product particles and thus there is efficient use of precursor particles. Further, the MF process is a dry process and requires no solvents thereby making it potentially attractive for environmentally responsible commercial manufacture. The required steps merely include obtaining suitable amounts of precursor particles and templating media, and mechanofusing a mixture of these amounts for a sufficient time to suitably generate aggregate particulate. After mechanofusion processing, the product particles may be separated from the templating media by air classification, sieving, cyclone, elutriation, sedimentation, hydrocyclone or other wet or dry methods that are known to separate particles based on size, shape or density.

FIG. 1 schematically shows a suitable MF system 1 for preparing particulate according to the method of the invention. It consists of rotating cylindrical chamber 2 in which fixed rounded press-head 3 and fixed scraper 4 are placed. The radius of press-head 3 is smaller than that of chamber 2 and the clearance space between press-head 3 and chamber wall 5 generally ranges from 1 to 5 mm. The clearance between scraper 4 and chamber wall 5 is smaller, usually around 0.5 mm. Preferably these clearances are adjustable for optimization, depending on factors such as the chamber size, particle size, powder hardness, and so on.

Operation of MF system 1 is simple, but the mechanism by which powder is processed within the chamber is complex (see W. Chen, R. N. Dave, R. Pfeffer and O. Walton, *Powder Technol.*, 2004, 146, 121-136). In use, powder mixture 6 (comprising suitable amounts of precursor particles and templating media) is placed into the chamber and chamber 2 is sealed. When the chamber rotates, powder mixture 6 is forced to chamber wall 5 by centrifugal action. This also forces the powder mixture to pass through the converging space between fixed press-head 3 and rotating chamber wall 5, establishing a high-shear and high pressure field. As the powder particles come out of the diverging space of the press-head region, they adhere to each other and to the chamber wall. Scraper 4 serves to scrape off the powder attached to chamber wall 5. The sheared powder mixture is then re-dispersed into the chamber and moves towards the press-head region again. The powder continuously undergoes this process of compression, frictional shearing, and de-agglomeration while chamber 2 is rotating. These interactions result in various effects, including spheronization, the coating of small or soft particles onto large particles, and the embedding of small particles into the large particles. At the high rotation speeds typically utilized (>1000 rpm or wall surface speeds greater than about 8 m/s), these effects occur quickly.

As those skilled in the art will appreciate, appropriate operating parameters for the MF system can be expected to vary according to the product particles desired and on the types and amounts of the precursor particles and templating media employed. It is expected that those of ordinary skill will readily be able to determine appropriate operating parameters for a given situation based on guidance provided in the Examples below.

The method of the invention may be used to aggregate a variety of types of precursor particles into larger, uniform product particles. In principle, an amount of any precursor particles having an average particle size less than 1000 μm may be aggregated. [Note that it is possible in principle to start with larger, up to 1000 μm, particles because it is expected that they will be reduced in size during processing. Thus, precursor particles larger than the templating media may be employed. Such particles can be ground to smaller size in-situ during the processing.] The method is particularly suitable for making product particles whose average size is less than 100 μm and even smaller (e.g. less than 50 μm or even less than 10 μm).

As demonstrated in the Examples below, powders for use in battery electrodes may be aggregated via the inventive method. Such precursor powders include both anode active and cathode active materials such as carbonaceous powders (e.g. graphite flakes) or conventional mixed metal oxide powders (e.g. NMC or $LiNi_{1/3}Mn_{1/3}Co_{1/3}O_2$) powder. Suitable precursor powders also include unconventionally prepared mixed metal oxide powders, such as those prepared using a novel all-solid-state method in which an appropriate mixture of metal oxide raw material powders is ball milled to produce the mixed metal oxide precursor particles. In addition however, it is expected that similar aggregates of powders commonly intended for use as fertilizers, pharmaceuticals, toners, pigments, fillers, or catalysts in other industrial applications can readily be prepared in a similar way. A useful feature of the inventive method is that no special shape or particle size distribution is required of the starting precursor particles in order to obtain desirable end product. The precursor particles may have a regular shape or alternatively be irregularly shaped powders and may have narrow, broad or multimodal size distributions.

The microgranulation method of the invention generally involves preparing a mixture of the chosen amount of precursor particles with an appropriate amount of templating media. The templating media generally has an average particle size less than 500 μm and is selected so as to have a hardness greater than that of the precursor particles. In this way, the templating media is not broken up itself under the high shear and pressure conditions involved in the method. Suitable material choices for the templating media include zirconium oxide, tungsten carbide, tungsten, silicon oxide, aluminum oxide, silicon nitride, hardened steel, stainless steel, and agate. Further, the templating media is preferably regular, smooth, and spherical in shape because it otherwise would be more likely to break down, and particularly to break down into spheres anyway, during processing and thereby contaminate the end product.

The size, uniformity, and amount of the templating media employed can also be important with regards to the characteristics of the desired end product particulate. It is expected for the aggregate end product particles to be somewhat smaller but of order of the size of the templating media used. Thus, for smaller aggregates, it can be desirable for the average particle size of the templating media to be less than 100 μm. Further, it is expected that the uniformity of the end product particulate would roughly be analogous to that of the templating media used. For a desirably uniform end product, it can be thus be desirable for the size distribution of the templating media to be sufficiently uniform such that its (D90–D10)/D50<2, preferably (D90–D10)/D50<1, more preferably (D90–D10)/D50<0.7 or its (D90–D10)/D50 is even smaller. Further, a sufficient amount of templating media should be employed in the method in order to fully and successfully process all the precursor particles present.

In this regard, in some embodiments the bulk volume of the amount of templating media is desirably greater than that of the bulk volume of the amount of precursor particles. More specifically, when employing uniform, spherical templating media, the relevant amounts in the mixture are preferably chosen such that the volume of precursor particles can fit into the void volume existing between randomly packed templating media spheres (which is about ⅓ of the bulk volume of the spheres). Thus, a 1:3 bulk volume ratio of small precursor particles to templating media can be preferred (i.e. the bulk volume of the amount of templating media is preferably greater than or about three times that of the bulk volume of the amount of precursor particles).

The microgranulation processing itself involves subjecting the appropriate mixture comprising the amounts of precursor particles and templating media to mechanofusion or other equivalent high shear and high pressure fields. This step serves to aggregate the precursor particles into the product particles. Mechanofusing can, for instance, be performed in the mechanofusion system of FIG. 1. Representative settings for processing include gaps of about 0.5 mm between the scraper and the rotating wall and of about 1.4 mm between the press-head and the rotating wall. Representative rotation speeds are of order of 1000 rpm and higher, which result in wall surface speeds of about 8 m/s or higher. Mechanofusion processing times of greater than or about 12 hours have been shown to be sufficient. Less processing time may be achieved when different sample volumes, rotation speeds, powder ratios are used or if the templating media is recycled.

In mechanofusing processing, the precursor particles and template particles are in a vacuum or a fluid environment, typically a gas atmosphere. In a simple embodiment, the gas atmosphere is air. In other embodiments however, the gas atmosphere may be an inert gas, such as argon or nitrogen. Further, the gas atmosphere may be reducing and may comprise hydrogen or ammonia, for instance a mixture of 5% hydrogen gas and 95% nitrogen gas. Further, the gas atmosphere may be oxidizing and may comprise an oxidizing gas, such as oxygen or carbon dioxide.

While the mechanofusion system shown in FIG. 1 and discussed above is used to prepare product particles in a batch process, it is possible to modify the equipment such that preparation may be done continuously instead. For instance, during mechanofusion, particles may be continuously drawn from the mechanofusion machine in a particle stream. The desired product particles may then be separated from the particle stream by a continuous classification process and collected. The remaining unprocessed precursor particles and templating media in the particle stream may then be returned to the mechanofusion machine. Additional precursor particles may also be continuously added to the mechanofusion machine to replace the product particles removed by classification. In this way product particles may be continuously produced and collected.

After the mechanofusing or equivalent processing step is completed, the product particles are then separated from the templating media. This may be accomplished in a variety of conventional ways. For instance, if the product particles and templating media are sufficiently uniform yet different in size, adequate separation can simply be achieved by sieving. Alternatively, if the product particles and templating media are sufficiently different in density, density separation techniques may be employed (e.g. as demonstrated in the Examples in which dense, $ZrO_2$ microspheres were used as templating media and then readily separated from significantly less dense product particles using a density separation technique). Methods of separating the product particles from the templating media include air classification, sieving, cyclone, elutriation, sedimentation, hydrocyclone or other wet or dry methods that are known to separate particles based on size, shape or density.

It has been observed that some loss of crystallinity associated with the precursor particles may occur as a result of the mechanical treatment involved in this method. If desired and/or required, this loss can readily be corrected by annealing (heating) the product particles at elevated temperature and in an environment appropriate for the material involved (e.g. an inert atmosphere for carbonaceous powder or alternatively air for oxide powder).

In some embodiments, the synthesis of precursor particles may include a step that reduces average particle size, for example by grinding, including ball milling or classifying. In some embodiments, the synthesis of precursor particles may include a step that reduces crystallite size, including ball milling. In some embodiments, the synthesis of precursor particles may include a step that increases crystallite size, including a heating step or a classifying step. In some embodiments, the synthesis of precursor particles may include a step of reacting more than one constituent together, including co-precipitation, heating, ball milling or other known methods. In some embodiments, the synthesis of precursor particles may include a step of combining particles with different average crystallite sizes and different compositions together.

In some embodiments, applying the above microgranulation methods to template particles and precursor particles comprising a mixture of precursor particles having different crystallite sizes, results in product particles having on average larger precursor particle crystallites near the product particle core and smaller precursor particle crystallites near the product particle surface. Moreover, in some embodiments, if a mixture of precursor particles of different chemical compositions is used that contains precursor particles of one composition having an average crystallite size that is larger than the average crystallite size of precursor particles of another composition, then product particles result in which the product particle core has a composition that more closely resembles the composition of the precursor particles with the larger crystallite size and the product particle surface has a composition that more closely resembles the composition of the precursor particles with the smaller crystallite size. In theory, product particles having continuously varying composition can be made by applying the above methods to mixtures of template particles and precursor particles, the precursor particles comprising mixtures of precursor particle powders having different compositions and average crystallite sizes, such that the composition of the product particles varies from their surface to the core according to the order of increasing average crystallite size of each precursor particle powder.

The precursor particles may also comprise particles with different compositions, so that composite product particles comprising an aggregated mixture of precursor particles with different compositions are produced. In some embodiments composite product particles may be heated so that the constituent precursor particles react with each other.

Product particles can be prepared in this manner whose average size is between 10 and 100 μm. Further, the product particles can be very uniform in size with narrow particle size distributions similar to that of the templating media employed. For instance, the size distribution of the product particles can be uniform such that (D90−D10)/D50<2, (D90−D10)/D50<1, (D90−D10)/D50<0.7 or even smaller.

Further still, the product particles can desirably be smooth and formed into regular, rounded shapes such as spheres and rounded tetrahedrons. The product particles may further contain no features having both a relative depth in the range of 0.1 and 0.2 and a relative aspect greater than 0.2.

Once prepared as in the preceding manner, product particles are generally ready for conventional use in its intended application. In battery applications, electrodes and electrochemical devices employing product particles may be prepared in numerous manners known to those in the art. For instance, there are numerous optional designs and methods for making electrodes for rechargeable lithium ion batteries as well as for making the batteries themselves and these have been documented extensively in the art.

Mechanofusing methods have been found to be effective in preparing uniform rounded aggregate in this manner, whereas other conventional granulation methods such as auto-grinding and ball milling process do not. Without being bound by theory, in the present method, it is believed that the precursor particles initially coat the templating media. However, because of the smoothness of the templating media, the precursor particles adhere poorly to the templating media. Therefore after a certain thickness is reached, the layer of precursor particles spalls off the templating media. This results in the formation of intermediate particles of relatively uniform volume. These intermediate particles are then spheronized to form the product particles. This process therefore relies on the ability of the mechanofusion process to form dense coatings on particles. This is only possible in the high shear and high compression fields present during the mechanofusion process. Other processes, such as grinding, milling, and high shear mixing, were found not to have this property and therefore did not produce equivalent product particles.

An additional discovery related to the present methods is that some of the product particles that may be prepared are characterized by novel, potentially useful structures. These include graphite product particles, lithium mixed metal oxide product particles, and lithium transition metal oxide product particles which are characterized by unique structures. For instance, graphite particulate can be prepared which comprises graphite particles shaped as spheres or ovoids and which comprise concentric nested spheres or ovoids of graphene layers. These graphene layers are randomly positioned on the surface of the concentric nested spheres or ovoids, except that the graphene layers are oriented such that their basal planes are tangential to the concentric nested spheres or ovoids. The graphite particles further can have an average particle size greater than 2 μm and an average $d_{002}$ spacing of less than 3.400 Å. In some embodiments, the graphite particles in the particulate comprise concentric layers of porosity with a void or hollow near its core. In some embodiments, the graphite particles have an average particle size between 5 μm and 50 μm and a size distribution of (D90−D10)/D50<2.

The aforementioned graphite particulate and also highly graphitic onion graphites are expected to be advantageous for use as an active negative electrode material in Li-ion batteries. It is well known that the basal planes of graphite are sites of high reactivity with Li-ion battery electrolyte. Therefore, natural graphites are typically spheronized to reduce the surface area of basal planes in contact with the electrolyte, as discussed in M. Yoshio et al., J. Mater. Chem. 14 (3005) 1754-1758. However, conventional spheronization methods result in the graphite planes to be curled in a spiral, with the same arrangement as a jellyroll or as described by M. Yoshio et al.: "the spherical natural graphite particles look like clenched fists." In other words, the graphite layers in conventionally spheronized natural graphite particles are arranged concentrically around a central axis (i.e. nested concentric cylinders) rather than concentrically around a point, as in the case of onion graphite (i.e. nested concentric spheres or ovoids). Although the arrangement of the graphite basal planes in spherical natural graphite reduces the amount of graphite basal planes exposed to the electrolyte, graphite basal planes remain exposed at either end of the "jellyroll". To reduce the reactivity of the exposed basal planes, spherical natural graphites are typically carbon coated, as described by M. Yoshio et al. In contrast, the microstructure of onion graphite has no basal planes exposed to the electrolyte and is therefore expected to have improved performance as a negative electrode material in a Li-ion battery. Onion graphite is also expected to be superior to the type of graphite spheres found in cast irons, which are known to have a microstructure in which the graphite basal planes are arranged concentrically, however the planes radiate from a central core (e.g. as shown in FIG. 6-4 of "Mesomolecules: From Molecules to Materials" SEARCH Series, Volume 1, G. David Mendenhall, Arthur Greenberg, and Jeol F. Liebman, eds., Chapman & Hall, New York, 1995.). In this construct, the electrolyte is expected to have access to the graphite basal planes along radial lines separating the basal planes extending from the particle core to surface. To be practical in a Li-ion battery application, the size of the onion graphite should be greater than 5 μm or more advantageously between 10 μm and 50 μm in size. In addition, the onion graphite should have a high level of graphitization, which is known to improve reversible capacity and reduce cell polarization. A measure of the level of graphitization is the $d_{002}$ spacing of graphite, as measured by x-ray diffraction, where the lower the value of the $d_{002}$ spacing, the greater the degree of graphitization. A preferred level of graphitization is indicated by a $d_{002}$ spacing of less than 3.400 Å or more preferably less than 3.360 Å or even more preferably less than 3.350 Å.

Also for instance, lithium mixed metal oxide particulate can be prepared which comprises particles having a core of lithium nickel manganese cobalt oxide crystallites that are randomly oriented and have an average size of about 1 μm coated with smaller randomly oriented lithium nickel manganese cobalt oxide crystallites that have an average size of about 0.3 μm. In some embodiments, lithium mixed metal oxide product particles are in the form of smooth tetrahedra.

Further for instance, lithium transition metal oxide particulate can be prepared which comprises particles having at least two transition metals present from the group consisting of Mn, Ni, and Co. These particles have an O3 structure, an average particle size ranging from 1 to 50 μm, and they comprise crystallites that vary randomly in shape and size throughout their interior. In certain embodiments, the crystallites have an average size greater than 0.5 μm and the average particle size of the particles is more than 5 times larger than the average crystallite size. In certain embodiments, the composition of one of the two transition metals can vary from the core of the particles to the shell of the particles by at least 5 atomic %.

The following examples are illustrative of certain aspects of the invention but should not be construed as limiting the invention in any way. Those skilled in the art will readily appreciate that other variants are possible for the methods and materials produced herein.

EXAMPLES

Exemplary particulates were prepared using mechanofusion to aggregate precursor particles in accordance with the invention. Other particulates were also prepared for comparison purposes. Various characteristics of these particulates were determined and presented below. In addition, electrodes and electrochemical cells were prepared using some of these particulates. The cell performance results obtained from the electrochemical cells are also presented below.

Microgranulation Method (Mechanofusion)

In the following, microgranulation was accomplished using an AM-15F Mechanofusion System (Hosokawa Micron Corporation, Osaka, Japan) schematically as depicted in FIG. 1. This equipment was modified by replacing the standard stainless steel chamber, scraper, and press head with identical hardened steel parts to reduce wear. The chamber had a 15 cm inner diameter. Unless otherwise indicated, mechanofusion was conducted at high rpm with a 0.5 mm scraper/wall gap and a 1.4 mm press-head/wall gap. Samples were collected after a given process time from several different areas in the chamber. Unless otherwise indicated, the gas atmosphere used during mechanofusion processing was air.

Material Characterization

Particle size distributions of particulate samples were obtained using a Horiba Partica LA-950V2 laser scattering particle size distribution analyzer.

X-ray diffraction (XRD) patterns were collected using a Rigaku Ultima IV diffractometer equipped with a Cu Kα X-ray source, a diffracted beam graphite monochromator and a scintillation detector.

Average crystallite sizes of different phases were determined by applying the Scherrer equation to the largest XRD peak of the phase in question, unless otherwise specified.

SEM and cross-sectional SEM were used to study sample morphology. In this regard, a TESCAN MIRA 3 LMU Variable Pressure Schottky Field Emission Scanning Electron Microscope (SEM) was used. Cross-sections of sample were prepared with a JEOL Cross-Polisher (JEOL Ltd., Tokyo, Japan) which sections samples by shooting argon ions at them.

Figure 19:
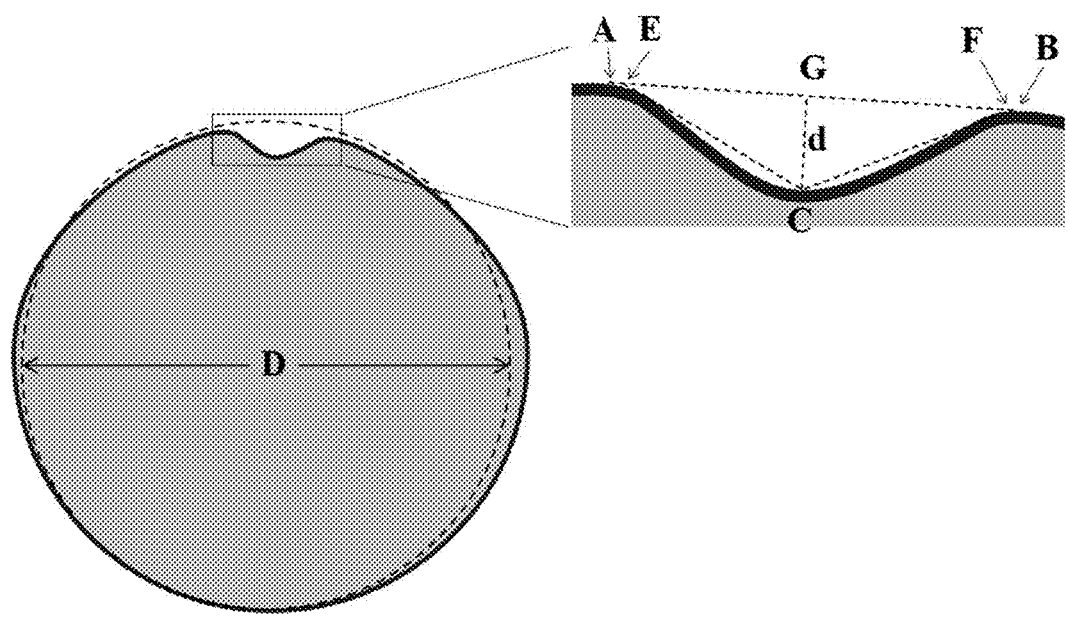
FIG. 19 illustrates the various dimensions involved in characterizing particle surface cavities from particle cross-sections or projected areas.

In order to characterize particle surface cavities, the relative depth and relative aspect of depressions on particle surfaces are measured from particle cross-sections or projected areas (i.e. silhouettes) as follows. As illustrated in FIG. 19, a line AB is made above a depression on the particle surface with both ends tangent to the particle surface. The longest distance as measured perpendicularly from line AB to the particle surface (line GC) is referred to as the feature depth, d. Two lines are drawn from the point C such that they contact the surface contact line AB and have the largest acute angle possible between them without passing into the particle volume (lines EC and CF in Figure a). The relative depth of the particle is defined as d/D, where D is the projected area diameter. The relative aspect is defined as {(EC+FC)/EF−1}. Surface cavities are those features having both relative depths in the range of 0.02 and 0.1 and relative aspects greater than 0.2.

A spline variation method is used to determine particle roughness. By this method, the particle roughness is determined by quantifying the variation in the radius of the surface as measured from the centroid. In this method, a scanning electron microscope (SEM) digital image of a cross-section or silhouette of the desired particle is obtained having a minimum image resolution such that at least 1000 image pixels reside on the perimeter of the particle. After the 1000 or more outlining pixels of the SEM image are determined, the centroid of this outlined silhouette is found. Next, the distances from each point on the outlined silhouette to the centroid, "radial segment values", are measured. The radial segment values are then plotted as a function of angle around the centroid between 0° and 360, and this plot is fit to a smoothing spline function $\Sigma_{i=1}^{n}\{Y_i-f(x_i)\}^2+\lambda \int f'''(x)^2 dx$ where $x_i$ is the angle value, $Y_i$ are the radial segment values, f(x) is the cubic smoothing spline function (as described on pg. 17 of P. J. Green, Bernard. W. Silverman, Nonparametric Regression and Generalized Linear Models: A roughness penalty approach, copyright 1994 by P. J. Green and B. W. Silverman, CTC Press reprint 2000), and λ is the smoothing parameter which is greater than or equal to zero in general but in this case is fixed to be 999. The number of radial segment values is then reduced to 1000 by linear interpolation, such that each interpolated radial segment value associated with a particular angle x is calculated as the average of the maximum number of unique radial segment values that are closest that angle. The number of f(x) values also reduced to 1000 by linear interpolation in the same way, such that for each interpolated radial segment value there is an interpolated f(x) value at the same value of x. The coefficient of variation is then determined as the standard deviation divided by the mean radius of the interpolated radial segment values and the interpolated f(x) values a function of x. The coefficient of variation is identified with the surface roughness, having a value is always greater than or equal to zero (i.e. zero being the roughness of a perfect circle). The larger the coefficient of variation, the rougher the particle.

Electrode Preparation

Sample electrodes for laboratory testing were prepared from slurries prepared by mixing the prepared particulate, carbon black (Super C65, Imerys Graphite and Carbon) and lithium polyacrylate (LiPAA, the LiPAA was provided in a 10 weight % aqueous solution, made by neutralizing a polyacrylic acid solution (Sigma-Aldrich, average molecular weight~250,000 g/mole, 35 wt % in $H_2O$) with $LiOH.H_2O$ (Sigma Aldrich, 98%) in distilled water) in an active particle/carbon black/LiPAA volumetric ratio of 70/5/25 in distilled water, where volumes are determined based on bulk densities. Slurries were mixed for one hour with a Retsch PM200 planetary mill at 100 rpm with three 13 mm tungsten carbide balls and then spread onto metal foil (either copper or aluminum for anode active and cathode active materials respectively) with a 0.004 inch gap coating bar. The coatings were then dried in air for 1 hour at 120° C., cut into 1.3 cm disks and then heated under vacuum for 1 hour at 120° C. with no further air exposure. The resulting electrode loadings were ~2-2.5 mg/cm².

Cell Preparation

To evaluate the various materials as electrode materials in Li-ion cells, laboratory test lithium half-cells were constructed and tested. Electrodes were assembled in 2325-type coin lithium half-cells with a lithium foil (99.9%, Sigma Aldrich) counter/reference electrode. (Note: as is well known to those skilled in the art, results from these test lithium half-cells allow for reliable prediction of electrode materials performance in lithium ion batteries.) Two layers of Celgard 2300 separator were used in each coin lithium half-cell. 1M $LiPF_6$ (BASF) in a solution of ethylene carbonate, diethyl carbonate and monofluoroethylene carbonate (volume ratio 3:6:1, all from BASF) was used as electrolyte. Cell assembly was carried out in an Ar-filled glove box. Cells were cycled galvanostatically at 30.0±0.1° C.

Inventive Example 1—Microgranulation of Graphite Flakes

Figure 2D:
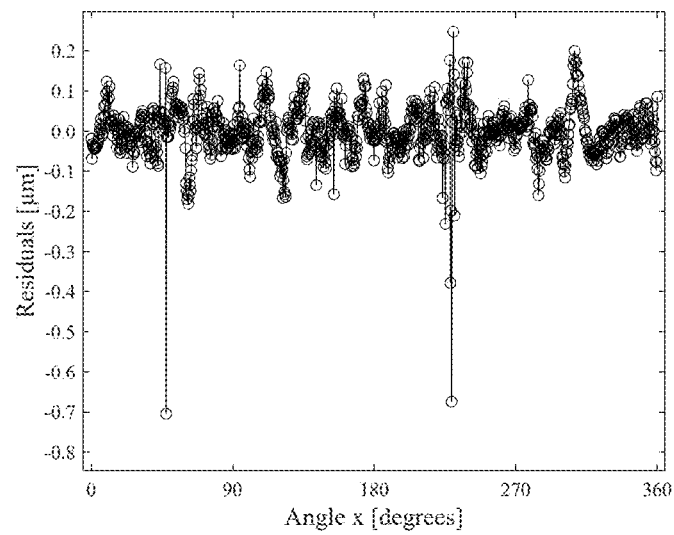
FIG. 2d shows a plot of the residuals of the interpolated radial segment values and the interpolated f(x) values a function of x.
Figure 3:
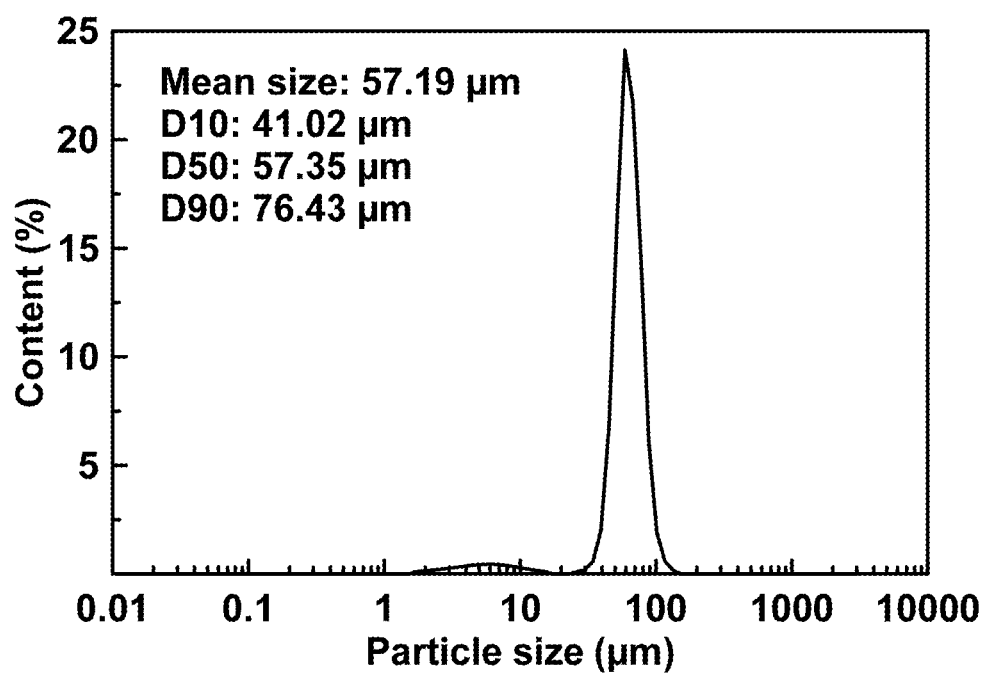
FIG. 3 shows the particle size distribution of the $ZrO_2$ templating media used in the Examples.

Zirconium oxide ($ZrO_2$) microspheres with average size (diameter) of 57 μm (Glen Mills Inc.) were used as templating media to aggregate graphite flake precursor particles into graphite product particles. FIGS. 2a and 2b show SEM images of the $ZrO_2$ templating media at two different magnifications. FIG. 2c shows a cross section of a $ZrO_2$ particle with its perimeter and centroid shown. FIG. 2d shows a plot of the residuals of the interpolated radial segment values and the interpolated f(x) values a function of x. From this data the roughness was determined. The $ZrO_2$ templating media is smooth, having a roughness of only 0.0022, and has no cavities. FIG. 3 shows the uniform particle size distribution of the $ZrO_2$ templating media for which D50 is 57.35 μm and (D90−D10)/D50=0.61.

Natural graphite flakes (230U, Asbury Graphite Mills Inc.) were used as graphite precursor particles. FIGS. 4a and 4b show SEM images of these precursor particles at two different magnifications. As is evident from these images, the graphite flakes are irregularly shaped particles with a layered structure and the size of the particles differs immensely. Many of the particles have jagged surface features, which are large cavities.

A mixture comprising ~225 g of $ZrO_2$ microsphere templating media and ~25 g of graphite precursor particles (~50 mL total powder volume) was prepared and then subjected to the high shear and high pressure field provided by the aforementioned mechanofusion system. The system was run at 1500 rpm (12 m/s wall speed) for 12 hours. FIGS. 5a and 5b show SEM images at two different magnifications of the product obtained after this mechanofusing. In these images, the $ZrO_2$ microspheres are seen to be partially coated with a thin layer of graphite. Also evident are graphite spheres (the product particles) which have a slightly smaller diameter than the $ZrO_2$ microspheres.

Figure 6A:
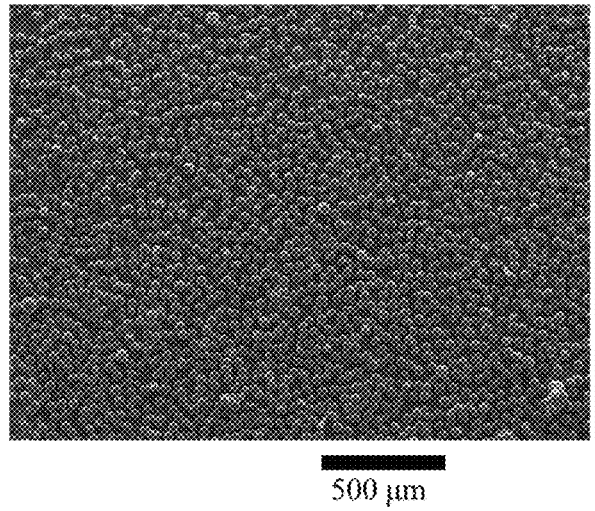
FIGS. 6a and 6b show SEM images at two different magnifications of the graphite sphere product particles in FIGS. 5a and 5b after separating them from the $ZrO_2$ templating media.
Figure 6B:
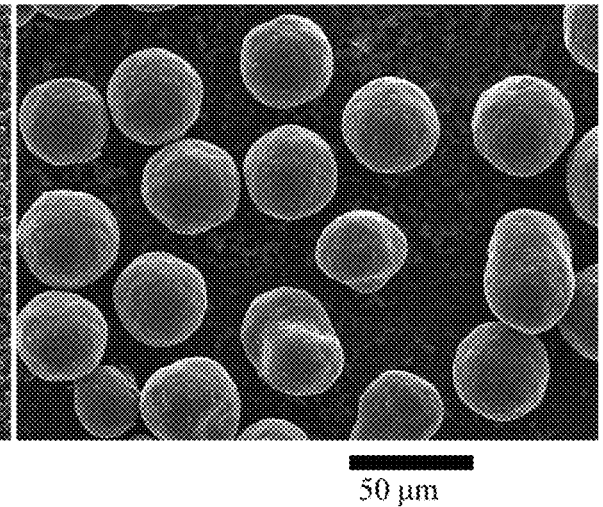

The graphite sphere product particles were then separated from the $ZrO_2$ microspheres by density using diiodomethane (MI-GEE, GEO Liquids, Inc., Prospect Heights, IL), which has a density of 3.32 g/cm³ (between that of $ZrO_2$ at 5.68 g/cm³ and graphite at 2.23 g/cm³). FIGS. 6a and 6b show SEM images at two different magnifications of the graphite sphere product particles after separating with diiodomethane and drying. Almost all the $ZrO_2$ was removed and thus most of the remaining particles were graphite spheres.

Figure 7A:
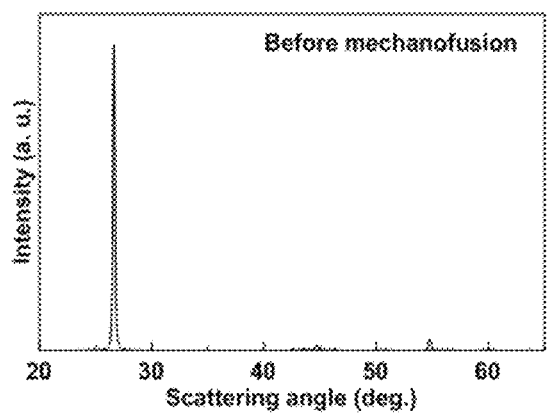
FIGS. 7a, 7b, and 7c show the XRD patterns between 20° and 65° of the graphite flake precursor particles before mechanofusing, the graphite sphere product particles after mechanofusing and separation from the templating media, and the graphite sphere product particles after annealing respectively.
Figure 7B:
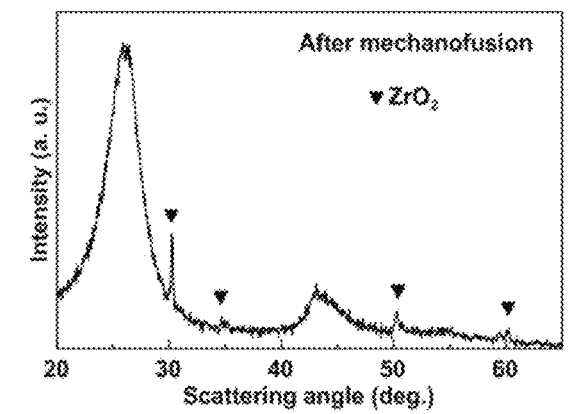
Figure 7C:
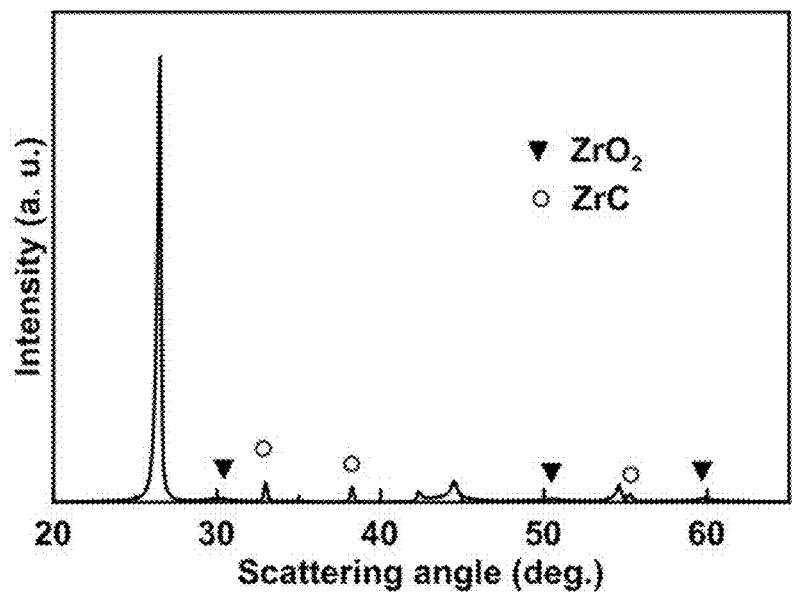

XRD patterns of the graphite were obtained before and after the mechanofusion process. Based on the obtained XRD patterns, it appeared that the mechanofusion process disrupted the crystal structure of the graphite somewhat and caused a loss of some crystallinity. This was evidenced by broadened peaks and amorphous features in the XRD patterns. The pattern also indicated the presence of a small amount of $ZrO_2$ impurity left in the sample. (It is expected that such impurities can readily be removed using better separation techniques at an industrial scale.) The graphite sphere product particles were thus recrystallized by annealing (heating) at 3000° C. for three hours in argon. A subsequent XRD pattern was obtained of the annealed product particles. Now all the peaks are sharp, indicating good crystallinity. A $d_{002}$ spacing based on the position of the (002) x-ray diffraction peak was determined to be 3.355 Å for the annealed product particles, indicating a high degree of graphitization. A small amount of ZrC was now present in the XRD pattern, presumably due to the reduction of $ZrO_2$ by carbon at high temperature in argon. FIGS. 7a, 7b, and 7c show these various XRD patterns, namely of the graphite flake precursor particles before mechanofusing, the graphite sphere product particles after mechanofusing and separation from the templating media, and the graphite sphere product particles after annealing, respectively.

Figure 8:
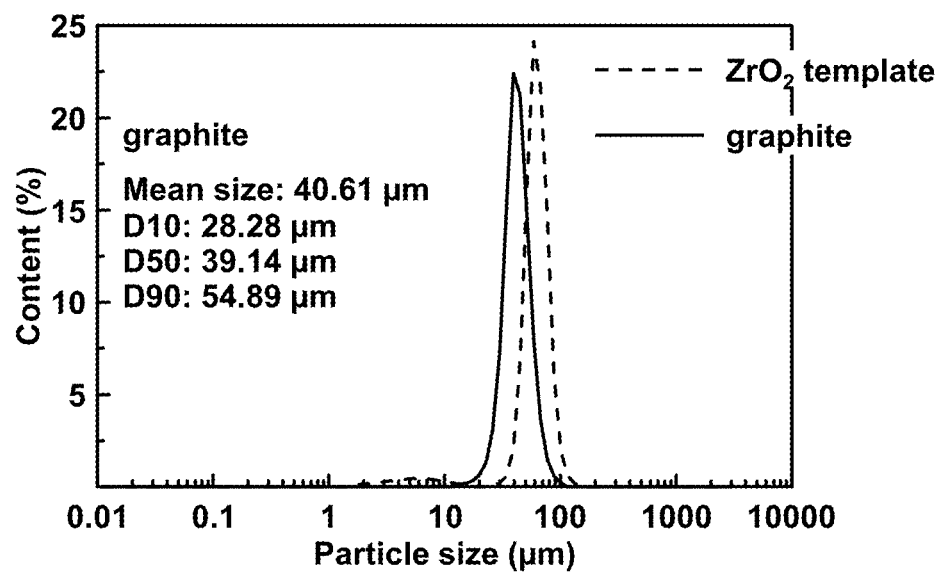
FIG. 8 shows the particle size distribution of the graphite sphere product particles after annealing. For comparison, the particle size distribution of the $ZrO_2$ templating media is also shown (dashed line).

FIG. 8 shows the particle size distribution of the graphite sphere product particles after annealing. For comparison, the particle size distribution of the $ZrO_2$ templating media is also shown (dashed line). The graphite sphere product particles are seen to be very uniform in size with an average diameter of about 41 μm.

Figure 9A:
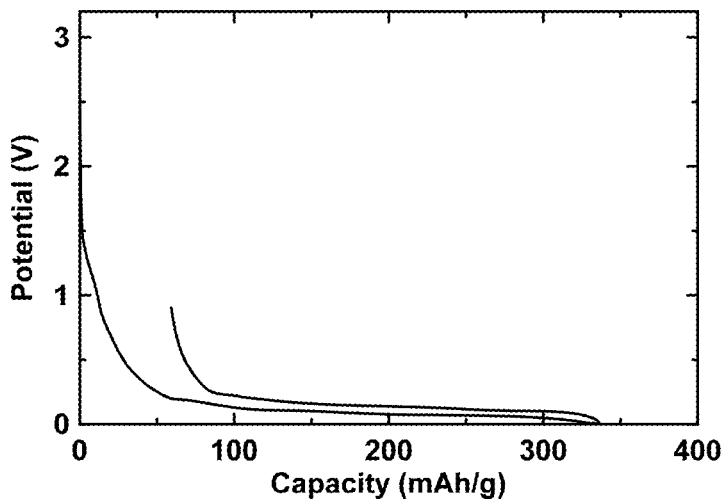
FIGS. 9a, 9b, and 9c show the electrochemical performance of a cell comprising inventive graphitic sphere product particles. In these Figures, the voltage curve, the corresponding differential capacity curve, and the cycling performance are shown respectively.
Figure 9B:
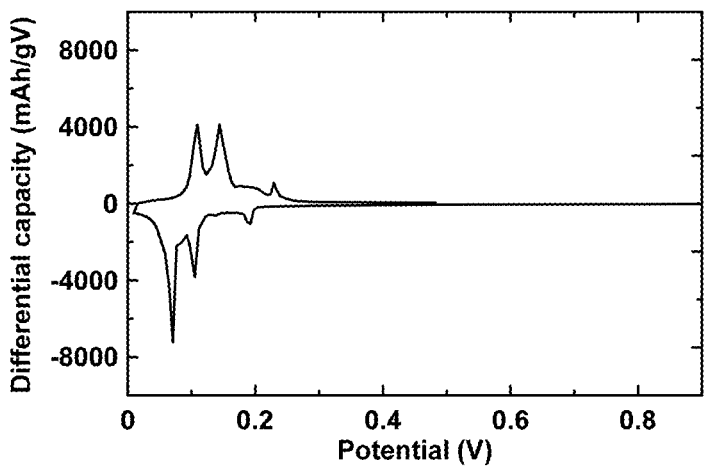
Figure 9C:
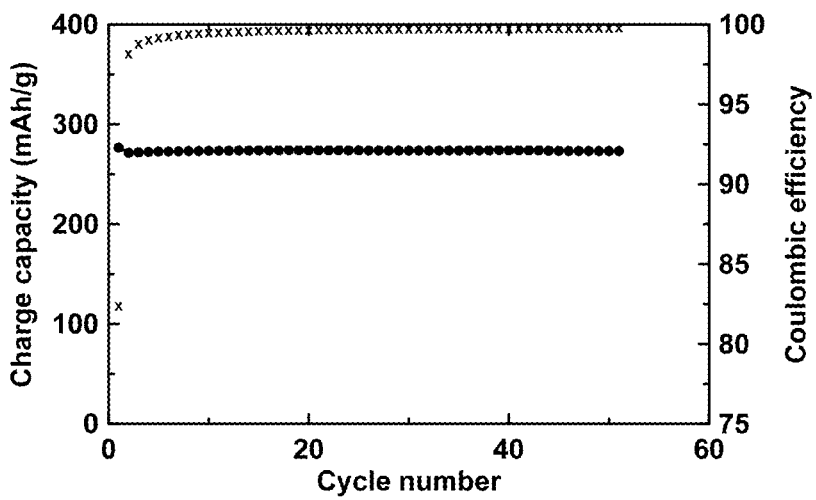

Electrodes were prepared using these graphite sphere product particles as anode active material and a lithium half-cell comprising such an electrode was made and tested. Cells were cycled between 0.005 V and 0.9 V. For the first cycle, cells were cycled at C/10 and at the lower potential, cells were held at constant potential until the current reduced to a value of C/20 prior to starting the next cycle. For subsequent cycles, cells were cycled at C/5 and held at each lower potential limit until the current was reduced to C/10 prior to starting the next cycle. FIGS. 9a, 9b, and 9c show the electrochemical performance of this cell. In these Figures, the voltage curve, the corresponding differential capacity curve, and the cycling performance are shown respectively. The voltage curve is typical for graphite and the expected staging can be clearly observed in the differential capacity curve. A reversible capacity of ~275 mAh/g is obtained with good cycling performance.

Figure 10A:
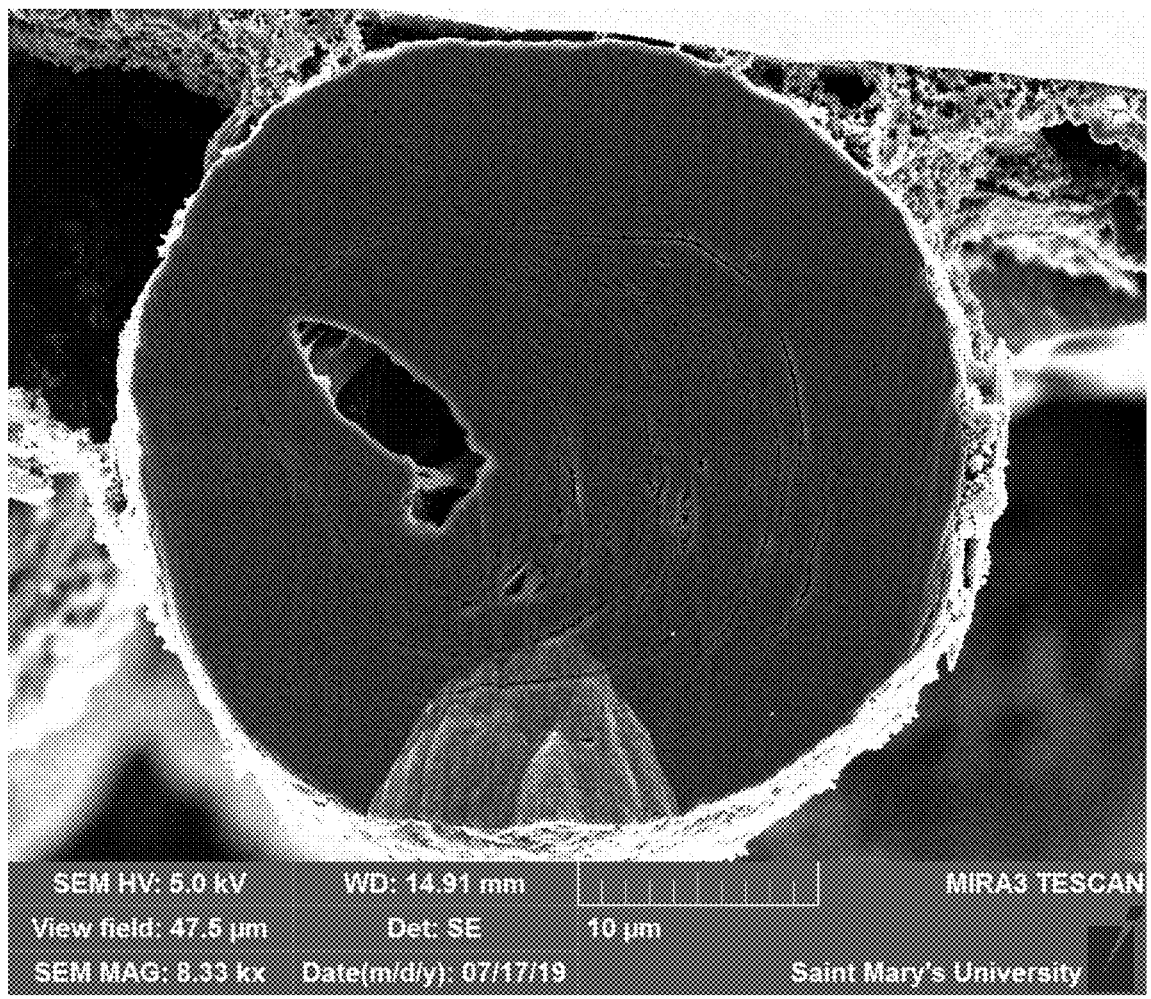
FIGS. 10a, 10b, and 10c show various SEM images of cross-sectioned graphitic sphere product particles.
Figure 10B:
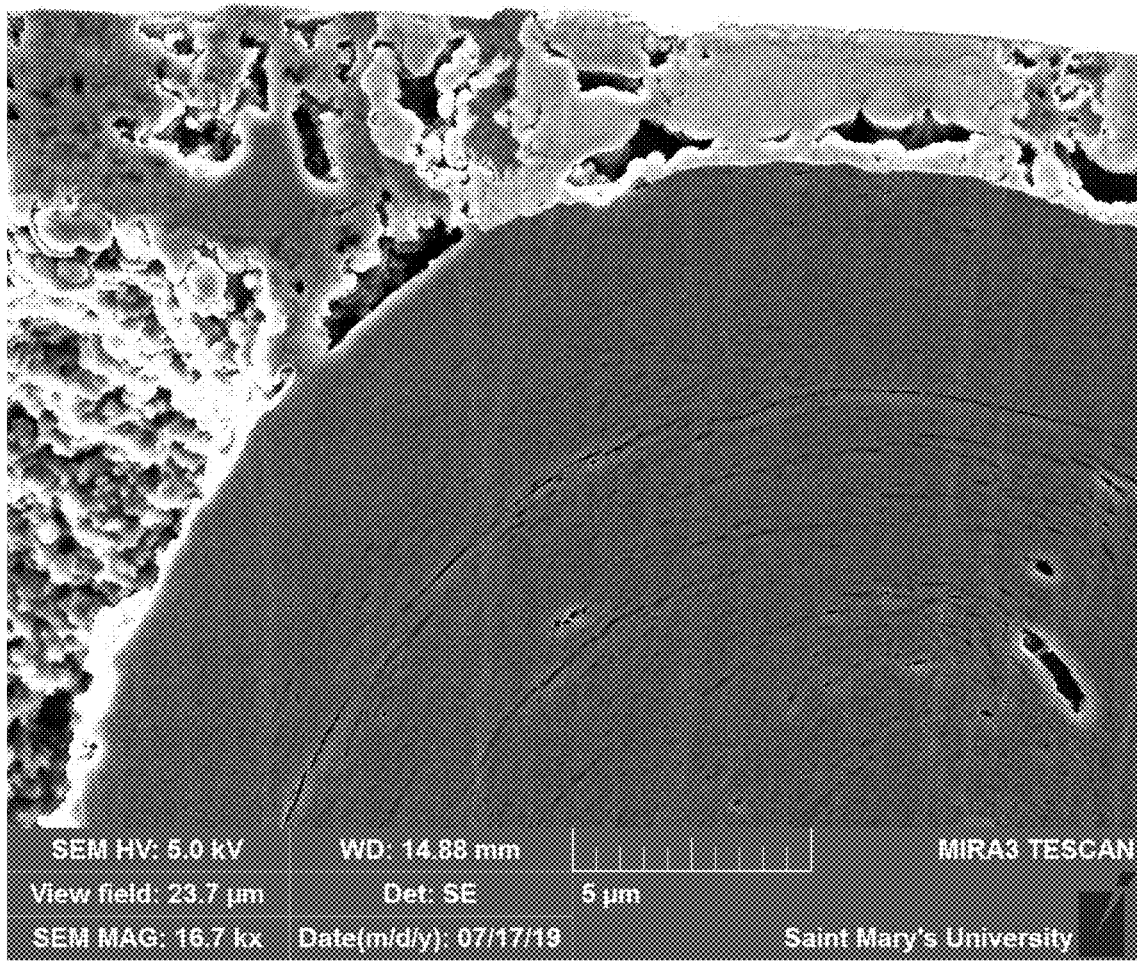
Figure 10C:
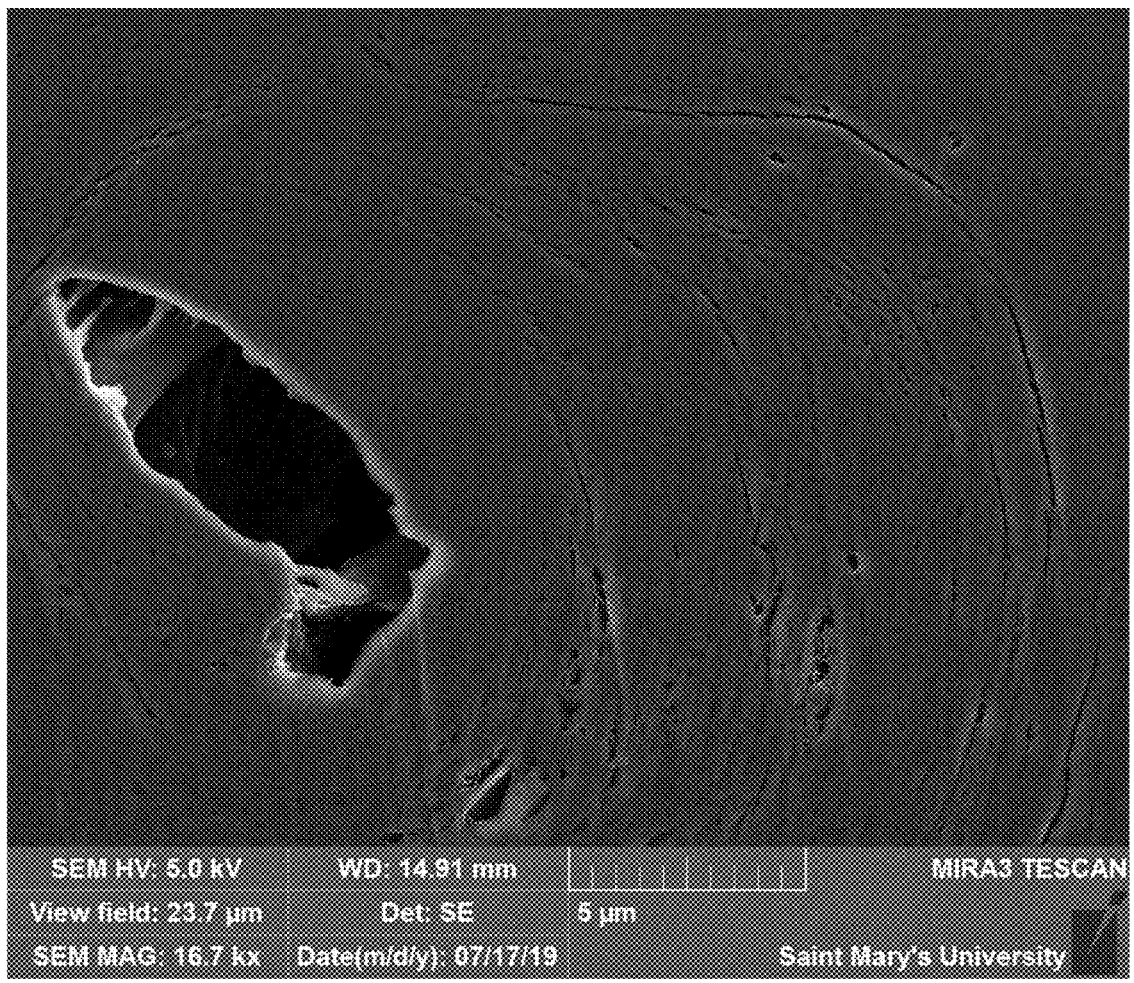
Figure 10D:
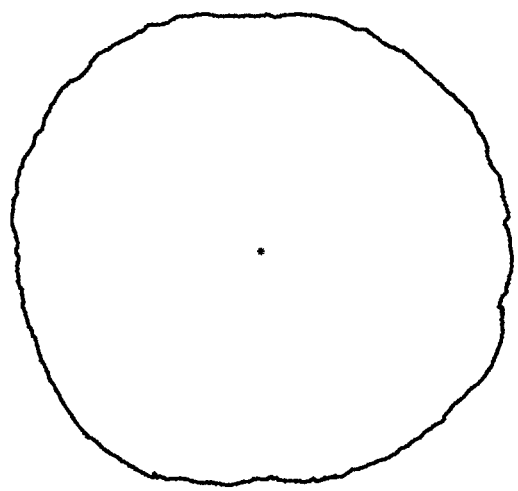
FIG. 10d shows a cross section of a graphitic sphere product particle with its perimeter and centroid shown.
Figure 10E:
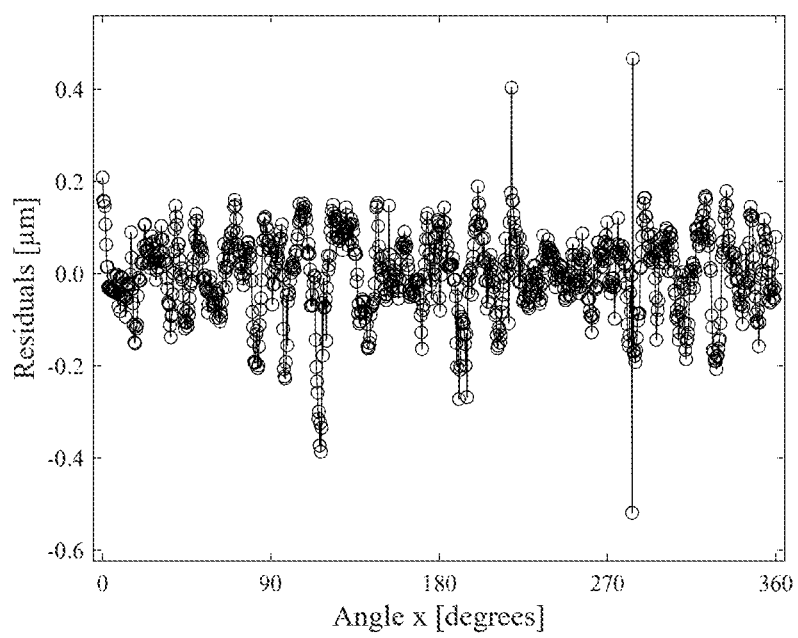
FIG. 10e shows a plot of the residuals of the interpolated radial segment values and the interpolated f(x) values a function of x of the product particle.

To further analyze the structure of these graphitic sphere product particles, representative particles were cross-sectioned and imaged using SEM as detailed above. FIGS. 10a, 10b, and 10c show several of the SEM images obtained. FIG. 10a shows a complete section of a product particle while FIGS. 10b and 10c show different portions of a product particle at greater magnification. Some of the product particles comprise a void space near the center of the particle (i.e. hollow core). In addition, porosity arranged in concentric layers is observed throughout the particles. The product particles thus appear to be characterized with a novel concentric structure. The product particles comprise concentric layers of graphene sheets. FIG. 10d shows a cross section of a product particle with its perimeter and centroid shown. FIG. 10e shows a plot of the residuals of the interpolated radial segment values and the interpolated f(x) values a function of x of the product particle. From this data the roughness was determined. The graphite product particles are smooth, having a roughness of only 0.0052, and have no cavities.

Inventive Example 2—Microgranulation of Lithium Transition Metal Oxide Powder

Zirconium oxide ($ZrO_2$) microspheres similar to the preceding Example were used as templating media to aggregate submicron irregularly shaped precursor NMC particles into larger regularly shaped NMC product particles.

NMC precursor particles with the formula $LiNi_{1/3}Mn_{1/3}Co_{1/3}O_2$ were prepared using an all-solid-state method. Specifically, stoichiometric amounts of NiO (Sigma-Aldrich, 99%), MnO (Aldrich, 99%), $Co_3O_4$ (Alfa Aesar, 99.7%), and $Li_2CO_3$ (Alfa Aesar, 99%) with 10% excess $Li_2CO_3$ were mixed together by high energy ball milling using a SPEX8000 mixer. A sample size of ~2.4 g was milled with 180 g of 1.6 mm stainless steel balls (Thomson Linear Motion) for 4 hours. Resulting ball milled mixtures were then pelletized and heated at 900° C. in air for 3 hours. Finally, the pellets were then ground to fine powders to produce the NMC precursor particles. FIGS. 11a and 11b show SEM images at two different magnifications of these NMC precursor particles. Irregular agglomerations of submicron NMC particles can be observed.

A mixture comprising ~225 g of $ZrO_2$ microsphere templating media and ~15 g of NMC precursor particles (~50 mL total powder volume) was prepared and then subjected to mechanofusion as described above. The system was run at 1000 rpm (~8 m/s wall speed) for 24 hours. FIGS. 12a and 12b show SEM images at two different magnifications of the product obtained after this mechanofusing. In these images, the $ZrO_2$ microspheres are seen to be partially coated with a thin layer of NMC. Also evident are NMC tetrahedra (the product particles) which are of slightly smaller size than the $ZrO_2$ microspheres, but much larger than the NMC precursor particles.

The NMC tetrahedra product particles were then separated from the $ZrO_2$ microspheres using a 400 mesh sieve. FIGS. 13a and 13b show SEM images at two different magnifications of the tetrahedral shaped NMC product particles after separating in this manner. The product particles are smooth. Again, almost all the $ZrO_2$ was removed.

XRD patterns of the NMC product particles were obtained before and after the mechanofusion process. Again, it appeared that the mechanofusion process disrupted the crystal structure of the product particles somewhat and caused a loss of some crystallinity. This was evidenced by broadened peaks and amorphous features in the XRD patterns. The pattern also indicated the presence of a small amount of $ZrO_2$ impurity left in the sample. (Again, it is expected that such impurities can readily be removed using better separation techniques at an industrial scale.) The NMC product particles were thus recrystallized by annealing at 900° C. in air. A subsequent XRD pattern was obtained of the annealed product particles and all the peaks are now sharp, indicating good crystallinity. A small amount of $ZrO_2$ was still present in the XRD pattern. FIGS. 14a, 14b, and 14c show these various XRD patterns, namely of the NMC precursor particles before mechanofusing, the tetrahedral shaped NMC product particles after mechanofusing and separation from the templating media, and the NMC product particles after annealing respectively.

Figure 15:
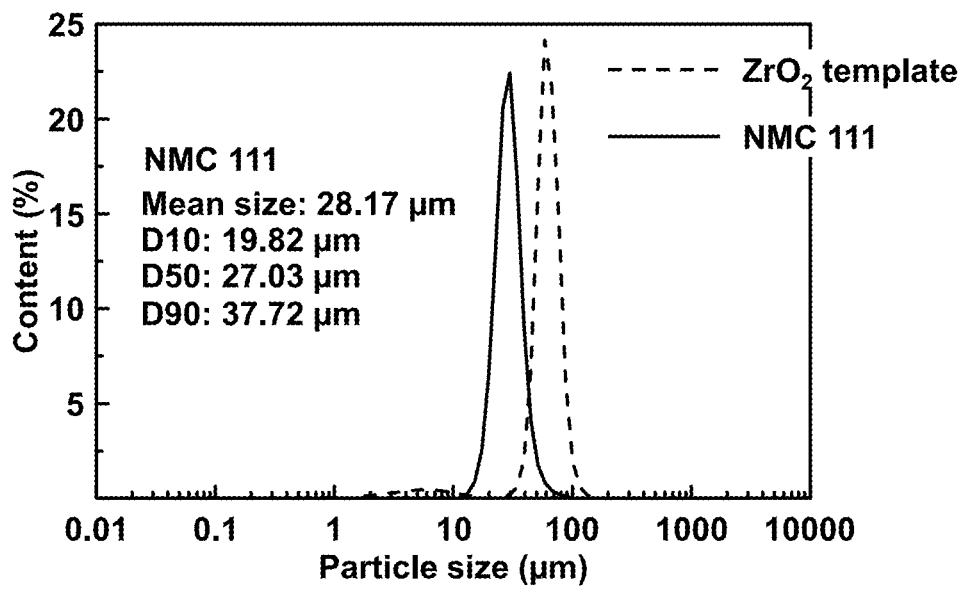
FIG. 15 shows the particle size distribution of the NMC product particles after annealing. For comparison, the particle size distribution of the $ZrO_2$ templating media is also shown (dashed line).

FIG. 15 shows the particle size distribution of the NMC product particles after annealing. For comparison, the particle size distribution of the $ZrO_2$ templating media is also shown (dashed line). The NMC product particles are seen to be very uniform in size with an average size (D50) of about 28 μm and a narrow distribution, with (D90−D10)/D50=0.66.

Figure 16A:
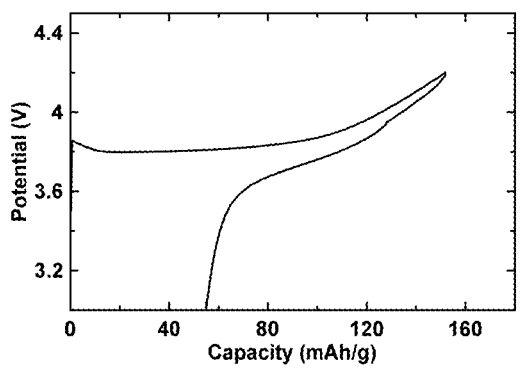
FIGS. 16a and 16b show the electrochemical performance of a cell comprising inventive NMC product particles. In these Figures, the voltage curve and the cycling performance are shown respectively.
Figure 16B:
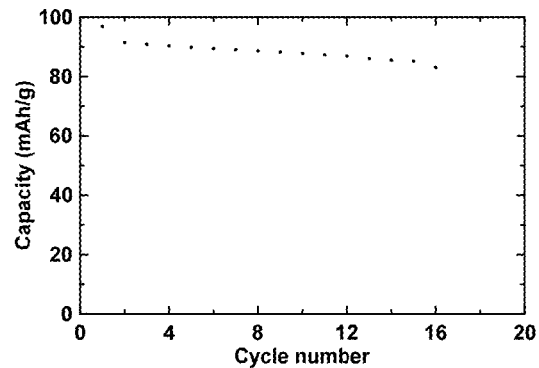

Electrodes were prepared using these NMC product particles as cathode active material and a lithium half-cell comprising such an electrode was made and tested. Cells were cycled at C/10 between 3.0 V and 4.2 V for the first cycle. For the rest of the cycles, cells were cycled at C/4 and held at the upper cut-off potential until the current reduced to C/10 prior to the next cycle. FIGS. 16a and 16b show the electrochemical performance of this cell. In these Figures, the voltage curve and the cycling performance are shown respectively. The voltage curve is typical for NMC and a reversible capacity of ~90 mAh/g is obtained.

Figure 17A:
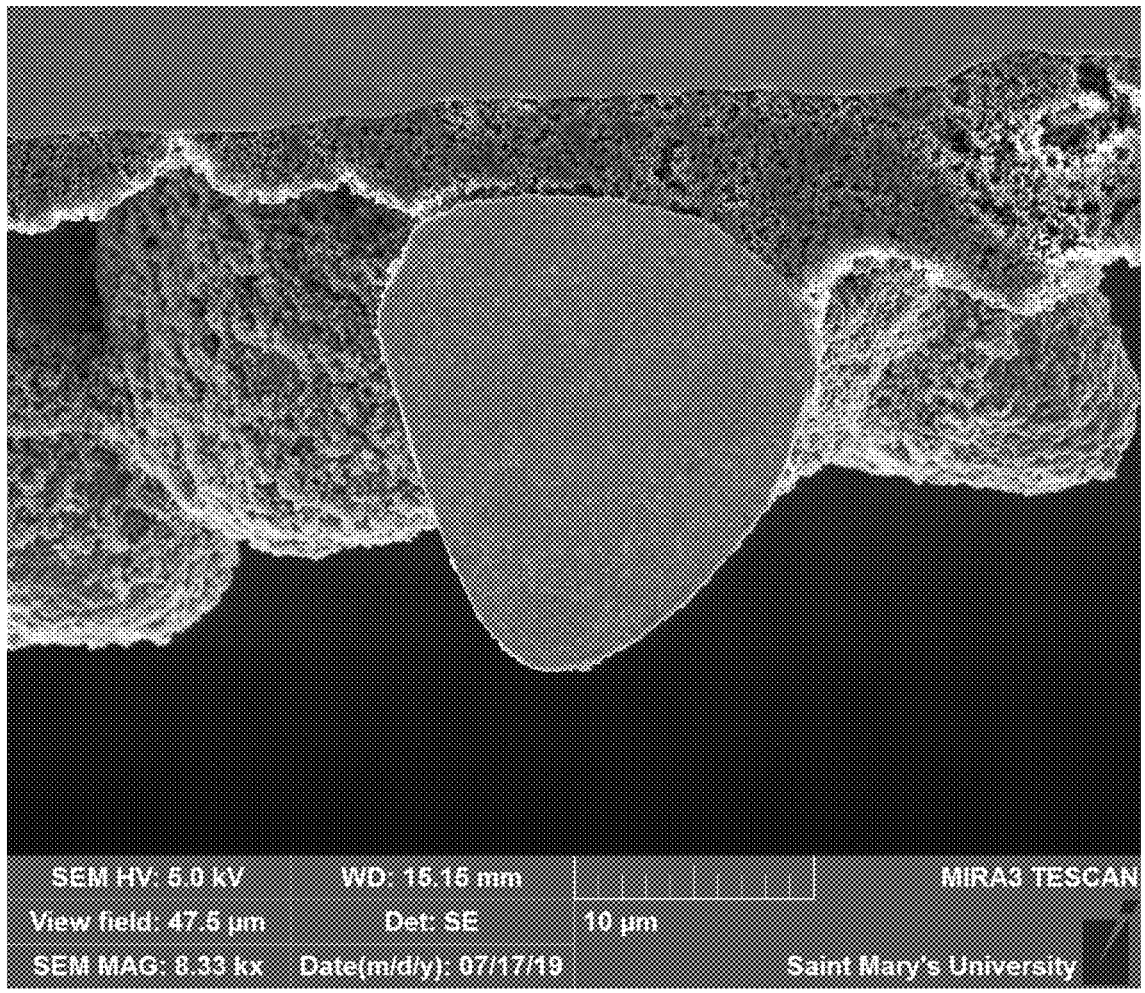
FIGS. 17a, 17b, 17c, and 17d show various SEM images of cross-sectioned NMC product particles.
Figure 17B:
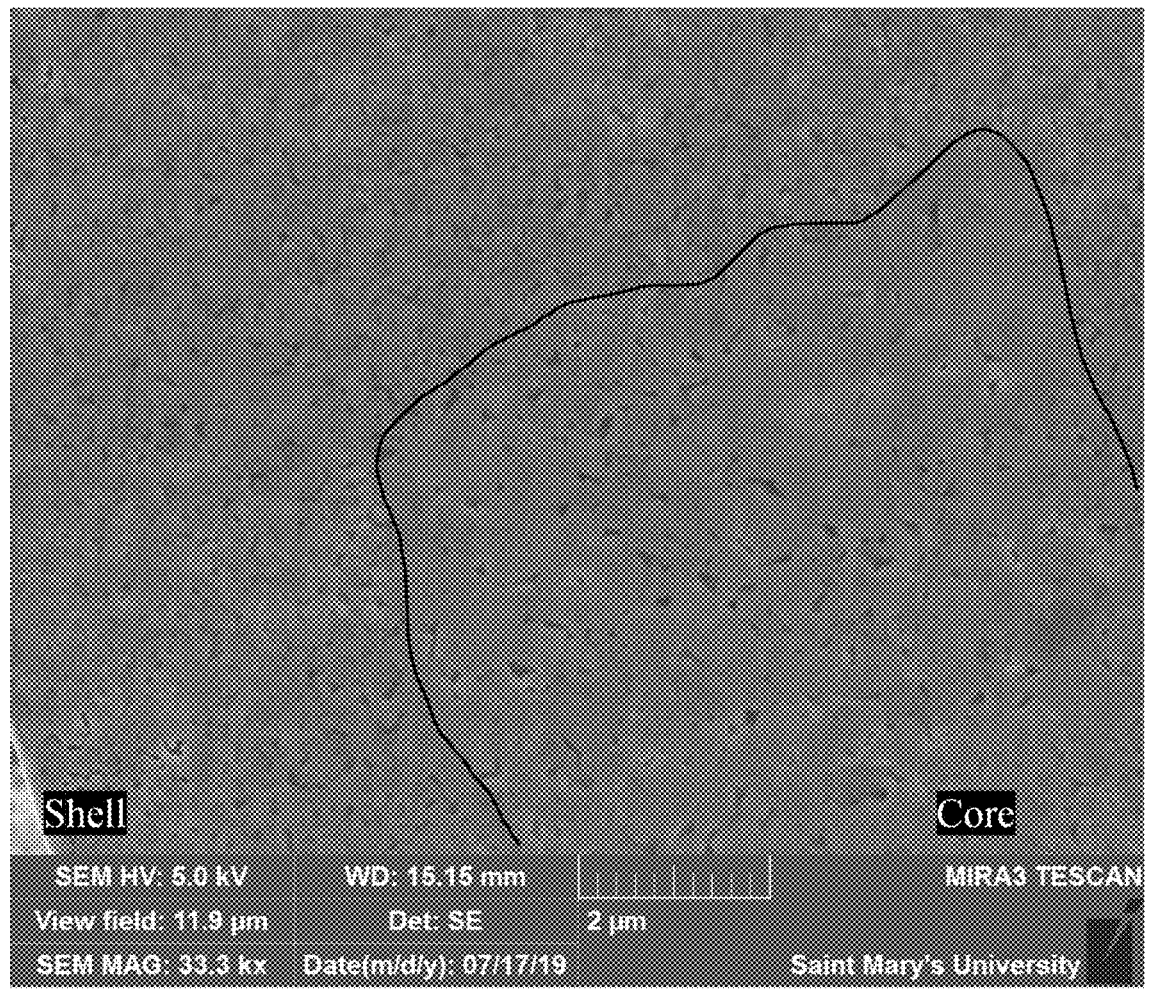
Figure 17C:
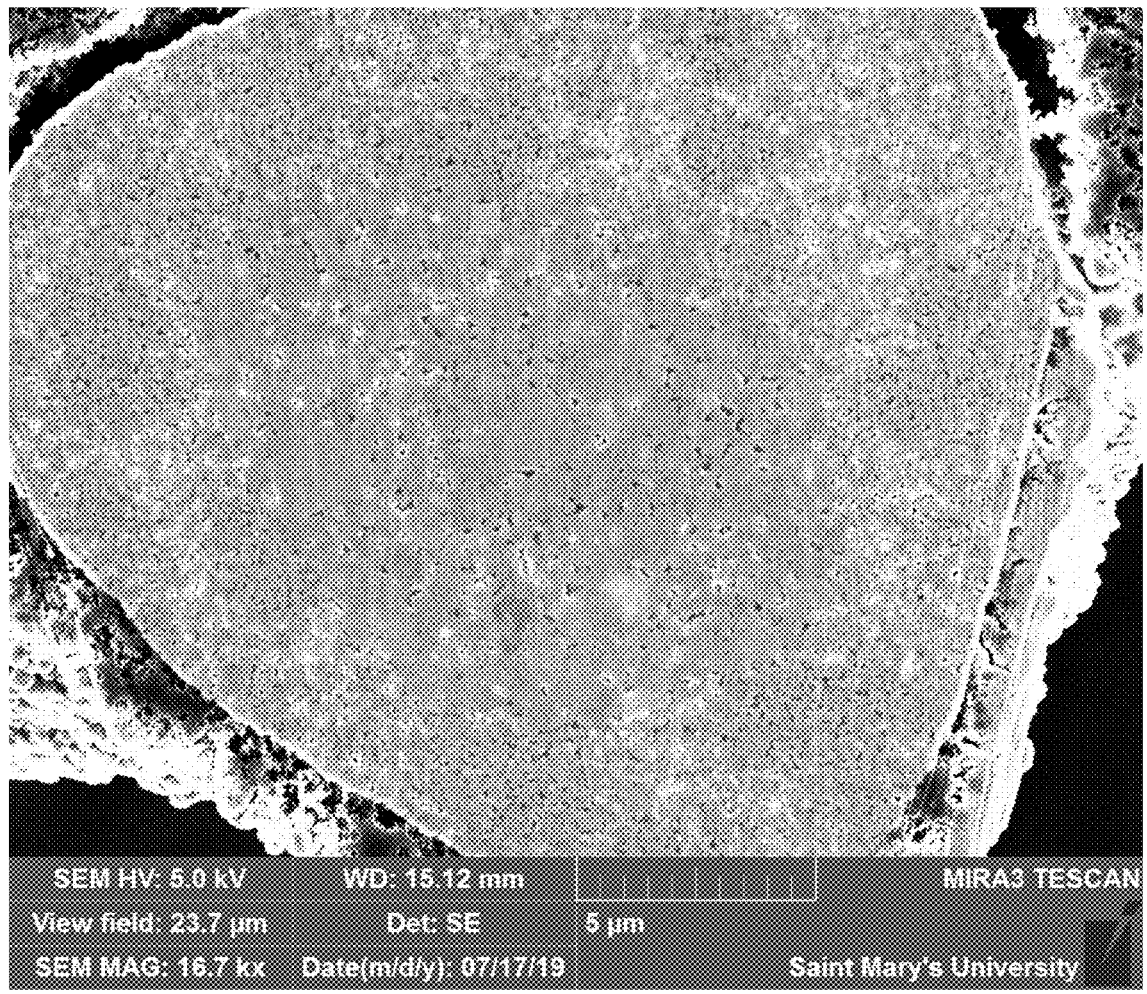
Figure 17D:
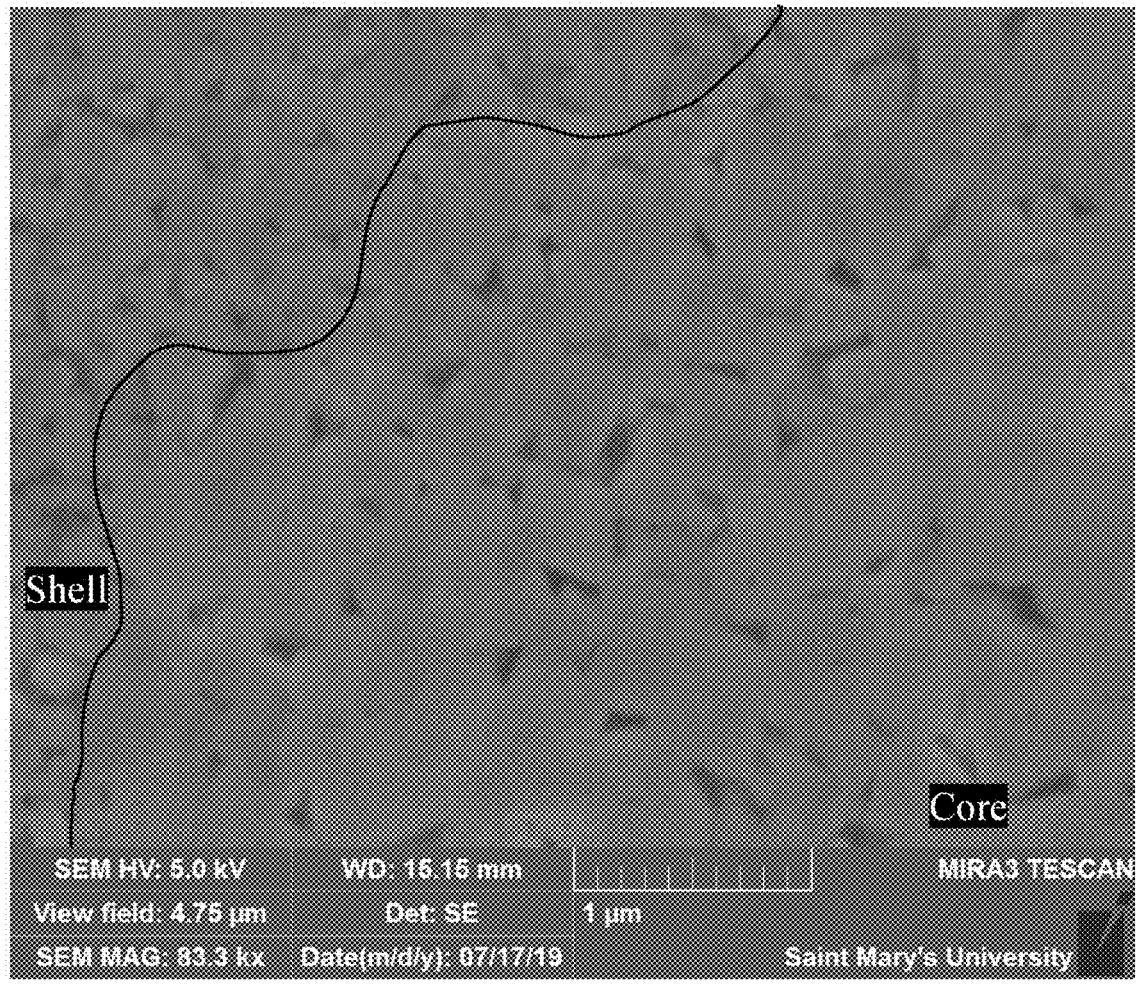

To further analyze the structure of these NMC product particles, representative particles were cross-sectioned and imaged using SEM as before. FIGS. 17a, 17b, 17c, and 17d show several of the SEM images obtained. FIG. 17a shows a complete section of a product particle while FIGS. 17b, 17c and 17d show different portions of a product particle at several greater magnifications. The product particles are smooth and are seen to be tetrahedral in shape with rounded corners. They comprise a core of crystallites that are randomly oriented and have an average size of about 1 μm coated with smaller randomly oriented crystallites that have an average size of about 0.3 μm. The aggregated NMC product particles thus appear to be characterized with a novel structure.

Figure 17E:
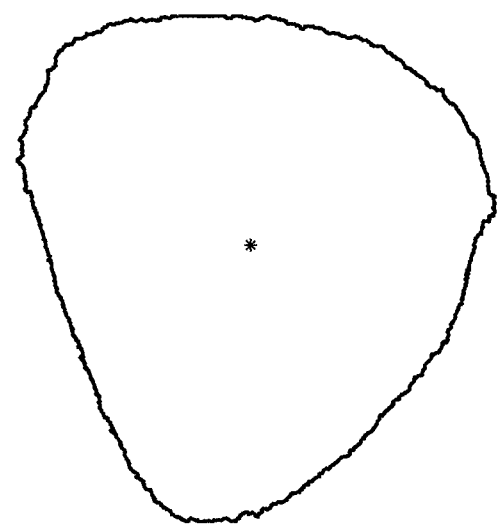
FIG. 17e shows a cross section of a NMC product particle with its perimeter and centroid shown.
Figure 17F:
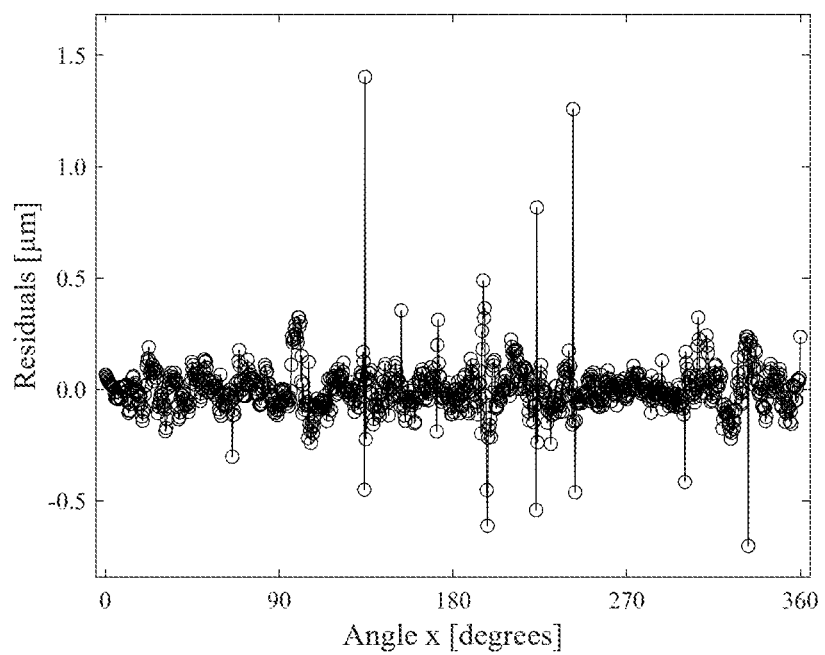
FIG. 17f shows a plot of the residuals of the interpolated radial segment values and the interpolated f(x) values a function of x of the product particle.

FIG. 17e shows a cross section of a product particle with its perimeter and centroid shown. FIG. 17f shows a plot of the residuals of the interpolated radial segment values and the interpolated f(x) values a function of x of the product particle. From this data the roughness was determined. The NMC product particles are smooth, having a roughness of only 0.0094, and have no cavities.

Figure 18A:
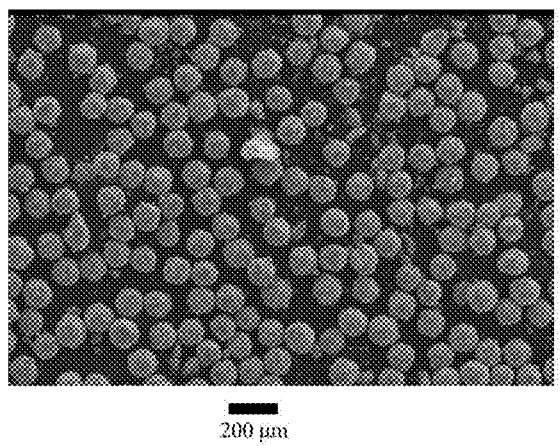
FIGS. 18a and 18b show SEM images of comparative NMC particles after being subjected to lengthy auto-grinding.
Figure 18B:
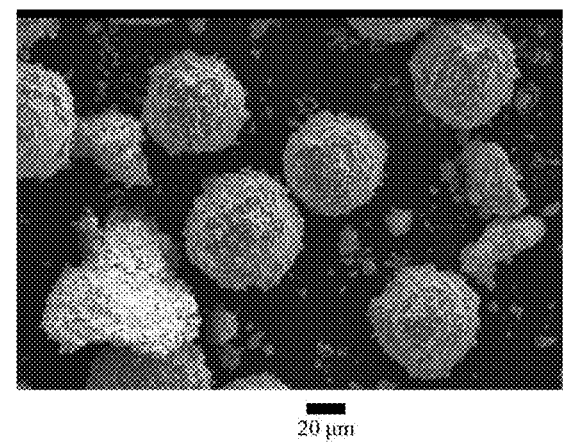

Comparative Example—Attempted Microgranulation of Lithium Transition Metal Oxide Using an Auto-Grinding Process Zirconium oxide ($ZrO_2$) microspheres and NMC precursor particles similar to the preceding Example were used. A mixture comprising the same ratio of $ZrO_2$ and NMC was mixed in a Brinkmann Retsch auto-grinder. The auto-grinder was set to run at ~120 rpm for two weeks. FIGS. 18a and 18b show the SEM images obtained for this sample subjected to auto-grinding. The SEM images show that all the $ZrO_2$ microspheres are loosely coated with NMC but almost no granulation of NMC can be observed. This comparative example shows that very lengthy auto-grinding does not provide the unique benefits of the mechanofusion process.

Inventive Example 3—Microgranulation of a Mixture of Precursor Particles Having Different Compositions and Different Average Crystallite Sizes Zirconium oxide ($ZrO_2$) microspheres similar to the preceding Examples were used as templating media to aggregate several types of precursor particles of differing composition and average crystallite size.

Figure 20A:
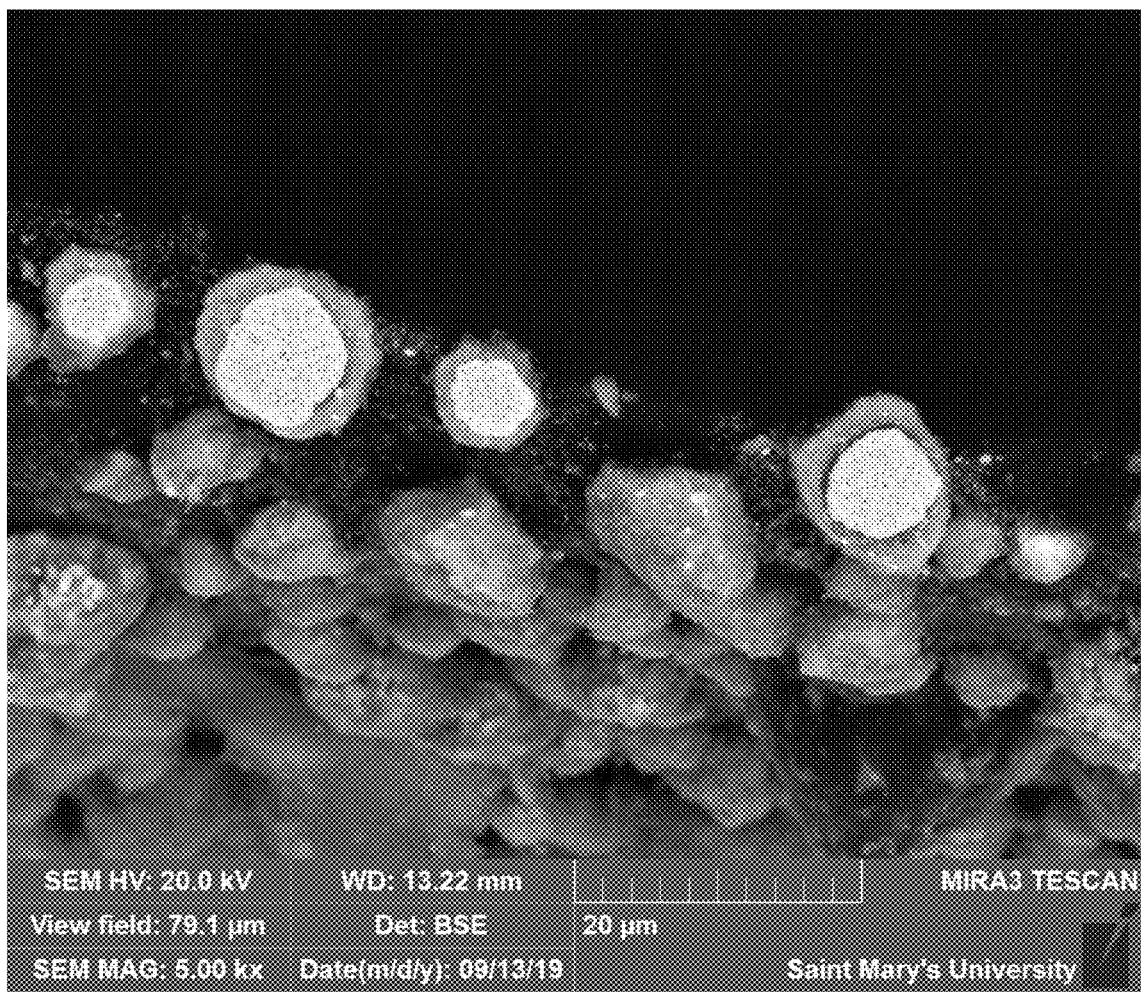
FIGS. 20a and 20b show SEM images of cross-sectioned core-shell product particles of Inventive Example 3.
Figure 20B:
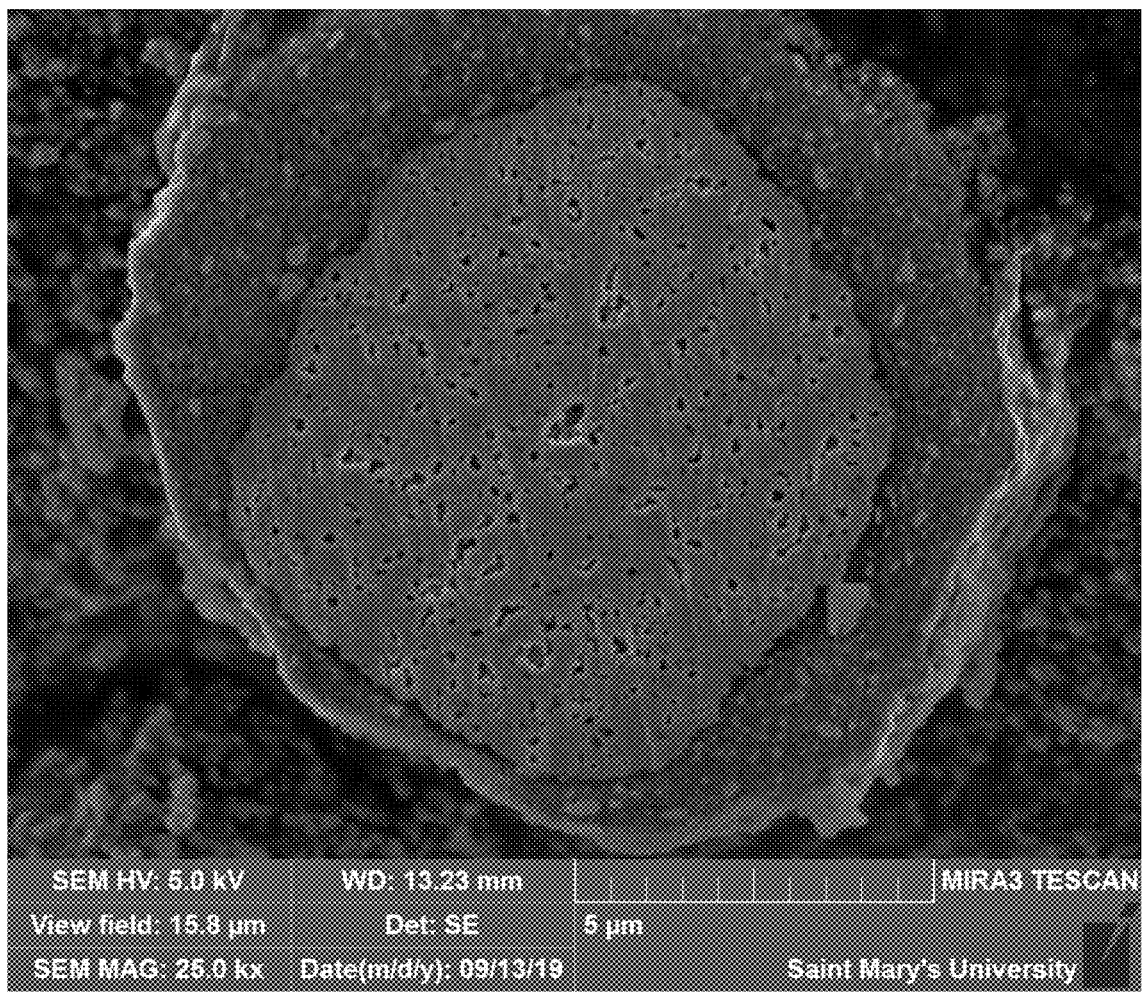
Figure 21:
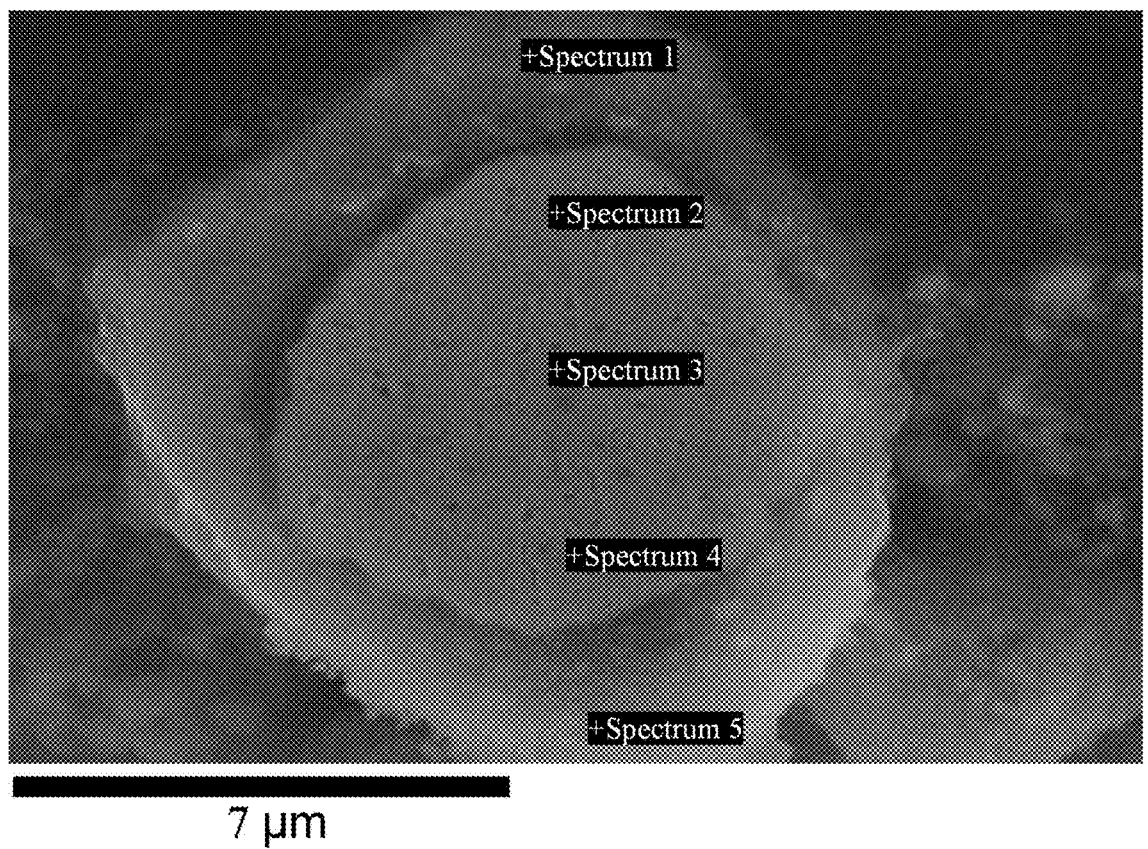
FIG. 21 shows a cross section image of a core-shell product particle of Inventive Example 3 with the position of five points indicated as Spectrum 1-5, at which compositions were obtained by EDS.

A mixture comprising ~180 g of $ZrO_2$ microsphere templating media, 6.94 g NiO (Sigma-Aldrich, 99%), 2.20 g MnO (Aldrich, 99%), 2.48 g $Co_3O_4$ (Alfa Aesar, 99.7%), and 6.29 g $Li_2CO_3$ (Alfa Aesar, 99%) was prepared. The average crystallite size of the $Co_3O_4$ was 0.3 μm and the average crystallite size of the NiO was 2 μm, as determined by observation of single crystalline crystallites by SEM. The mixture was then subjected to mechanofusion as described above at 1000 rpm (~8 m/s wall speed) for 18 hours. The product particles were then separated from the $ZrO_2$ microspheres using a 400 mesh sieve. FIGS. 20a and 20b show SEM images at two different magnifications of cross sections of product particles. The product particles are smooth with most of particles having a diameter of 5-10 μm. In cross section, the particles can be seen to have a core-shell structure. The brightness is different for the particle core and for the particle shell, indicating a different elemental composition for the core and the shell. FIG. 21 shows a cross section image of a particle with the position of five data points indicated, labelled as Spectrum 1-5. The elemental composition at each point, as determined by EDS is listed in Table 1 below. The core is rich in Co, while the shell is rich in Mn and Ni.

TABLE 1

|  | Mn (atomic %) | Co (atomic %) | Ni (atomic %) |
| --- | --- | --- | --- |
| Spectrum 1 | 7.17 | 19.35 | 73.48 |
| Spectrum 2 | 0.48 | 97.97 | 1.55 |

TABLE 1-continued

|  | Mn (atomic %) | Co (atomic %) | Ni (atomic %) |
| --- | --- | --- | --- |
| Spectrum 3 | 0.22 | 98.92 | 0.86 |
| Spectrum 4 | 0.29 | 98.16 | 1.55 |
| Spectrum 5 | 7.19 | 18.79 | 74.03 |

Figure 22:
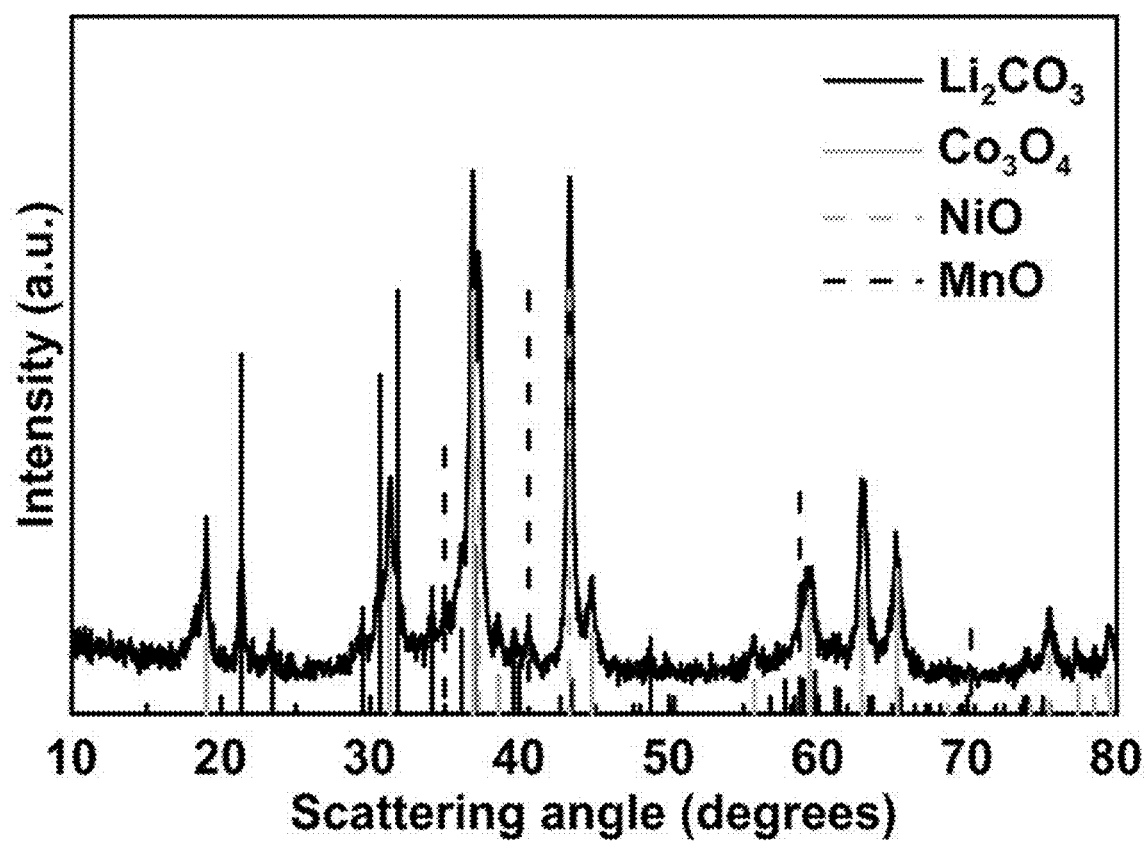
FIG. 22 shows an XRD pattern of the shell precursor particles of Inventive Example 4.
Figure 23:
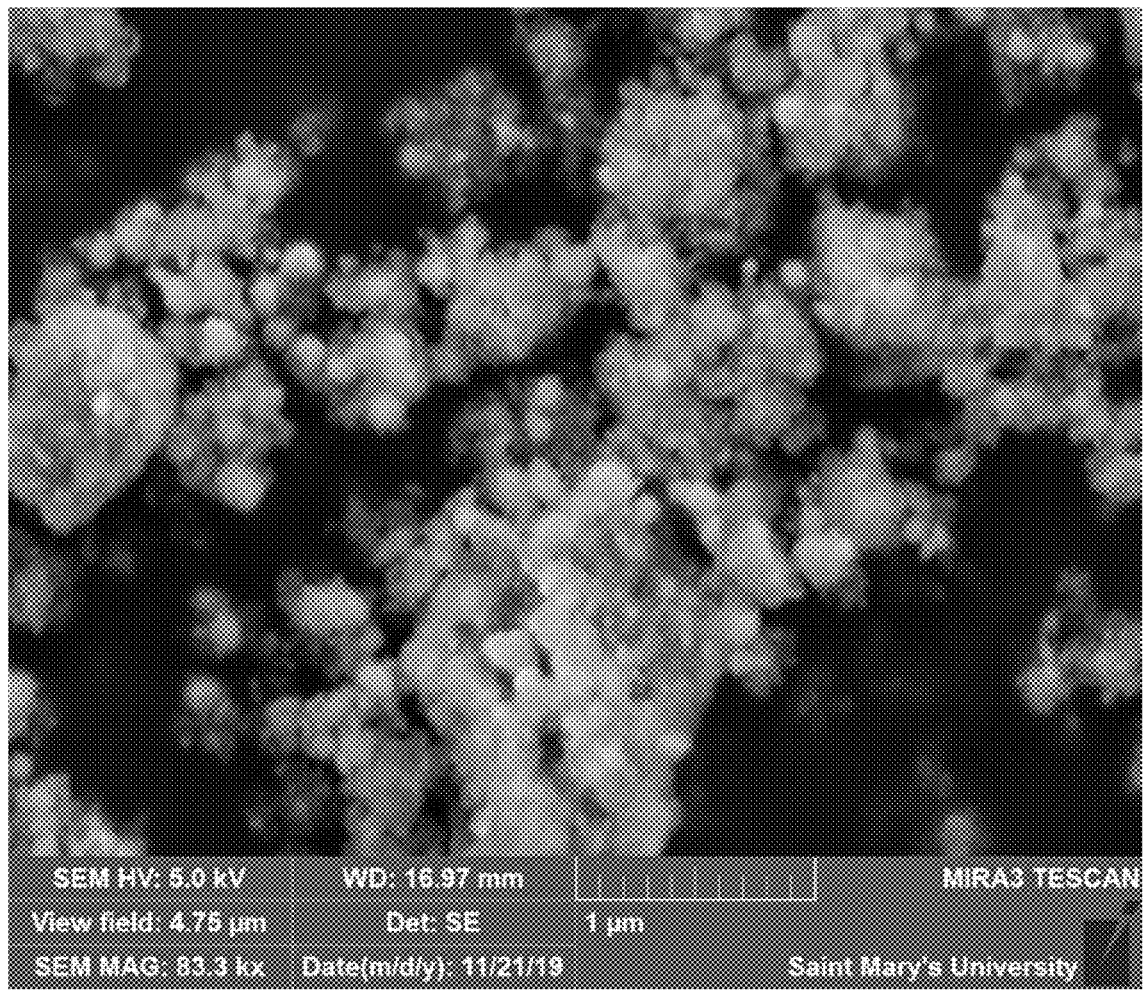
FIG. 23 an SEM image of the shell precursor particles of Inventive Example 4.

Inventive Example 4—Synthesis of O3-Phase $LiNi_xMn_yCo_zO_2$ Powder in which x+y+z=1 and Comprising Particles that have a Ni Content that is Higher in their Core than in their Shell A target composition of $LiNi_{1/3}Mn_{1/3}Co_{1/3}O_2$ (NMC111) was chosen as the Mn-rich particle shell. Shell precursor powder was made by sealing 12.88 g NiO (Sigma-Aldrich, 99%), 12.24 g MnO (Aldrich, 99%), 13.85 g $Co_3O_4$ (Alfa Aesar, 99.7%), 21.03 g $Li_2CO_3$ (Alfa Aesar, 99%), corresponding to 10% excess $Li_2CO_3$ according to the formula $LiNi_{1/3}Mn_{1/3}Co_{1/3}O_2$ and 10 kg of 0.5 inch stainless steel balls in a 5 L stainless-steel jar mill (US Stoneware) and milling for one week at 85 rpm. An XRD pattern of the resulting shell precursor powder is shown in FIG. 22. It comprises a mixture of $Li_2CO_3$, $Co_3O_4$, NiO, and MnO phases. An SEM image of the resulting shell precursor powder is shown in FIG. 23. It comprises crystallites that are less than 0.1 μm in size.

Figure 24:
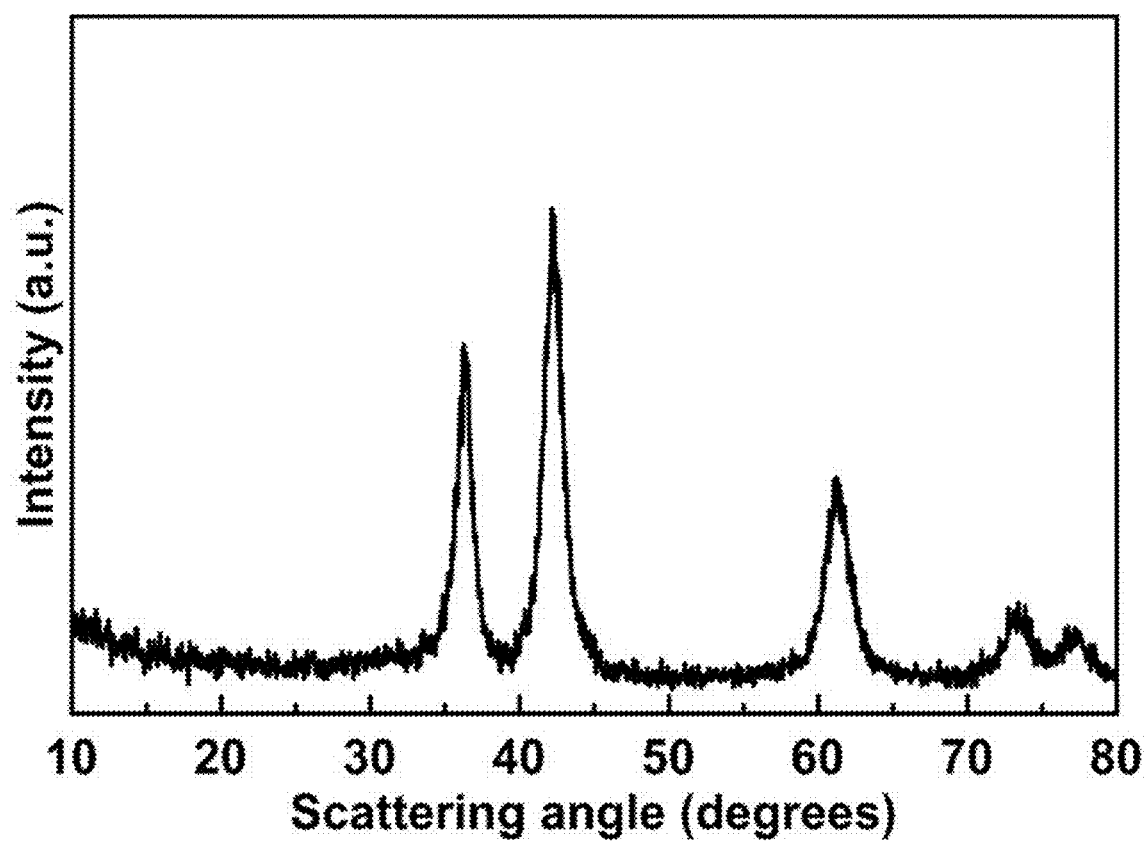
FIG. 24 shows an XRD pattern of Intermediate A of Inventive Example 4.
Figure 25:
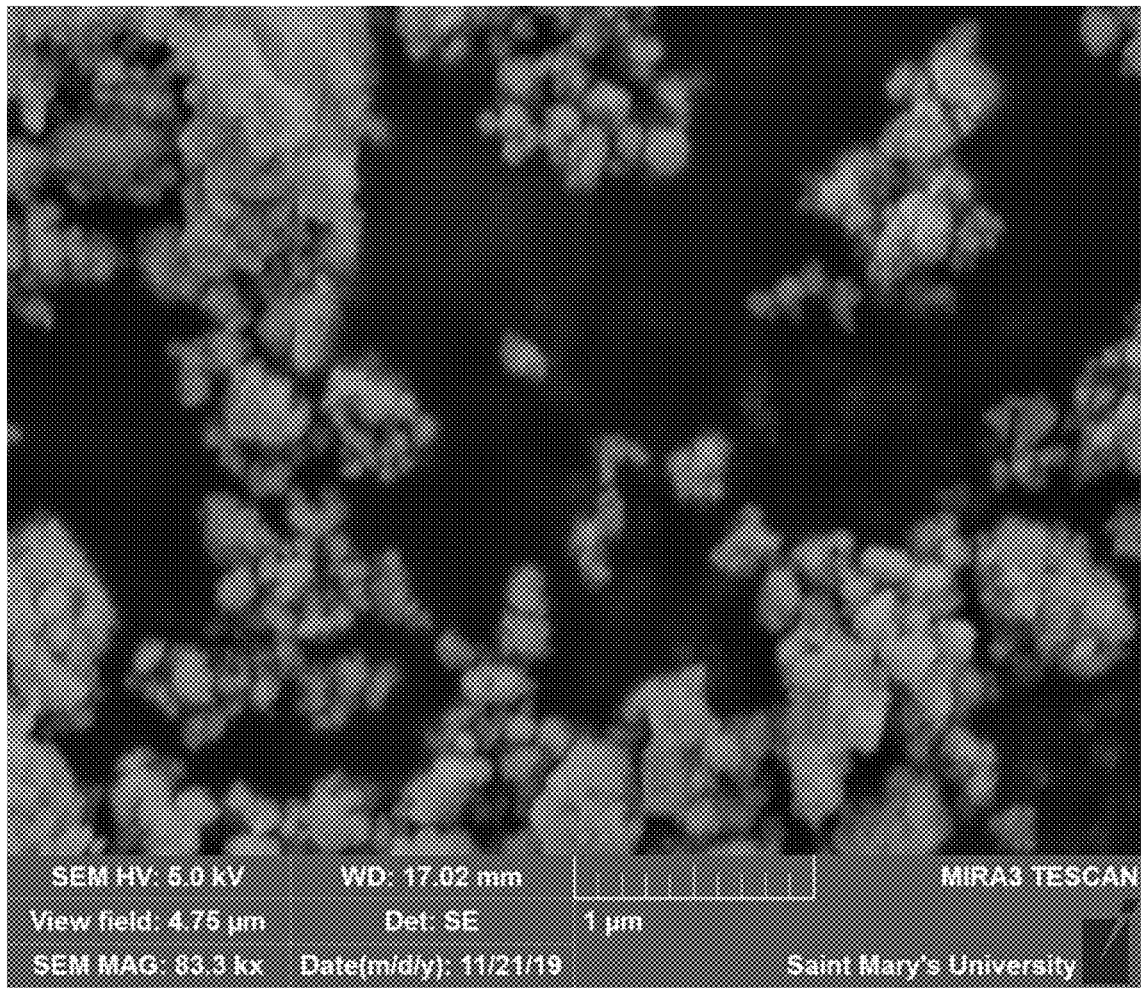
FIG. 25 shows an SEM image of Intermediate A of Inventive Example 4.
Figure 26:
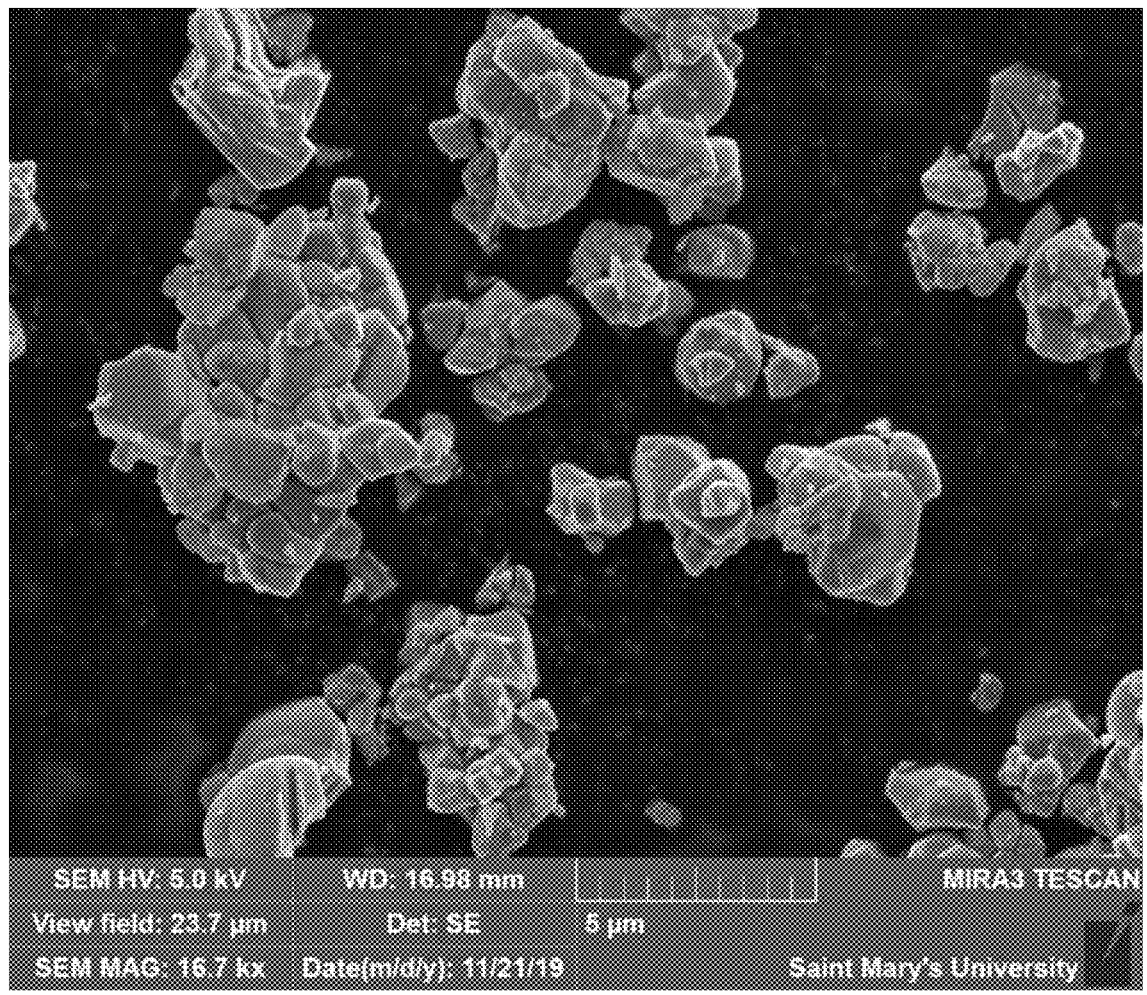
FIG. 26 shows an SEM image of core precursor particles of Inventive Example 4.
Figure 27:
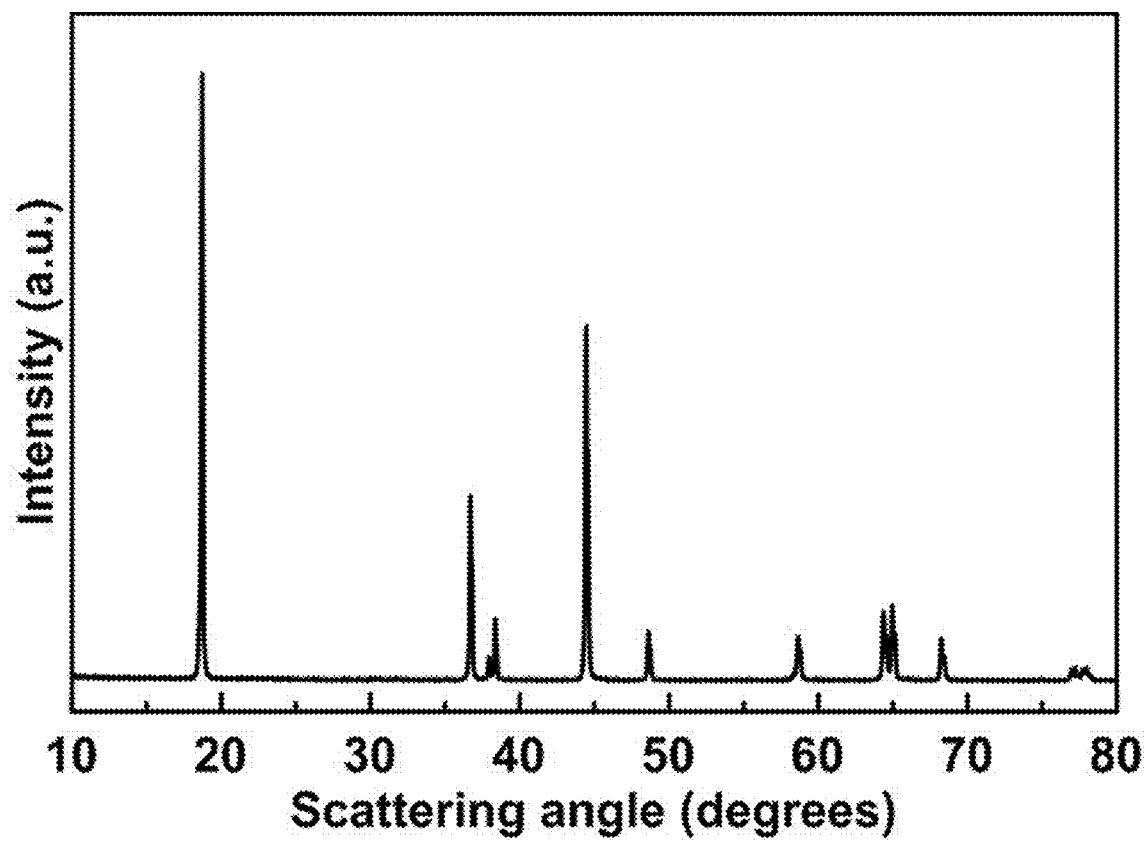
FIG. 27 shows an XRD pattern of the core precursor particles of Inventive Example 4.

A target composition of $LiNi_{0.6}Mn_{0.2}Co_{0.2}O_2$ (NMC622) was chosen as the Ni-rich particle core. Core precursor powder was made by sealing in air 41.61 g NiO (Sigma-Aldrich, 99%), 13.18 g MnO (Aldrich, 99%), 14.90 g $Co_3O_4$ (Alfa Aesar, 99.7%), and 10 kg of 0.5 inch stainless steel balls in a 5 L stainless-steel jar mill (US Stoneware) and milling for one week at 85 rpm (denoted as Intermediate A). FIG. 24 shows an XRD pattern of Intermediate A, which corresponds to a single-phase rocksalt structure. An SEM image of Intermediate A is shown in FIG. 25. Intermediate A consists of crystallites that are less than 0.1 μm in size. With a mortar and pestle, 15 g of Intermediate A was mixed with 7.83 g of $Li_2CO_3$ (Alfa Aesar, 99%), corresponding to 5% excess $Li_2CO_3$ according to the formula $LiNi_{0.6}Mn_{0.2}Co_{0.2}O_2$, until a homogeneous mixture was obtained (~10 minutes). The mixture was placed in an alumina crucible and heated in a box furnace in air for 3 hours at 900° C., resulting in core precursor particles. The purpose of this heating step is to increase the crystallite size of the core precursor particles such that they are more than 10% larger than the shell precursor particle crystallite size. FIG. 26 shows an SEM image of the resulting core precursor particles. They have an average crystallite size of about 2 μm. FIG. 27 shows an XRD pattern of the core precursor particles, which corresponds to phase pure O3-phase NMC622.

A mixture comprising ~180 g of $ZrO_2$ microsphere templating media, 13.33 g shell precursor particles, and 6.67 g core precursor particles was prepared. The mixture was then subjected to mechanofusion as described above at 1000 rpm (~8 m/s wall speed) for 20 hours. The product particles were then separated from the $ZrO_2$ microspheres using a 400 mesh sieve.

Figure 28A:
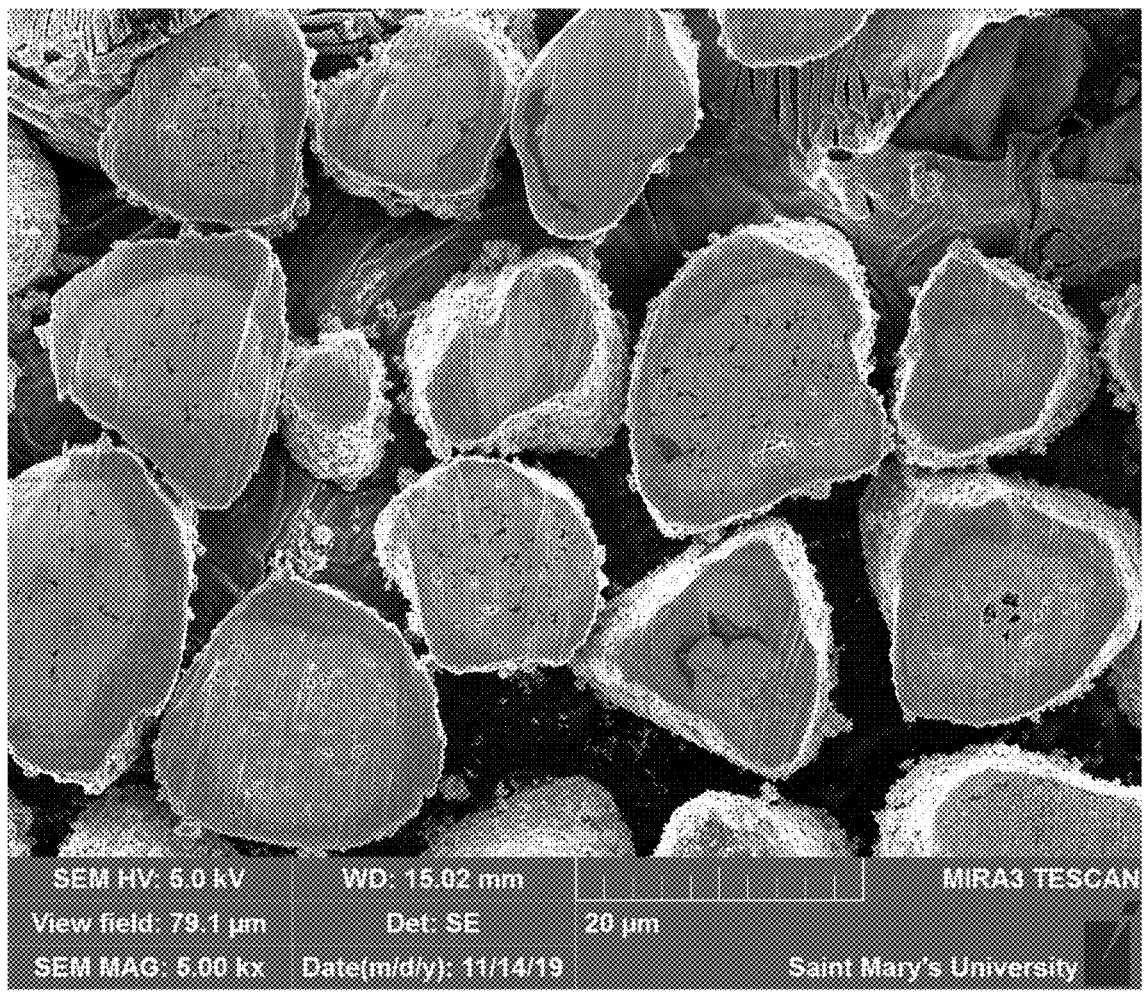
FIGS. 28a and 28b show SEM images of cross-sectioned core-shell product particles of Inventive Example 4.
Figure 28B:
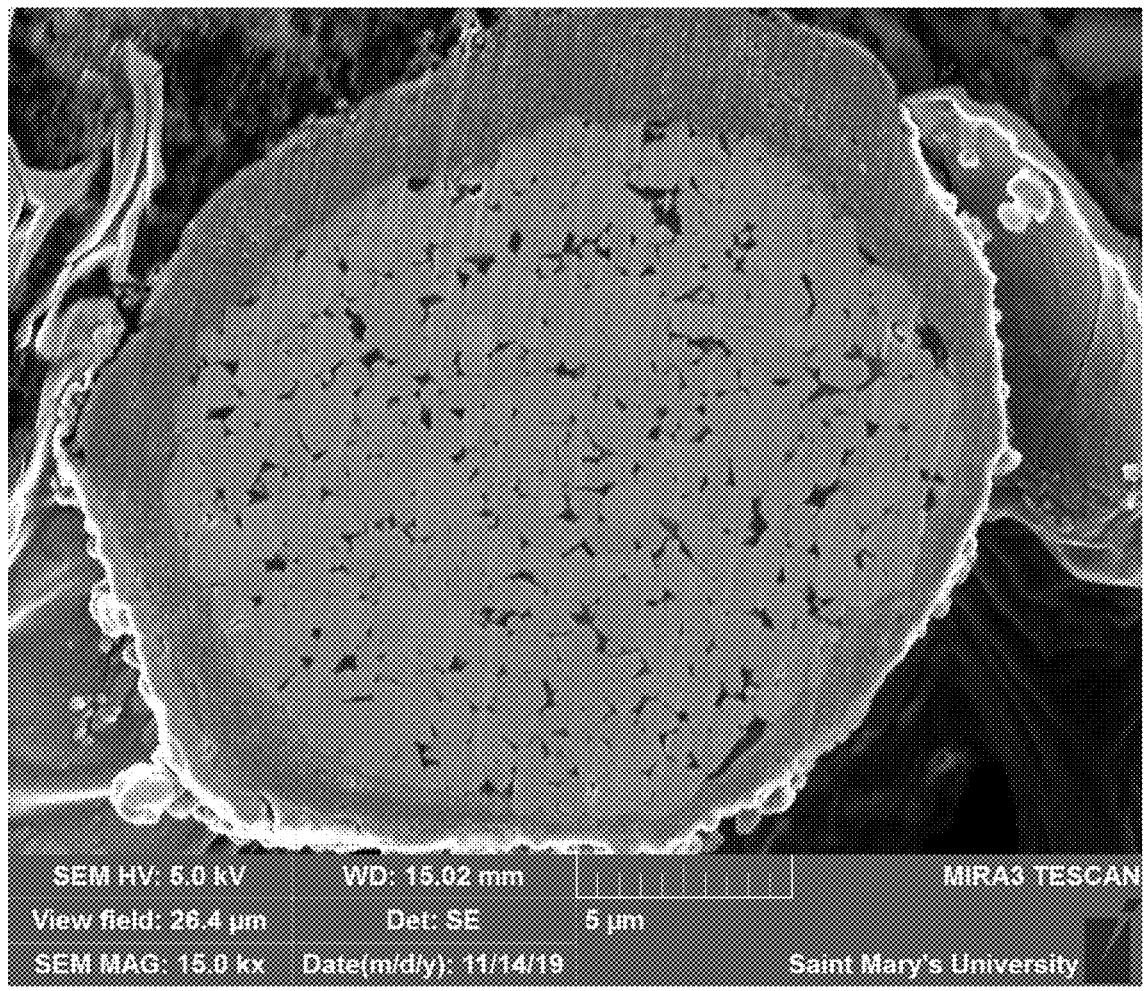
Figure 29:
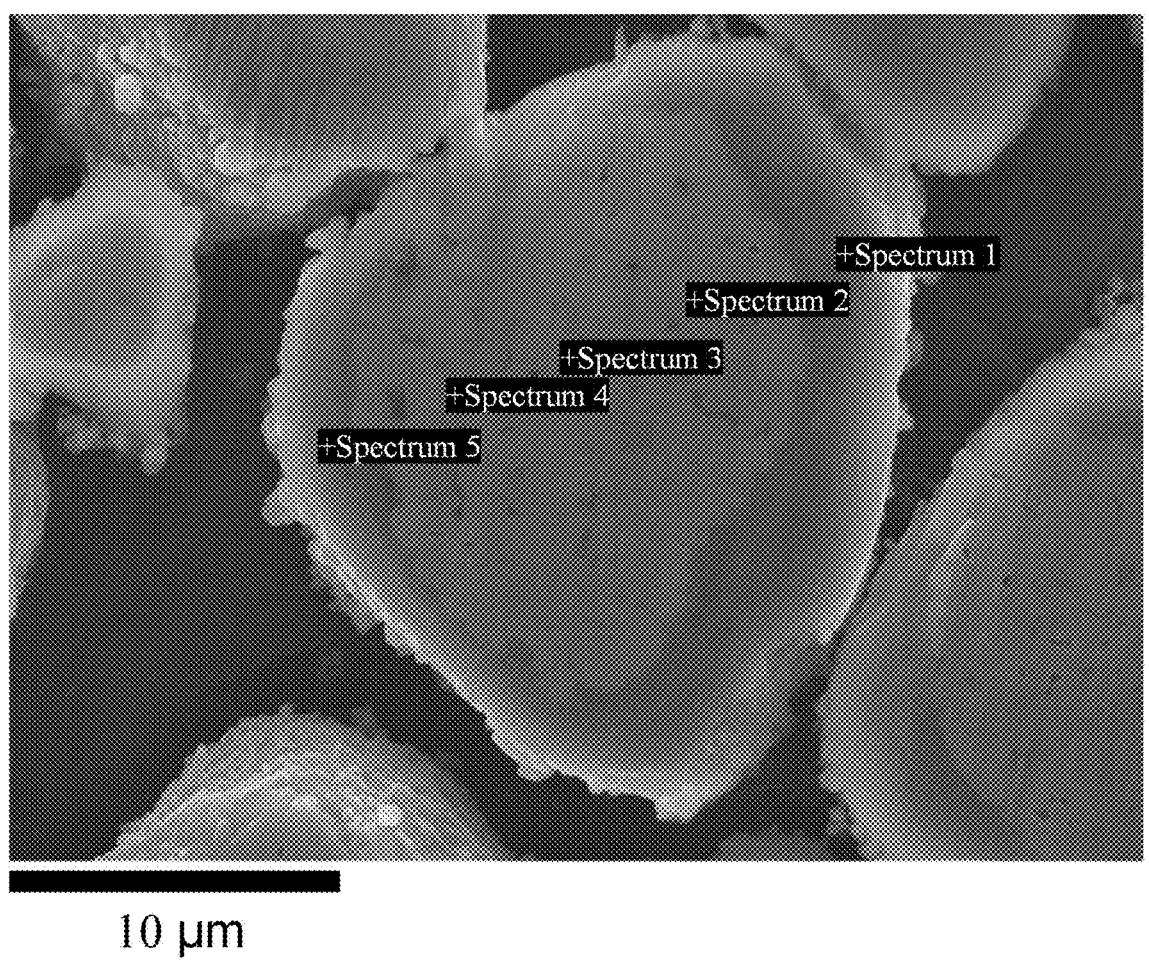
FIG. 29 shows a cross section image of a core-shell product particle of Inventive Example 4 with the position of five points indicated as Spectrum 1-5 (from right to left), at which compositions were obtained by EDS.

FIGS. 28a and 28b shows SEM images at two different magnifications of cross sections of product particles. Most of the product particles having a diameter of 5-20 μm. In cross section, the particles can be seen to have a core-shell structure. The brightness is different for the particle core and for the particle shell, indicating a different elemental composition for the core and the shell. The core consists of randomly oriented crystallites that have the same average crystallite size as the core precursor particles and the shell consists of randomly oriented crystallites having the same average crystallite size as the shell precursor particles. Both core and shell contain porosity. FIG. 29 shows a cross section SEM image of a product particle with the position of five data points indicated, labelled as Spectrum 1-5. The elemental composition at each point, as determined by EDS is listed in Table 2 below. The core is about 13% richer in Ni than the shell.

TABLE 2

|  | Mn (atomic %) | Co (atomic %) | Ni (atomic %) |
|---|---|---|---|
| Spectrum 1 | 23.08 | 24.93 | 51.99 |
| Spectrum 2 | 18.92 | 20.63 | 60.45 |
| Spectrum 3 | 18.7 | 20.48 | 60.82 |
| Spectrum 4 | 18.92 | 20.63 | 60.45 |
| Spectrum 5 | 22.85 | 24.54 | 52.61 |

Figure 30A:
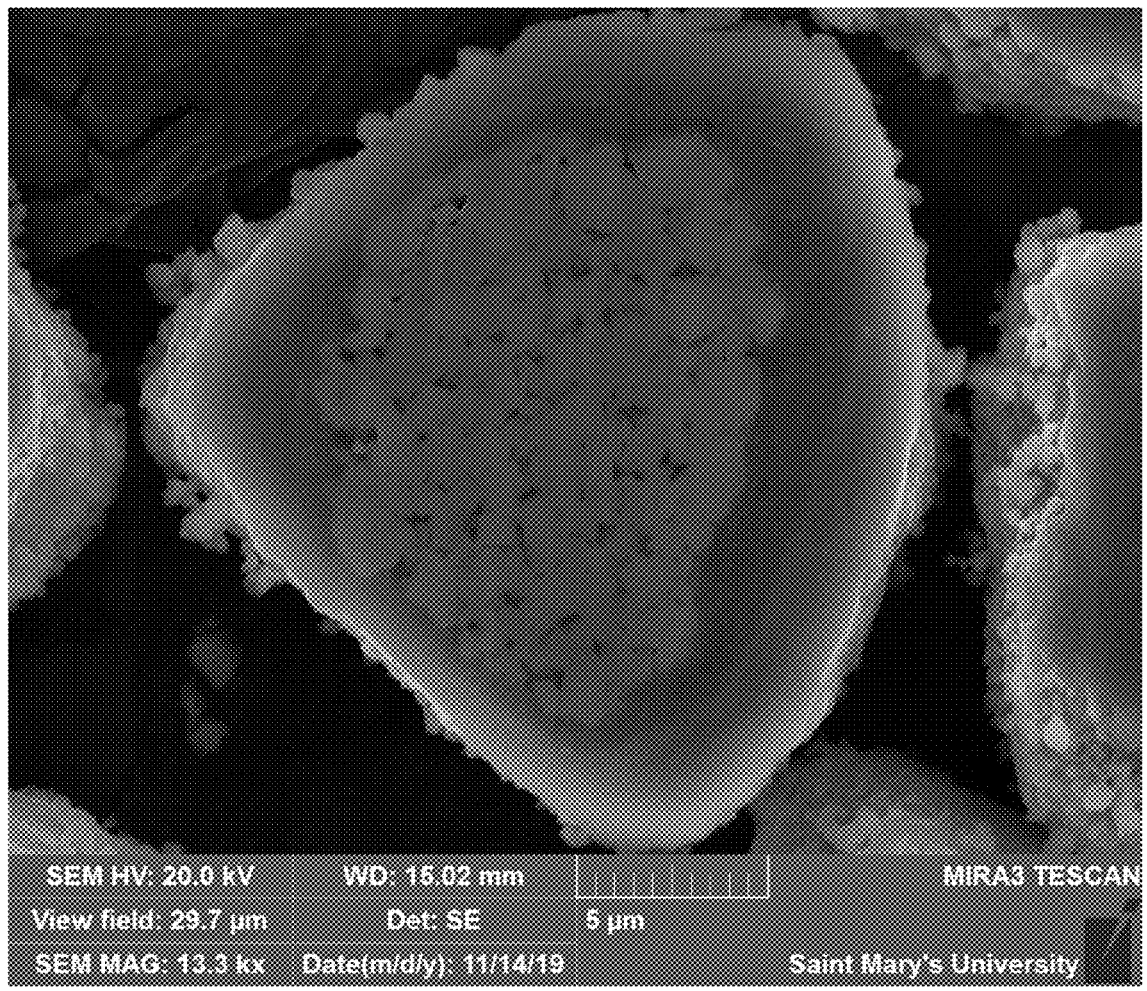
FIG. 30a shows SEM images of cross-sectioned core-shell product particles of Inventive Example 4.
Figure 30B:
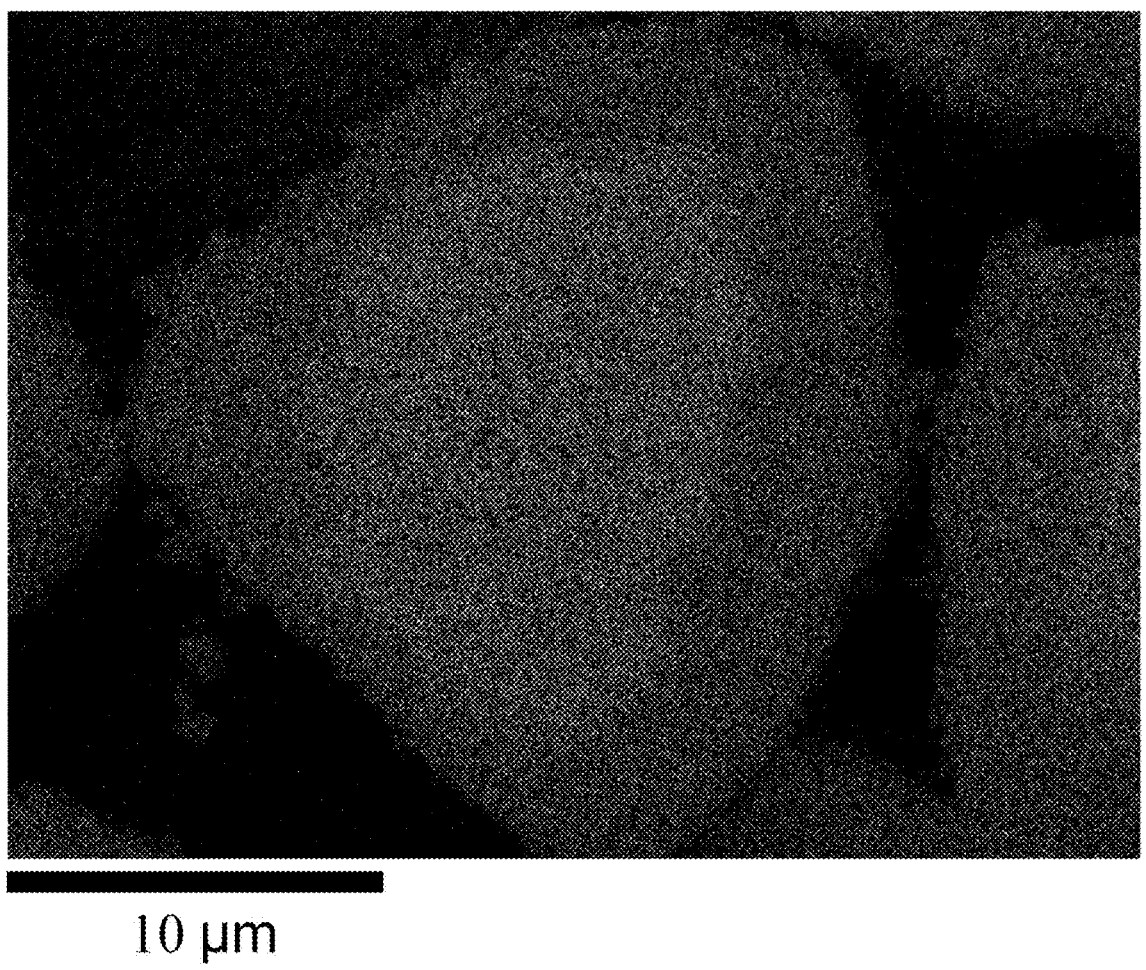
FIG. 30b shows the EDS elemental mapping of Ni of cross-sectioned core-shell product particles of Inventive Example 4.
Figure 31:
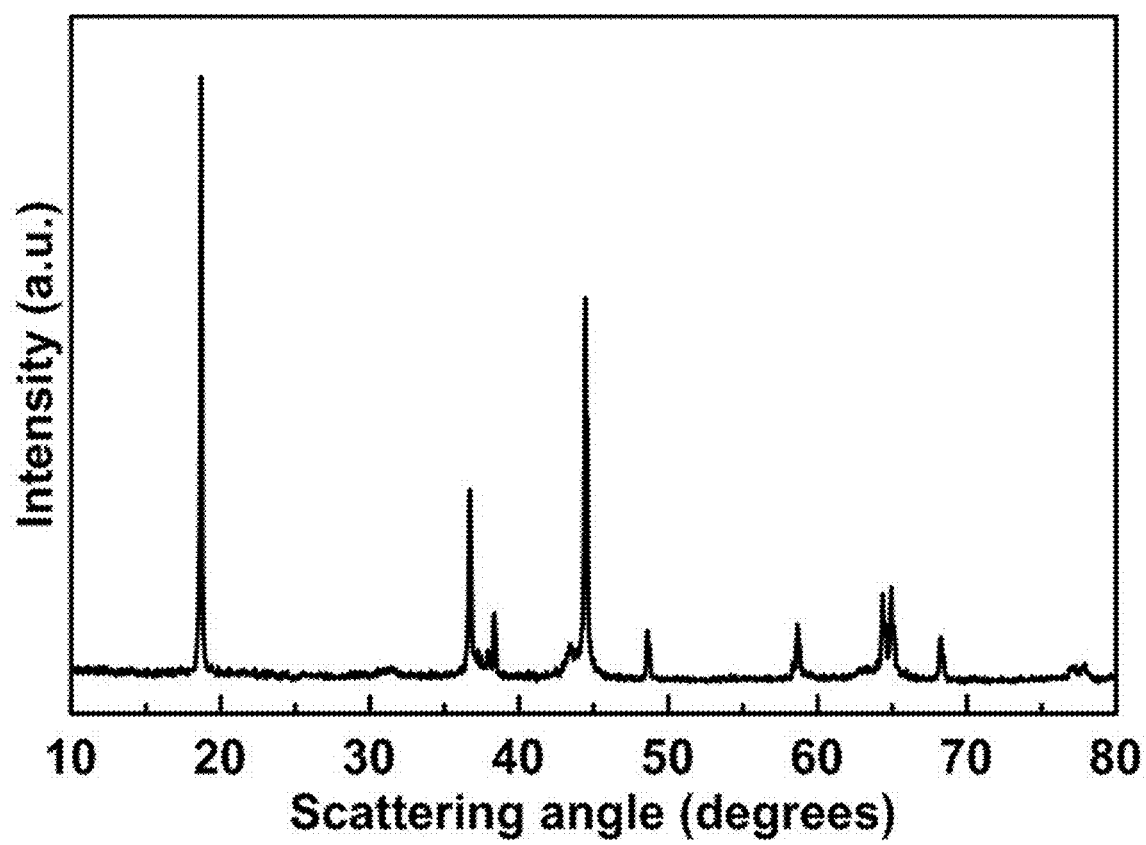
FIG. 31 shows an XRD pattern of the product particles of Inventive Example 4.

FIG. 30*a* shows a cross section image of a product particle and FIG. 30*b* shows an EDS Ni-mapping of the same product particle. The intensity of the Ni signal from the core is stronger than the signal from the shell, confirming that the product particle consist a Ni-rich core and the shell is rich in Co and Mn. FIG. 31 shows an XRD pattern of the product particles. The XRD pattern corresponds to that of a mixture of product particles and core particles.

Figure 32:
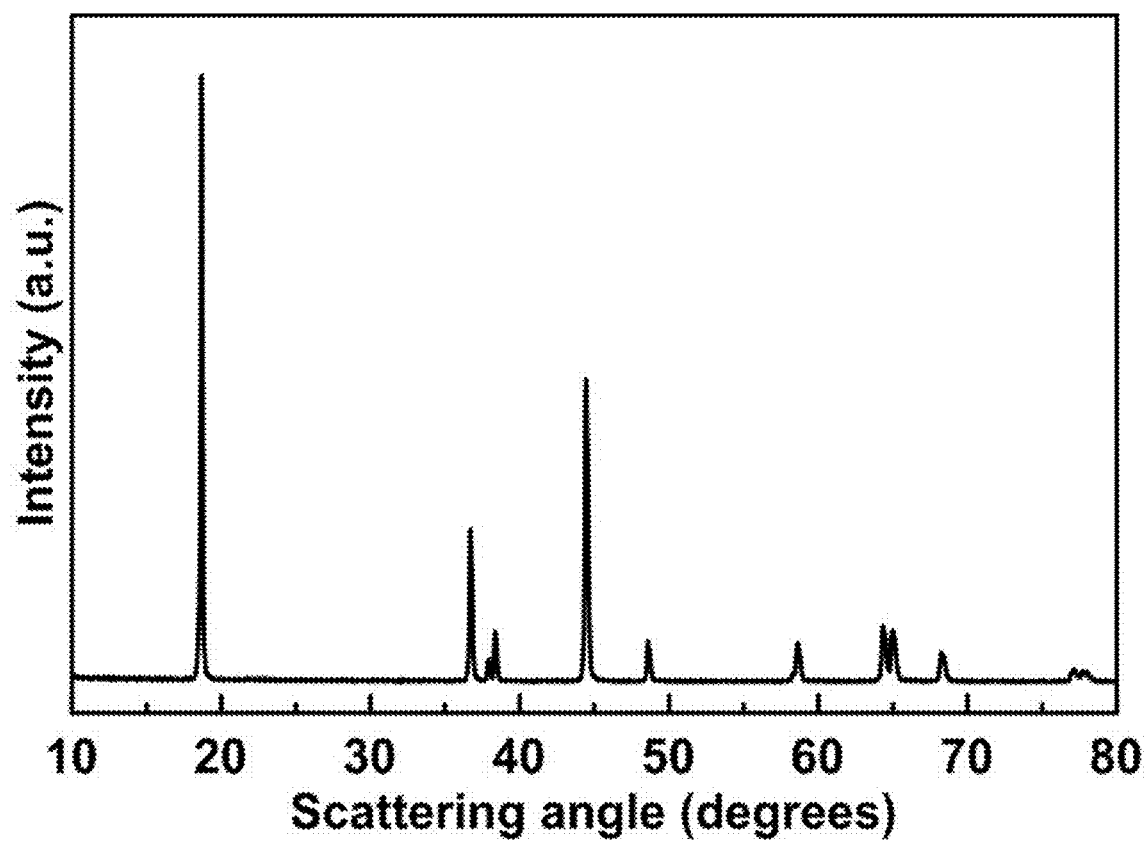
FIG. 32 shows an XRD pattern of the heated product particles of Inventive Example 4.
Figure 33:
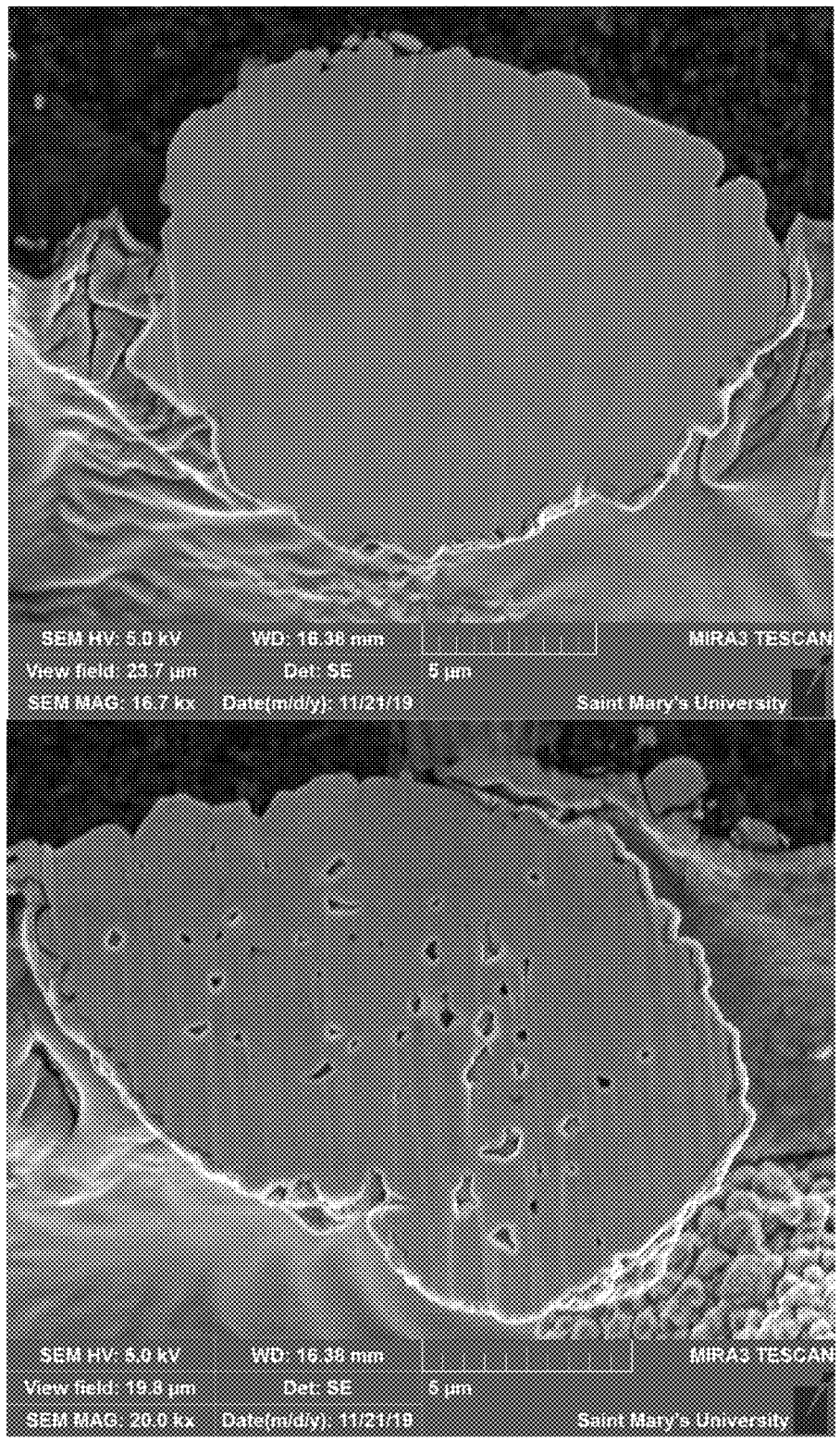
FIG. 33 shows SEM images of cross-sections of heated product particles of Inventive Example 4.
Figure 33:
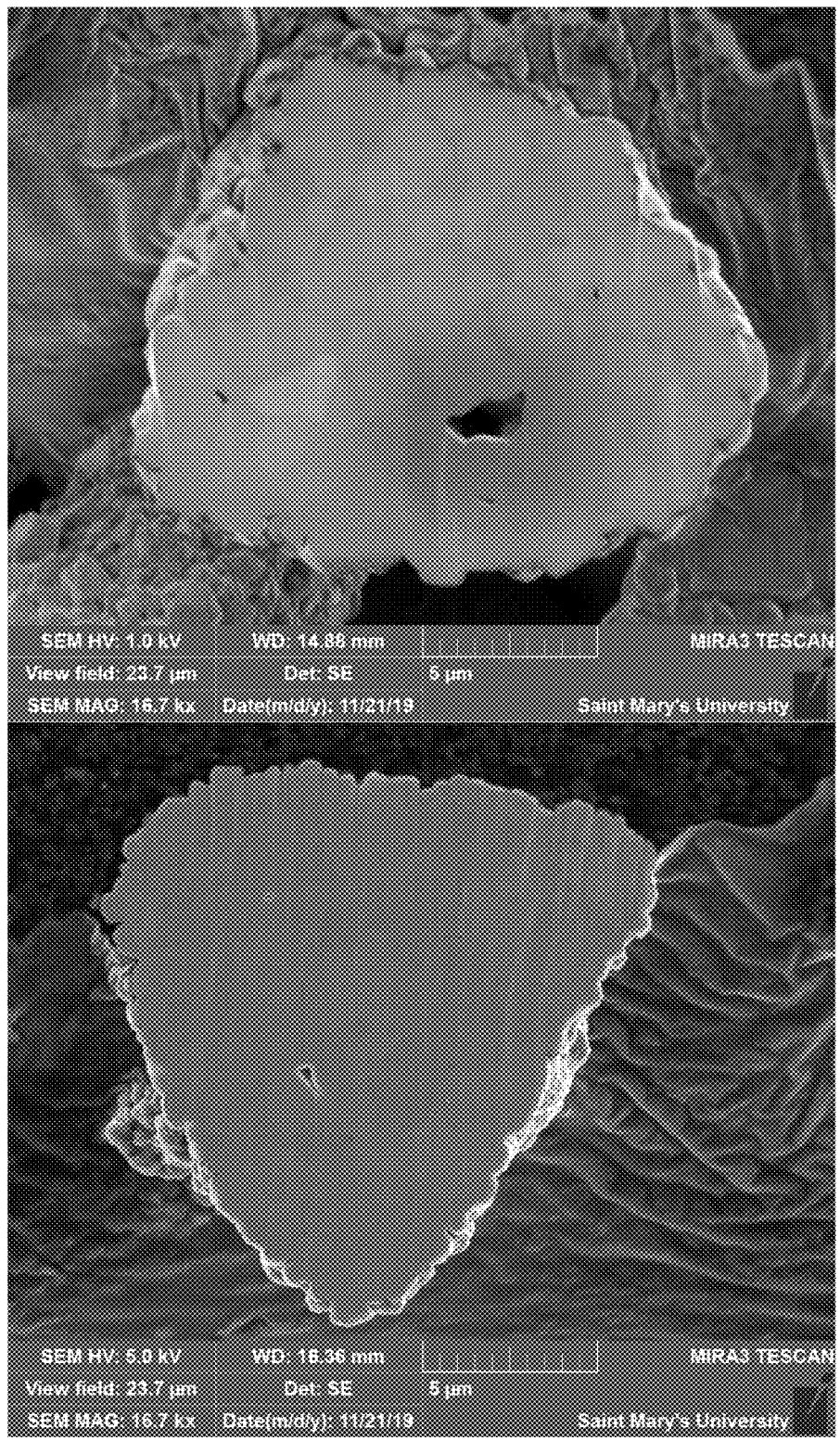

The product particles were placed in an alumina crucible and heated in a box furnace in air for 3 hours at 900° C. to cause the components of the product particles to react to form layered lithium nickel manganese cobalt oxide having an overall composition of $LiNi_{0.4}Mn_{0.3}Co_{0.3}O_2$. FIG. 32 shows an XRD pattern of the heated product particles. The XRD pattern contains peaks corresponding only to the O3 phase of $LiNi_xMn_yCo_zO_2$ with x+y+z=1. FIG. 33 shows SEM images of cross-sections of heated product particles. The size of the heated product particles was the same as the product particles before heating. The heated product particles contain randomly oriented crystallites that are also randomly shaped, having an average size of 2 μm. Some of the heated product particles contained voids, while others did not.

Figure 34:
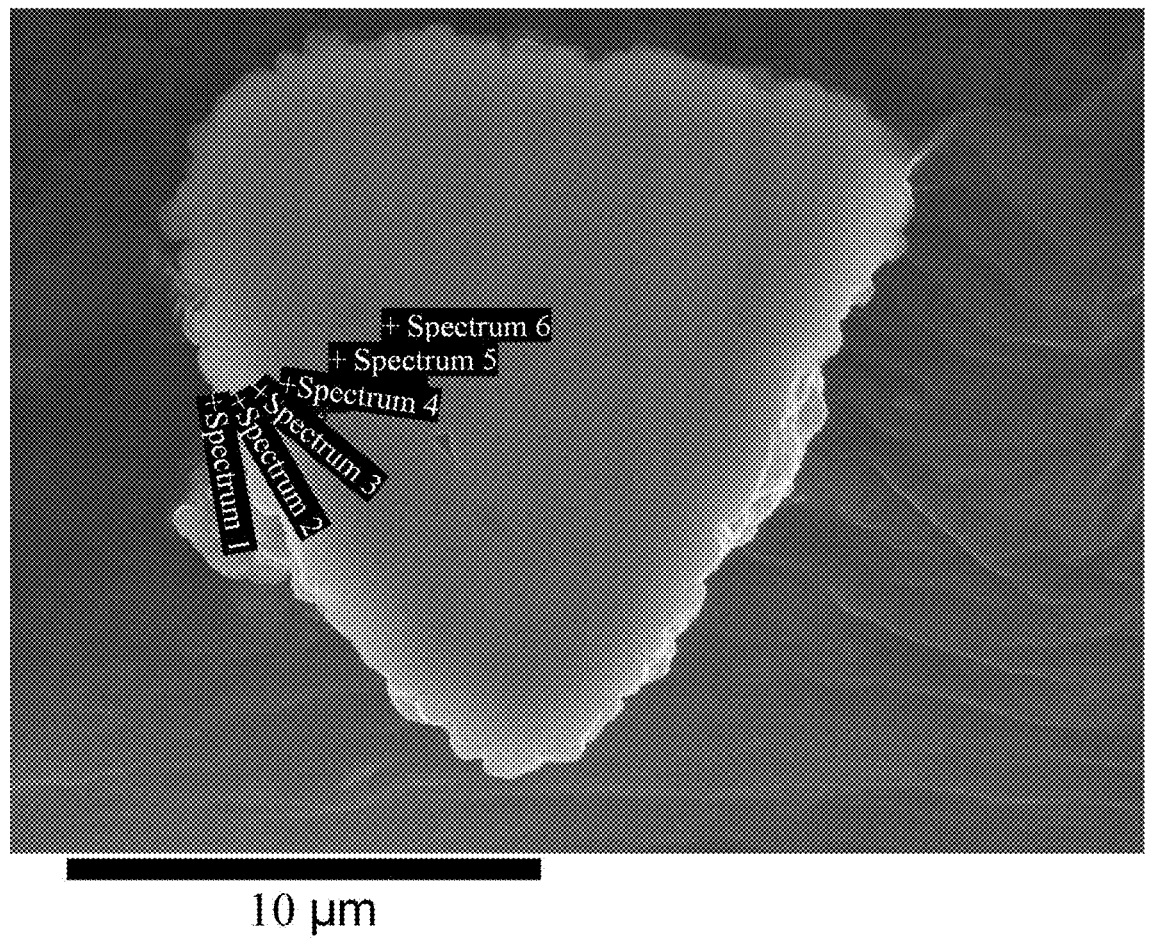
FIG. 34 shows a cross section image of a core-shell product particle after heating of Inventive Example 4 with the position of five points indicated as Spectrum 1-5 (from left to right), at which compositions were obtained by EDS.
Figure 35:
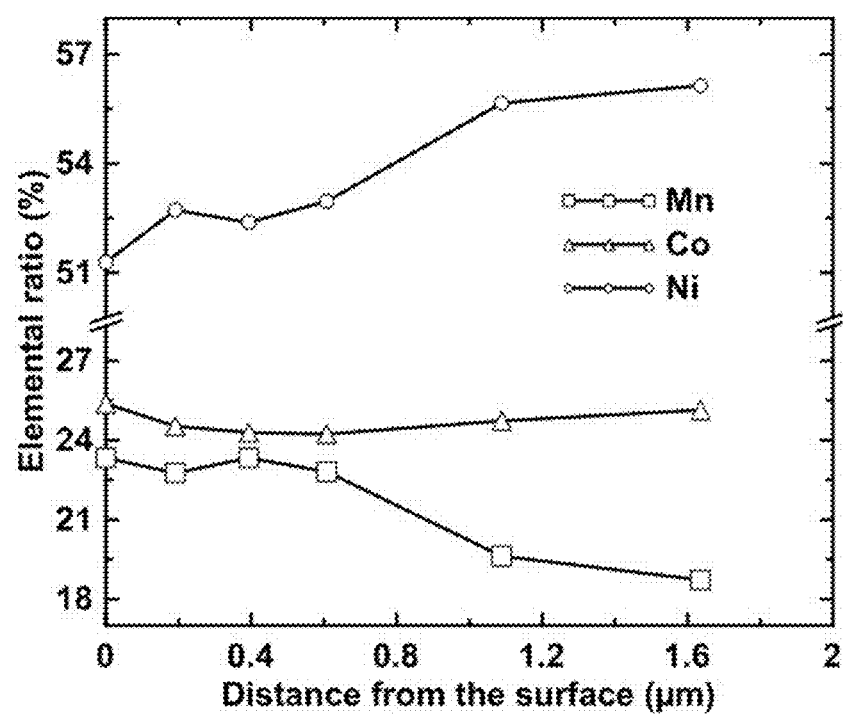
FIG. 35 shows the variation in the transition metal composition as a function of the distance from the surface of a heated product particle of Inventive Example 4.

FIG. 34 shows a cross section image of a heated product particle with the position of six data points indicated, labelled as Spectrum 1-6. The elemental composition at each point, as determined by EDS is listed in Table 3 below. The diffusion of transition metals during the high temperature heating process results in a concentration gradient, where the Ni content gradually increases from the shell to the core and the Mn content increases from the core to the shell. The variation in the transition metal composition as a function of the distance from the heated product particle surface as determined from Spectrum 1 to Spectrum 6 in FIG. 34 is shown in FIG. 35. The Ni concentration near the core is about 9% larger than in the shell.

TABLE 3

|  | Mn (atomic %) | Co (atomic %) | Ni (atomic %) |
|---|---|---|---|
| Spectrum 1 | 23.33 | 25.38 | 51.29 |
| Spectrum 2 | 22.76 | 24.53 | 52.72 |
| Spectrum 3 | 23.33 | 24.29 | 52.38 |
| Spectrum 4 | 22.81 | 24.23 | 52.96 |
| Spectrum 5 | 19.62 | 24.73 | 55.66 |
| Spectrum 6 | 18.72 | 25.14 | 56.14 |

Inventive Example 5—Microgranulation of Graphite Flakes

Figure 36:
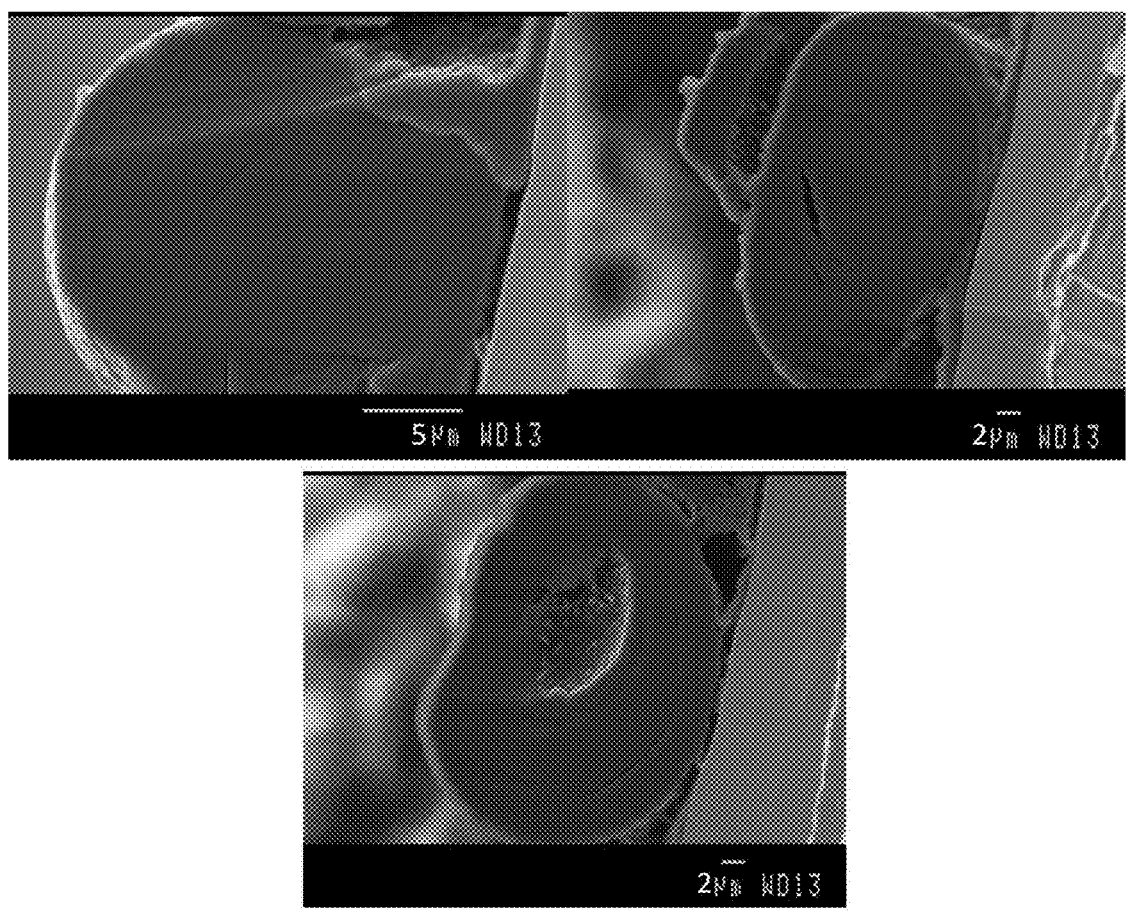
FIG. 36 shows SEM images of cross sections of heated product particles of Inventive Example 5.

Graphite product particles were made using the same method as Inventive Example 1, excepting the product particles were separated from the $ZrO_2$ templating media by passing the product particle/templating media mixture through a 38 μm sieve after mechanofusion processing. The product particles were then heated to 2840° C. under argon gas for 90 minutes, producing graphite spheres. The annealed product particle spheres had the same shape and average particle size as those in Inventive Example 1, but less porosity, presumably because diiodomethane was not used during processing. It is believed that diiodomethane might intercalate between the graphite layers, producing concentric porosity and void spaces during heating. FIG. 36 shows SEM cross-section images of some annealed product particles of Inventive Example 5. Some of the annealed product particles contained little or no porosity, some contained concentric porosity and some contained central void spaces. All of the annealed product particles contained layers of graphite arranged concentrically in nested ovoid or spherical shells and with the basal plane edges not radiating from a central point to the outside of the particles.

Inventive Example 6—Microgranulation of Petroleum Coke

A mixture of 30 g of petroleum coke in the form of flakes with an average flake thickness of 2 μm and an average flake breadth of 10 μm; and 330 g of the same type of $ZrO_2$ spheres used in Inventive Example 1 was subjected to the high shear and high pressure field, as described in Example 1 for 32 hours. The resulting product particles were separated from the $ZrO_2$ spheres using a 400 mesh sieve. The resulting product particles had a nodular shape, but were rounded and smooth and having an average diameter of 20 μm.

The preceding examples demonstrate that mechanofusion can be used to simply and efficiently aggregate various precursor particles into larger product particles. The product particles are uniform and may desirably be smooth and either spherical or rounded in shape. In some instances, the method can produce particulate with novel structures. And, as demonstrated in laboratory test cells, the invention can be used to manufacture particulate suitable for electrode materials in lithium batteries.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, it would be expected that other methods capable of providing similar shear and pressure field conditions as that provided by mechanfusion could also provide similar, uniform product particulate. Such modifications are to be considered within the purview and scope of the claims appended hereto.

The invention claimed is:

1. A microgranulation method of aggregating precursor particles comprising:
   obtaining an amount of precursor particles having an average particle size less than 1000 μm;
   obtaining an amount of templating media having a hardness greater than that of the precursor particles;
   preparing a mixture comprising the amounts of precursor particles and templating media;
   dry mixing the mixture in a chamber with a blade that rotates relative to a chamber wall thereby aggregating the precursor particles into product particles; and
   separating the product particles from the templating media after aggregating the precursor particles into product particles;
   wherein the rotational speed is about 8 m/s or greater.

2. The method of claim 1 wherein the step of mixing comprises mechanofusing the mixture.

3. The method of claim 1 wherein the average size of the precursor particles is less than 50 μm and the average size of the templating media is less than 500 μm.

4. The method of claim 3 wherein the average size of the precursor particles is less than 10 μm.

5. The method of claim 1 wherein the precursor particles are powders for use in battery electrodes, fertilizers, pharmaceuticals, toners, pigments, fillers, or catalysts.

6. The method of claim 5 wherein the precursor particles are carbonaceous powders or mixed metal oxide powders, or metal carbonate powders.

7. The method of claim 6 wherein the precursor particles comprise a carbon.

8. The method of claim 6 wherein the precursor particles are graphite flakes or $LiNi_{1/3}Mn_{1/3}Co_{1/3}O_2$ powder.

9. The method of claim 6 wherein the precursor particles are mixed metal oxide powders and the step of obtaining the amount of precursor particles comprises:
   obtaining metal oxide raw material powders; and
   ball milling the metal oxide raw material powders to produce the precursor particles.

10. The method of claim 1 comprising ball milling at least a portion of the amount of precursor particles prior to preparing the mixture.

11. The method of claim 1 comprising heating at least a portion of the amount of precursor particles prior to preparing the mixture.

12. The method of claim 1 wherein the precursor particles are irregularly shaped powders.

13. The method of claim 1 wherein the average size of the templating media is 100 μm or smaller.

14. The method of claim 1 wherein the templating media is selected from the group consisting of zirconium oxide, tungsten carbide, tungsten, silicon oxide, aluminum oxide, silicon nitride, hardened steel, stainless steel, and agate.

15. The method of claim 1 wherein the surface of the templating media is smooth.

16. The method of claim 15 wherein the templating media is spherically shaped.

17. The method of claim 1 wherein the size distribution of the templating media is uniform such that (D90−D10)/D50<2.

18. The method of claim 1 wherein the bulk volume of the amount of templating media is greater than that of the bulk volume of the amount of precursor particles.

19. The method of claim 1 wherein the bulk volume of the amount of templating media is greater than 10% of the bulk volume of the amount of precursor particles.

20. The method of claim 19 wherein the bulk volume of the amount of templating media is greater than or about three times that of the bulk volume of the amount of precursor particles.

21. The method of claim 2 wherein the mechanofusing is performed in a mechanofusion system comprising a chamber, a rotating wall within the chamber, a scraper within the rotating wall, and a press-head within the rotating wall.

22. The method of claim 21 wherein the mechanofusing comprises:
   setting a gap of about 0.5 mm between the scraper and the rotating wall;
   setting a gap of about 1.4 mm between the press-head and the rotating wall; and rotating such that the wall surface speed is about 8 m/s or greater.

23. The method of claim 1 wherein the average size of the product particles is between 10 and 100 μm.

24. The method of claim 1 wherein the size distribution of the product particles is uniform such that (D90−D10)/D50<2.

25. The method of claim 2 wherein the surface of the product particles is smooth.

26. The method of claim 2 wherein the surface of the product particles contain no cavities.

27. The method of claim 2 wherein the product particles have a roughness less than 0.02.

28. The method of claim 25 wherein the product particles are spherically shaped.

29. The method of claim 25 wherein the product particles are tetrahedrally shaped.

30. The method of claim 2 additionally comprising annealing the product particles at an elevated temperature.

31. The method of claim 1 wherein the amount of precursor particles comprises a mixture of first particles of a first composition and second particles of a second composition wherein the first and second compositions are different.

32. The method of claim 31 wherein the average crystallite size of the first precursor particles differs from the average crystallite size of the second precursor particles by at least 10%.

33. A method of making lithium nickel manganese cobalt oxide particulate with an O3 structure and an average particle size ranging from 1 to 50 μm, the method comprising:
   obtaining an amount of raw material powder comprising nickel, manganese, cobalt, and lithium, wherein the raw material powder has an average particle size less than 1000 μm;
   obtaining an amount of templating media having a hardness greater than that of the precursor particles;
   preparing a mixture comprising the amounts of raw material powder and templating media;
   mixing the mixture in a chamber with a blade that rotates relative to a chamber wall thereby aggregating the raw material powder into product particles, wherein the rotational speed is about 8 m/s or greater;
   separating the product particles from the templating media after aggregating the raw material powder into product particles; and heating the product particles in an oxygen containing atmosphere to produce the lithium nickel manganese cobalt oxide particulate.

34. The method of claim 33, wherein the average size of the templating media is less than 500 µm.

35. The method of claim 33, wherein the heating is conducting at a temperature of at least 900° C.

* * * * *